(12) United States Patent
Mima

(10) Patent No.: US 7,802,932 B2
(45) Date of Patent: Sep. 28, 2010

(54) PRINTING SYSTEM AND METHOD

(75) Inventor: Tsuyoshi Mima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1003 days.

(21) Appl. No.: 11/439,229

(22) Filed: May 24, 2006

(65) Prior Publication Data

US 2006/0275066 A1 Dec. 7, 2006

(30) Foreign Application Priority Data

Jun. 6, 2005 (JP) .............................. 2005-166168

(51) Int. Cl.
*G03G 15/00* (2006.01)
*G03G 15/22* (2006.01)

(52) U.S. Cl. ..................... 400/76; 399/407; 399/408

(58) Field of Classification Search ................ 400/76; 399/407, 408

See application file for complete search history.

(56) References Cited

U.S. PATENT DOCUMENTS 6,632,035 B1 10/2003 Kawamoto 6,717,286 B2 4/2004 Tsuchiya et al.
2005/0232656 A1* 10/2005 Asai et al. .................. 399/130

FOREIGN PATENT DOCUMENTS

| JP | 2001-38978 | 2/2001 |
|----|------------|--------|
| JP | 2001-213032 | 8/2001 |
| JP | 2002-283767 | 10/2002 |
| JP | 2003-262994 | 9/2003 |
| JP | 2005-011255 | 1/2005 |

\* cited by examiner

*Primary Examiner*—Leslie J Evanisko
(74) *Attorney, Agent, or Firm*—Fitzpatrick, Cella, Harper & Scinto

(57) ABSTRACT

A printing system capable of executing printing using printing medias of different types is provided. In the system, a first designation unit designates a paper type used to print a first page group in a document. A selection unit selects paper types which can be used to print the second page group in the document from paper types available in the system based on the designated paper type. A second designation unit designates a paper type used to print the second page group from the selected paper types. Then, a printing unit prints the first page group on paper sheets of the type designated by the first designation unit, and prints the second page group on paper sheets of the type designated by the second designation unit.

13 Claims, 58 Drawing Sheets

FIG. 8

Web Ordering Service　　　　　　　　　　　? □ ×

FILE　EDIT　VIEW　FAVORITES　TOOLS　HELP

← BACK ▼　→ ▼　[x]　[≡]　[🏠]　🔍 SEARCH

ADDRESS http://192.168.100.21/WebOrderService.htm ▼

■ OUTPUT / BINDING SERVICE　　　　CLIENT　[LOG OUT]

> ENTRY SETTING  > PRINT STYLE SETTING  > ORDER CONFIRMATION ~1401

[ENTRY FILE]

| NAME OF ENTRY FILE | NUMBER OF PAGES | BINDING LAYOUT |
|---|---|---|
| 1. 📄 EASY GUIDE.pdf | 20 PAGES | MAIN BODY |

1402　　1407  1406 1403　　　　1405　　　　1404

[PRINT STYLE]

| FINISHED SIZE | A4(210mm×297mm) ▼ |
|---|---|
| DOCUMENT ADJUSTMENT | ☐ ENLARGE / REDUCE IN ACCORDANCE WITH FINISHED SIZE |
| ORIENTATION OF OUTPUT PAPER | [A] ⊙ PORTRAIT  [A] ○ LANDSCAPE  1408 |
| BINDING TYPE | NO BINDING ▼ |
| BINDING LOCATION | ⊙ LEFT  ○ RIGHT  ○ TOP  ○ OTHER |
| PRINT | ⊙ SINGLE-SIDED  ○ DOUBLE-SIDED |
| COLOR MODE | [C] ○ COLOR  [M] ⊙ MONOCHROME  1412 |
| PAPER TYPE (MAIN BODY) | MONOCHROME STANDARD PAPER ▼ |
| PAPER TYPE (INTERLEAVE) | NO SETTING ▼ |
| PAPER TYPE (TAB PAPER) | NO SETTING ▼ |
| PAPER TYPE (COVER) | NO SETTING ▼ |

1416　　　　1410　　1415　1414　1413　1417
　　　　　　　　1411

◁ RETURN
(GO TO ENTRY SETTING)　　　NEXT
(GO TO ORDER CONFIRMATION) ▷

FIG. 9

| Web Ordering Service | ? ☐ ✕ |
|---|---|

FILE  EDIT  VIEW  FAVORITES  TOOLS  HELP

◀ BACK ▼ | ⊕ ▼ | ✕ | ⟳ | 🏠 | 🔍 SEARCH | 🖨

ADDRESS [http://192.168.100.21/WebOrderService.htm ▼]

■ OUTPUT / BINDING SERVICE                    CLIENT    [LOG OUT]

〉ENTRY SETTING 〉PRINT STYLE SETTING 〉ORDER CONFIRMATION

[ENTRY FILE]

| NAME OF ENTRY FILE | NUMBER OF PAGES | BINDING LAYOUT |
|---|---|---|
| 1. 📄 EASY GUIDE.pdf | 20 PAGES | MAIN BODY |

[PRINT STYLE]

| FINISHED SIZE | A4(210mm×297mm) ▼ |
|---|---|
| DOCUMENT ADJUSTMENT | ☐ ENLARGE / REDUCE IN ACCORDANCE WITH FINISHED SIZE |
| ORIENTATION OF OUTPUT PAPER | ⊙ PORTRAIT  ○ LANDSCAPE |
| BINDING TYPE | NO BINDING ▼ |
| BINDING LOCATION | NO BINDING |
| PRINT | CASE BINDING |
| COLOR MODE | SADDLE STITCH BINDING / BINDER STITCH BINDING |
| PAPER TYPE (MAIN BODY) | MONOCHROME STANDARD PAPER ▼ |
| PAPER TYPE (INTERLEAVE) | NO SETTING ▼ |
| PAPER TYPE (TAB PAPER) | NO SETTING ▼ |
| PAPER TYPE (COVER) | NO SETTING ▼ |

◁ RETURN (GO TO ENTRY SETTING)        NEXT (GO TO ORDER CONFIRMATION) ▷

FIG. 11

| Web Ordering Service | ? ▢ ✕ |
|---|---|

FILE  EDIT  VIEW  FAVORITES  TOOLS  HELP

◀ BACK ▼ | ▶ ▼ | ⊠ | ⟳ | 🏠 | 🔍 SEARCH | 🖨

ADDRESS | http://192.168.100.21/WebOrderService.htm ▼

■ OUTPUT / BINDING SERVICE          CLIENT  [LOG OUT]

〉 ENTRY SETTING 〉 PRINT STYLE SETTING 〉 ORDER CONFIRMATION

[ENTRY FILE]  ⎯1701                                          1702

| NAME OF ENTRY FILE | NUMBER OF PAGES | PAGES USED | BINDING LAYOUT | OS | CREATION APPLICATION |
|---|---|---|---|---|---|
| EASY GUIDE.pdf | 20 | 1~20 PAGES | MAIN BODY | | |

[PRINT STYLE INFORMATION]
COLOR MODE :                 MONOCHROME
FINISHED SIZE :              A4 (210mm×297mm)
ORIENTATION OF OUTPUT PAPER : PORTRAIT
DOCUMENT ADJUSTMENT :        DON'T ENLARGE / REDUCE IN
                             ACCORDANCE WITH FINISHED SIZE
BINDING TYPE :               NO BINDING
PAPER TYPE (MAIN BODY) :     MONOCHROME STANDARD PAPER
PAPER TYPE (INTERLEAVE) :    NO SETTING
PAPER TYPE (TAB PAPER) :     NO SETTING
PAPER TYPE (COVER) :         NO SETTING

MEMO
1703

1704     [ ORDER ]        [ CANCEL ]

◁ RETURN (GO TO PRINT STYLE SETTING)

1707              1705        1706

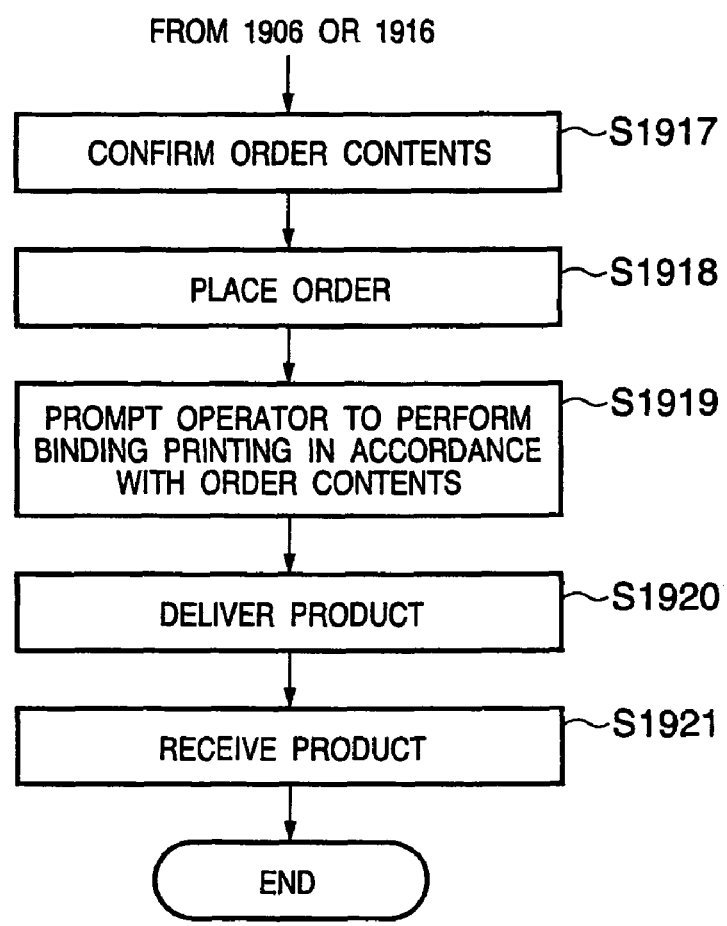

FIG. 14

| Web Ordering Service | ? □ ✕ |
|---|---|

FILE  EDIT  VIEW  FAVORITES  TOOLS  HELP

← BACK ▼ | → ▼ | ✕ | ⟳ | 🏠 | 🔍 SEARCH | 🖨

ADDRESS  http://192.168.100.21/WebOrderService.htm ▼

■ OUTPUT / BINDING SERVICE      CLIENT    | LOG OUT |

⟩ ENTRY SETTING  ⟩ PRINT STYLE SETTING  ⟩ ORDER CONFIRMATION

■ PLEASE MAKE SETTINGS FOR FILE TO BE ENTERED, AND UPLOAD FILE

| FILE TO BE ENTERED | C:¥Documents and Settings¥Admin | REFER TO... |
|---|---|---|
| NUMBER OF PAGES | 5 PAGES | |
| BINDING LAYOUT | MAIN BODY ▼ | ~1302 |
| OS IN FILE CREATION | XXX ▼ | |
| CREATION APPLICATION | YYY ▼ | VERSION 1.01 |

[ ENTRY (START UPLOAD) ] ~1303

| NAME OF ENTRY FILE | PAGES | BINDING LAYOUT |
|---|---|---|
| 1. 📄 USER'S MANUAL.pdf | 100 PAGES | MAIN BODY |

1304

[ NEXT (GO TO PRINT STYLE SETTING) ▷ ]

FIG. 15

| Web Ordering Service | ? ☐ ✕ |
|---|---|

FILE   EDIT   VIEW   FAVORITES   TOOLS   HELP

← BACK ▾ | → ▾ | ✕ | ↻ | 🏠 | 🔍 SEARCH | 🖨

ADDRESS | http://192.168.100.21/WebOrderService.htm | ▾

■ OUTPUT / BINDING SERVICE          CLIENT   | LOG OUT |

> ENTRY SETTING  > PRINT STYLE SETTING  > ORDER CONFIRMATION

[ENTRY FILE]

| NAME OF ENTRY FILE | NUMBER OF PAGES | BINDING LAYOUT |
|---|---|---|
| 1. 📄 USER'S MANUAL.pdf | 100 PAGES | MAIN BODY |

[PRINT STYLE]

| FINISHED SIZE | A4(210mm×297mm) ▾ |
|---|---|
| DOCUMENT ADJUSTMENT | ☐ ENLARGE / REDUCE IN ACCORDANCE WITH FINISHED SIZE |
| ORIENTATION OF OUTPUT PAPER | [A] ⊙ PORTRAIT   [A] ○ LANDSCAPE |
| BINDING TYPE | NO BINDING ▾ |
| BINDING LOCATION | ⊙ LEFT   ○ RIGHT   ○ TOP   ○ OTHER |
| PRINT | ○ SINGLE-SIDED   ⊙ DOUBLE-SIDED |
| COLOR MODE | [C] ⊙ COLOR   [M] ○ MONOCHROME |
| PAPER TYPE (MAIN BODY) | COLOR STANDARD PAPER ▾ |
| PAPER TYPE (INTERLEAVE) | NO SETTING ▾ |
| PAPER TYPE (TAB PAPER) | NO SETTING ▾ |
| PAPER TYPE (COVER) | NO SETTING ▾ |

◁ RETURN (GO TO ENTRY SETTING)          NEXT (GO TO ORDER CONFIRMATION) ▷

FIG. 16

| Web Ordering Service | ? □ ✕ |
|---|---|

FILE  EDIT  VIEW  FAVORITES  TOOLS  HELP

◀ BACK ▼ | ▶ ▼ | ✕ | ↻ | 🏠 | 🔍 SEARCH | 🖨

ADDRESS | http://192.168.100.21/WebOrderService.htm ▼

■ OUTPUT / BINDING SERVICE    CLIENT  [LOG OUT]

> ENTRY SETTING > PRINT STYLE SETTING > ORDER CONFIRMATION

[ENTRY FILE]

| NAME OF ENTRY FILE | NUMBER OF PAGES | BINDING LAYOUT |
|---|---|---|
| 1. 📄 USER'S MANUAL.pdf | 100 PAGES | MAIN BODY |

[PRINT STYLE]

| FINISHED SIZE | A4(210mm×297mm) ▼ |
|---|---|
| DOCUMENT ADJUSTMENT | ☐ ENLARGE / REDUCE IN ACCORDANCE WITH FINISHED SIZE |
| ORIENTATION OF OUTPUT PAPER | ⊙ PORTRAIT   ○ LANDSCAPE |
| BINDING TYPE | NO BINDING ▼ |
| BINDING LOCATION | NO BINDING |
| PRINT | CASE BINDING |
| COLOR MODE | SADDLE STITCH BINDING / BINDER STITCH BINDING |
| PAPER TYPE (MAIN BODY) | COLOR STANDRD PAPER ▼ |
| PAPER TYPE (INTERLEAVE) | NO SETTING ▼ |
| PAPER TYPE (TAB PAPER) | NO SETTING ▼ |
| PAPER TYPE (COVER) | NO SETTING ▼ |

◁ RETURN (GO TO ENTRY SETTING)    NEXT (GO TO ORDER CONFIRMATION) ▷

FIG. 18A

■ PAPER TYPE SETTING

| COVER | MAIN BODY |
|---|---|
| MONOCHROME STANDARD PAPER<br>COLOR STANDARD PAPER<br>RECYCLED PAPER<br>COLORED PAPER (RED)<br>COLORED PAPER (YELLOW)<br>COLORED PAPER (GREEN)<br>COLORED PAPER (BLUE)<br>THICK PAPER   106g/m2<br>THICK PAPER   150g/m2<br>THICK PAPER   210g/m2<br>THICK PAPER   253g/m2<br>GLOSSY PAPER<br>PLAIN PAPER<br>PLAIN PAPER (WOOD FREE PAPER)<br>PUNCHED PAPER<br>CARMEN PAPER   209g/m2<br>CARMEN PAPER   253g/m2<br>LASERCH PAPER   209g/m2<br>LASERCH PAPER   253g/m2 | SK PAPER   80g/m2<br>SK PAPER   105g/m2<br>HAMMERMILL PAPER   90g/m2<br>HAMMERMILL PAPER   105g/m2<br>MONOCHROME STANDARD PAPER<br>COLOR STANDARD PAPER<br>RECYCLED PAPER<br>COLORED PAPER (RED)<br>COLORED PAPER (YELLOW)<br>COLORED PAPER (GREEN)<br>COLORED PAPER (BLUE)<br>THICK PAPER   106g/m2<br>THICK PAPER   150g/m2<br>THICK PAPER   210g/m2<br>THICK PAPER   253g/m2<br>GLOSSY PAPER<br>PLAIN PAPER<br>PLAIN PAPER (WOOD FREE PAPER)<br>PUNCHED PAPER |

2401   2402   NUMBER OF PAGES OF ENTRY FILE

SET

COVER TYPE TABLE    2501

| No. | PAPER TYPE NAME | ENDURANCE INDEX |
|---|---|---|
| 1 | MONOCHROME STANDARD PAPER | 300 |
| 2 | COLOR STANDARD PAPER | 340 |
| 3 | RECYCLED PAPER | 280 |
| 4 | COLORED PAPER (RED) | 300 |
| 5 | COLORED PAPER (YELLOW) | 300 |
| 6 | COLORED PAPER (GREEN) | 300 |
| 7 | COLORED PAPER (BLUE) | 300 |
| 8 | THICK PAPER 106g/m$^2$ | 450 |
| 9 | THICK PAPER 150g/m$^2$ | 600 |
| 10 | THICK PAPER 210g/m$^2$ | 720 |
| 11 | THICK PAPER 253g/m$^2$ | 800 |
| 12 | GLOSSY PAPER | 360 |
| 13 | PLAIN PAPER | 300 |
| 14 | PLAIN PAPER (WOOD FREE PAPER) | 330 |
| 15 | PUNCHED PAPER | 360 |
| 16 | CARMEN PAPER 209g/m$^2$ | 750 |
| 17 | CARMEN PAPER 253g/m$^2$ | 840 |
| 18 | LASERCH PAPER 209g/m$^2$ | 770 |
| 19 | LASERCH PAPER 253g/m$^2$ | 880 |

FIG. 19B

MAIN BODY / INTERLEAVE / TAB PAPER TYPE TABLE    2504

| No. | PAPER TYPE NAME | ENDURANCE INDEX |
|---|---|---|
| 1 | SK PAPER 80g/m² | 8 |

2503

| No. | PAPER TYPE NAME | ENDURANCE INDEX |
|---|---|---|
| 1 | | |
| 2 | | |

2502

| No. | PAPER TYPE NAME | ENDURANCE INDEX |
|---|---|---|
| 1 | SK PAPER 80g/m² | 8 |
| 2 | SK PAPER 105g/m² | 10 |
| 3 | HAMMERMILL PAPER 90g/m² | 9 |
| 4 | HAMMERMILL PAPER 105g/m² | 10 |
| 5 | MONOCHROME STANDARD PAPER | 12 |
| 6 | COLOR STANDARD PAPER | 14 |
| 7 | RECYCLED PAPER | 10 |
| 8 | COLORED PAPER (RED) | 12 |
| 9 | COLORED PAPER (YELLOW) | 12 |
| 10 | COLORED PAPER (GREEN) | 12 |
| 11 | COLORED PAPER (BLUE) | 12 |
| 12 | THICK PAPER 106g/m² | 50 |
| 13 | THICK PAPER 150g/m² | 70 |
| 14 | THICK PAPER 210g/m² | 90 |
| 15 | THICK PAPER 253g/m² | 120 |
| 16 | GLOSSY PAPER | 40 |
| 17 | PLAIN PAPER | 12 |
| 18 | PLAIN PAPER (WOOD FREE PAPER) | 20 |
| 19 | PUNCHED PAPER | 50 |

FIG. 20A

MAIN BODY / INTERLEAVE / TAB PAPER TYPE TABLE — 2504

| No. | PAPER TYPE NAME | ENDURANCE INDEX |
|---|---|---|
| 1 | SK PAPER 80g/m² | 8 |

2503

| No. | PAPER TYPE NAME | ENDURANCE INDEX |
|---|---|---|
| 1 | SK PAPER 80g/m² | 8 |
| 2 | | |

2502

| No. | PAPER TYPE NAME | ENDURANCE INDEX |
|---|---|---|
| 1 | SK PAPER 80g/m² | 8 |
| 2 | SK PAPER 105g/m² | 10 |
| 3 | HAMMERMILL PAPER 90g/m² | 9 |
| 4 | HAMMERMILL PAPER 105g/m² | 10 |
| 5 | MONOCHROME STANDARD PAPER | 12 |
| 6 | COLOR STANDARD PAPER | 14 |
| 7 | RECYCLED PAPER | 10 |
| 8 | COLORED PAPER (RED) | 12 |
| 9 | COLORED PAPER (YELLOW) | 12 |
| 10 | COLORED PAPER (GREEN) | 12 |
| 11 | COLORED PAPER (BLUE) | 12 |
| 12 | THICK PAPER 106g/m² | 50 |
| 13 | THICK PAPER 150g/m² | 70 |
| 14 | THICK PAPER 210g/m² | 90 |
| 15 | THICK PAPER 253g/m² | 120 |
| 16 | GLOSSY PAPER | 40 |
| 17 | PLAIN PAPER | 12 |
| 18 | PLAIN PAPER (WOOD FREE PAPER) | 20 |
| 19 | PUNCHED PAPER | 50 |

815

ENDURANCE INDEX OF TAB PAPER × NUMBER OF PAGES × ENDURANCE COEFFICIENT
90 × 5 × 0.1 = 45

ENDURANCE INDEX OF INTERLEAVE × NUMBER OF PAGES × ENDURANCE COEFFICIENT
70 × 10 × 0.1 = 70

ENDURANCE INDEX OF MAIN BODY × NUMBER OF PAGES × ENDURANCE COEFFICIENT
70 × 100 × 0.1 = 700

FIG. 20B

COVER TYPE TABLE 2501

| No. | PAPER TYPE NAME | ENDURANCE INDEX | DETERMINATION OF RECOMMENDED PAPER |
|---|---|---|---|
| 1 | MONOCHROME STANDARD PAPER | 300 | × |
| 2 | COLOR STANDARD PAPER | 340 | × |
| 3 | RECYCLED PAPER | 280 | × |
| 4 | COLORED PAPER (RED) | 300 | × |
| 5 | COLORED PAPER (YELLOW) | 300 | × |
| 6 | COLORED PAPER (GREEN) | 300 | × |
| 7 | COLORED PAPER (BLUE) | 300 | × |
| 8 | THICK PAPER 106g/m2 | 550 | × |
| 9 | THICK PAPER 150g/m2 | 600 | × |
| 10 | THICK PAPER 210g/m2 | 750 | × |
| 11 | THICK PAPER 253g/m2 | 820 | ○ |
| 12 | GLOSSY PAPER | 500 | × |
| 13 | PLAIN PAPER | 300 | × |
| 14 | PLAIN PAPER (WOOD FREE PAPER) | 330 | × |
| 15 | PUNCHED PAPER | 550 | × |
| 16 | CARMEN PAPER 209g/m2 | 750 | × |
| 17 | CARMEN PAPER 253g/m2 | 840 | ○ |
| 18 | LASERCH PAPER 209g/m2 | 770 | × |
| 19 | LASERCH PAPER 253g/m2 | 880 | ○ |

FIG. 21A

■ PAPER TYPE SETTING

| COVER | MAIN BODY |
|---|---|
| MONOCHROME STANDARD PAPER | SK PAPER 80g/m² |
| COLOR STANDARD PAPER | SK PAPER 105g/m² |
| RECYCLED PAPER | HAMMERMILL PAPER 90g/m² |
| COLORED PAPER (RED) | HAMMERMILL PAPER 105g/m² |
| COLORED PAPER (YELLOW) | MONOCHROME STANDARD PAPER |
| COLORED PAPER (GREEN) | COLOR STANDARD PAPER |
| COLORED PAPER (BLUE) | RECYCLED PAPER |
| THICK PAPER 106g/m² | COLORED PAPER (RED) |
| THICK PAPER 150g/m² | COLORED PAPER (YELLOW) |
| THICK PAPER 210g/m² | COLORED PAPER (GREEN) |
| THICK PAPER 253g/m² | COLORED PAPER (BLUE) |
| GLOSSY PAPER | THICK PAPER 106g/m² |
| PLAIN PAPER | THICK PAPER 150g/m² |
| PLAIN PAPER (WOOD FREE PAPER) | THICK PAPER 210g/m² |
| PUNCHED PAPER | THICK PAPER 253g/m² |
| CARMEN PAPER 209g/m² | GLOSSY PAPER |
| CARMEN PAPER 253g/m² | PLAIN PAPER |
| LASERCH PAPER 209g/m² | PLAIN PAPER (WOOD FREE PAPER) |
| LASERCH PAPER 253g/m² | PUNCHED PAPER |

2401    2402    NUMBER OF PAGES OF ENTRY FILE

SET

■ PAPER TYPE SETTING

| COVER | MAIN BODY |
|---|---|
| MONOCHROME STANDARD PAPER | SK PAPER 80g/m² |
| COLOR STANDARD PAPER | SK PAPER 105g/m² |
| RECYCLED PAPER | HAMMERMILL PAPER 90g/m² |
| COLORED PAPER (RED) | HAMMERMILL PAPER 105g/m² |
| COLORED PAPER (YELLOW) | MONOCHROME STANDARD PAPER |
| COLORED PAPER (GREEN) | COLOR STANDARD PAPER |
| COLORED PAPER (BLUE) | RECYCLED PAPER |
| THICK PAPER 106g/m² | COLORED PAPER (RED) |
| THICK PAPER 150g/m² | COLORED PAPER (YELLOW) |
| THICK PAPER 210g/m² | COLORED PAPER (GREEN) |
| THICK PAPER 253g/m² | COLORED PAPER (BLUE) |
| GLOSSY PAPER | THICK PAPER 106g/m² |
| PLAIN PAPER | THICK PAPER 150g/m² |
| PLAIN PAPER (WOOD FREE PAPER) | THICK PAPER 210g/m² |
| PUNCHED PAPER | THICK PAPER 253g/m² |
| CARMEN PAPER 209g/m² | GLOSSY PAPER |
| CARMEN PAPER 253g/m² | PLAIN PAPER |
| LASERCH PAPER 209g/m² | PLAIN PAPER (WOOD FREE PAPER) |
| LASERCH PAPER 253g/m² | PUNCHED PAPER |

2401  2402  NUMBER OF PAGES OF ENTRY FILE

SET

■ PAPER TYPE SETTING

| COVER | MAIN BODY |
|---|---|
| MONOCHROME STANDARD PAPER | SK PAPER    80g/m² |
| COLOR STANDARD PAPER | SK PAPER    105g/m² |
| RECYCLED PAPER | HAMMERMILL PAPER    90g/m² |
| COLORED PAPER (RED) | HAMMERMILL PAPER    105g/m² |
| COLORED PAPER (YELLOW) | MONOCHROME STANDARD PAPER |
| COLORED PAPER (GREEN) | COLOR STANDARD PAPER |
| COLORED PAPER (BLUE) | RECYCLED PAPER |
| THICK PAPER    106g/m² | COLORED PAPER (RED) |
| THICK PAPER    150g/m² | COLORED PAPER (YELLOW) |
| THICK PAPER    210g/m² | COLORED PAPER (GREEN) |
| THICK PAPER    253g/m² | COLORED PAPER (BLUE) |
| GLOSSY PAPER | THICK PAPER    106g/m² |
| PLAIN PAPER | THICK PAPER    150g/m² |
| PLAIN PAPER (WOOD FREE PAPER) | THICK PAPER    210g/m² |
| PUNCHED PAPER | THICK PAPER    253g/m² |
| CARMEN PAPER    209g/m² | GLOSSY PAPER |
| CARMEN PAPER    253g/m² | PLAIN PAPER |
| LASERCH PAPER    209g/m² | PLAIN PAPER (WOOD FREE PAPER) |
| LASERCH PAPER    253g/m² | PUNCHED PAPER |

2401             2402    NUMBER OF PAGES OF ENTRY FILE

SET

■ PAPER TYPE SETTING

| COVER | MAIN BODY |
|---|---|
| MONOCHROME STANDARD PAPER | SK PAPER 80g/m2 |
| COLOR STANDARD PAPER | SK PAPER 105g/m2 |
| RECYCLED PAPER | HAMMERMILL PAPER 90g/m2 |
| COLORED PAPER (RED) | HAMMERMILL PAPER 105g/m2 |
| COLORED PAPER (YELLOW) | MONOCHROME STANDARD PAPER |
| COLORED PAPER (GREEN) | COLOR STANDARD PAPER |
| COLORED PAPER (BLUE) | RECYCLED PAPER |
| THICK PAPER 106g/m2 | COLORED PAPER (RED) |
| THICK PAPER 150g/m2 | COLORED PAPER (YELLOW) |
| THICK PAPER 210g/m2 | COLORED PAPER (GREEN) |
| THICK PAPER 253g/m2 | COLORED PAPER (BLUE) |
| GLOSSY PAPER | THICK PAPER 106g/m2 |
| PLAIN PAPER | THICK PAPER 150g/m2 |
| PLAIN PAPER (WOOD FREE PAPER) | THICK PAPER 210g/m2 |
| PUNCHED PAPER | THICK PAPER 253g/m2 |
| CARMEN PAPER 209g/m2 | GLOSSY PAPER |
| CARMEN PAPER 253g/m2 | PLAIN PAPER |
| LASERCH PAPER 209g/m2 | PLAIN PAPER (WOOD FREE PAPER) |
| LASERCH PAPER 253g/m2 | PUNCHED PAPER |

2401  2402  NUMBER OF PAGES OF ENTRY FILE

SET

■ PAPER TYPE SETTING

| COVER | MAIN BODY |
|---|---|
| MONOCHROME STANDARD PAPER | SK PAPER 80g/m² |
| COLOR STANDARD PAPER | SK PAPER 105g/m² |
| RECYCLED PAPER | HAMMERMILL PAPER 90g/m² |
| COLORED PAPER (RED) | HAMMERMILL PAPER 105g/m² |
| COLORED PAPER (YELLOW) | MONOCHROME STANDARD PAPER |
| COLORED PAPER (GREEN) | COLOR STANDARD PAPER |
| COLORED PAPER (BLUE) | RECYCLED PAPER |
| THICK PAPER 106g/m² | COLORED PAPER (RED) |
| THICK PAPER 150g/m² | COLORED PAPER (YELLOW) |
| THICK PAPER 210g/m² | COLORED PAPER (GREEN) |
| THICK PAPER 253g/m² | COLORED PAPER (BLUE) |
| GLOSSY PAPER | THICK PAPER 106g/m² |
| PLAIN PAPER | THICK PAPER 150g/m² |
| PLAIN PAPER (WOOD FREE PAPER) | THICK PAPER 210g/m² |
| PUNCHED PAPER | THICK PAPER 253g/m² |
| CARMEN PAPER 209g/m² | GLOSSY PAPER |
| CARMEN PAPER 253g/m² | PLAIN PAPER |
| LASERCH PAPER 209g/m² | PLAIN PAPER (WOOD FREE PAPER) |
| LASERCH PAPER 253g/m² | PUNCHED PAPER |

2401    2402  NUMBER OF PAGES OF ENTRY FILE

SET

■ PAPER TYPE SETTING

| COVER | MAIN BODY |
|---|---|
| MONOCHROME STANDARD PAPER | SK PAPER 80g/m² |
| COLOR STANDARD PAPER | SK PAPER 105g/m² |
| RECYCLED PAPER | HAMMERMILL PAPER 90g/m² |
| COLORED PAPER (RED) | HAMMERMILL PAPER 105g/m² |
| COLORED PAPER (YELLOW) | MONOCHROME STANDARD PAPER |
| COLORED PAPER (GREEN) | COLOR STANDARD PAPER |
| COLORED PAPER (BLUE) | RECYCLED PAPER |
| THICK PAPER 106g/m² | COLORED PAPER (RED) |
| THICK PAPER 150g/m² | COLORED PAPER (YELLOW) |
| THICK PAPER 210g/m² | COLORED PAPER (GREEN) |
| THICK PAPER 253g/m² | COLORED PAPER (BLUE) |
| GLOSSY PAPER | THICK PAPER 106g/m² |
| PLAIN PAPER | THICK PAPER 150g/m² |
| PLAIN PAPER (WOOD FREE PAPER) | THICK PAPER 210g/m² |
| PUNCHED PAPER | THICK PAPER 253g/m² |
| CARMEN PAPER 209g/m² | GLOSSY PAPER |
| CARMEN PAPER 253g/m² | PLAIN PAPER |
| LASERCH PAPER 209g/m² | PLAIN PAPER (WOOD FREE PAPER) |
| LASERCH PAPER 253g/m² | PUNCHED PAPER |

2401    2402    NUMBER OF PAGES OF ENTRY FILE

SET

■ PAPER TYPE SETTING

| COVER | MAIN BODY |
|---|---|
| MONOCHROME STANDARD PAPER<br>COLOR STANDARD PAPER<br>RECYCLED PAPER<br>COLORED PAPER (RED)<br>COLORED PAPER (YELLOW)<br>COLORED PAPER (GREEN)<br>COLORED PAPER (BLUE)<br>THICK PAPER    106g/m²<br>THICK PAPER    150g/m²<br>THICK PAPER    210g/m²<br>THICK PAPER    253g/m²<br>GLOSSY PAPER<br>PLAIN PAPER<br>PLAIN PAPER (WOOD FREE PAPER)<br>PUNCHED PAPER<br>CARMEN PAPER    209g/m²<br>CARMEN PAPER    253g/m²<br>LASERCH PAPER    209g/m²<br>LASERCH PAPER    253g/m² | SK PAPER    80g/m²<br>SK PAPER    105g/m²<br>HAMMERMILL PAPER    90g/m²<br>HAMMERMILL PAPER    105g/m²<br>MONOCHROME STANDARD PAPER<br>COLOR STANDARD PAPER<br>RECYCLED PAPER<br>COLORED PAPER (RED)<br>COLORED PAPER (YELLOW)<br>COLORED PAPER (GREEN)<br>COLORED PAPER (BLUE)<br>THICK PAPER    106g/m²<br>THICK PAPER    150g/m²<br>THICK PAPER    210g/m²<br>THICK PAPER    253g/m²<br>GLOSSY PAPER<br>PLAIN PAPER<br>PLAIN PAPER (WOOD FREE PAPER)<br>PUNCHED PAPER |

2401            2402    NUMBER OF PAGES OF ENTRY FILE

SET

2406

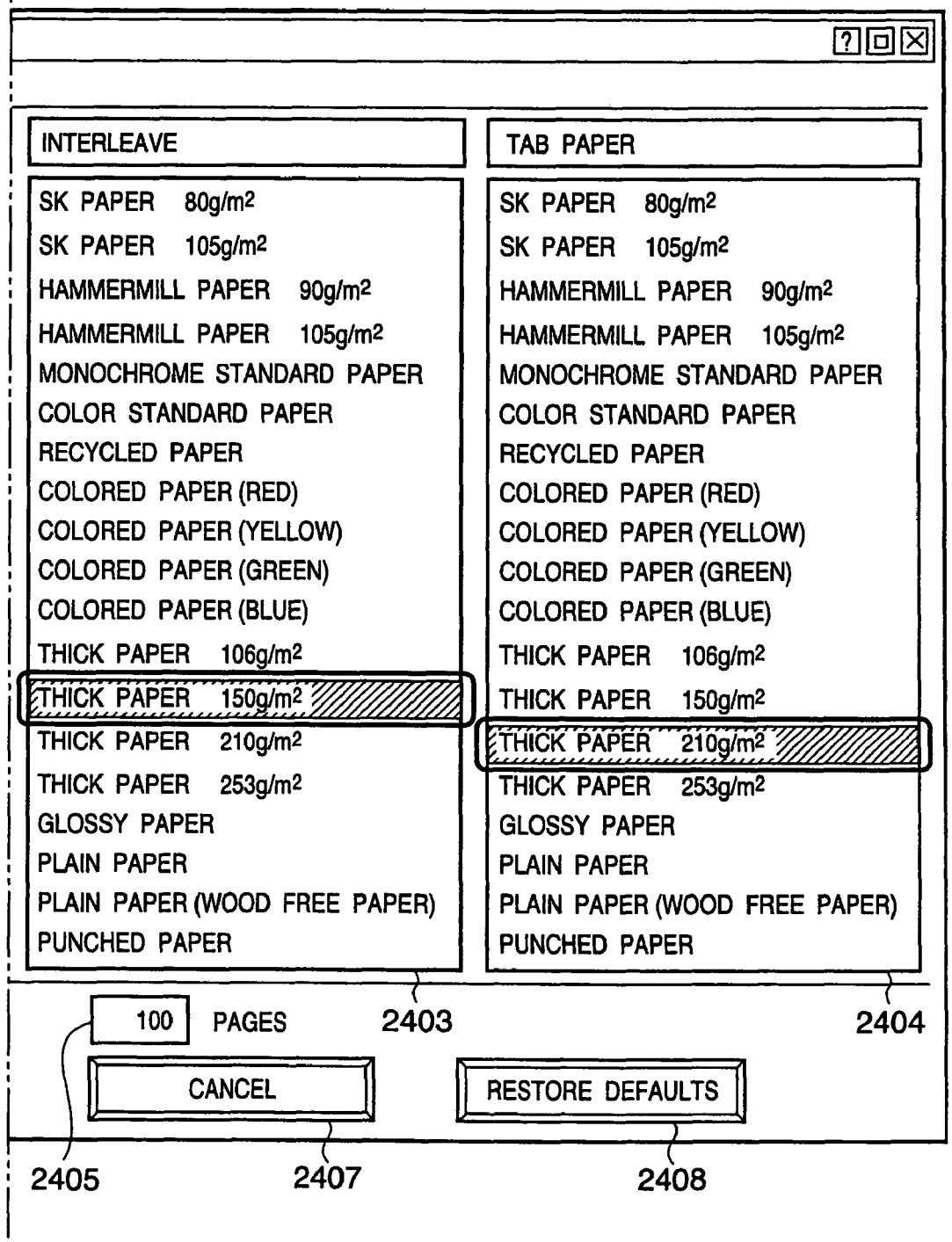

F I G. 25

```
Web Ordering Service                              [?][□][X]
FILE   EDIT   VIEW   FAVORITES   TOOLS   HELP
[← BACK ▼][⊕ ▼][X][↻][⌂][🔍 SEARCH][🖨]
ADDRESS [http://192.168.100.21/WebOrderService.htm ▼]
```

■ OUTPUT / BINDING SERVICE          CLIENT   [LOG OUT]

> ENTRY SETTING > PRINT STYLE SETTING > ORDER CONFIRMATION

【ENTRY FILE】

| NAME OF ENTRY FILE | NUMBER OF PAGES | BINDING LAYOUT |
|---|---|---|
| 1. 📄 USER'S MANUAL.pdf | 100 PAGES | MAIN BODY |

【PRINT STYLE】

| | |
|---|---|
| FINISHED SIZE | A4(210mm×297mm) ▼ |
| DOCUMENT ADJUSTMENT | ☐ ENLARGE / REDUCE IN ACCORDANCE WITH FINISHED SIZE |
| ORIENTATION OF OUTPUT PAPER | ⊙ PORTRAIT   ○ LANDSCAPE |
| BINDING TYPE | CASE BINDING ▼ |
| BINDING LOCATION | ⊙ LEFT   ○ RIGHT   ○ TOP   ○ OTHER |
| PRINT | ○ SINGLE-SIDED   ⊙ DOUBLE-SIDED |
| COLOR MODE | ⊙ COLOR   ○ MONOCHROME |
| PAPER TYPE (MAIN BODY) | THICK PAPER 150g/m² ▼ |
| PAPER TYPE (INTERLEAVE) | THICK PAPER 150g/m² ▼ |
| PAPER TYPE (TAB PAPER) | CARMEN PAPER 210g/m² ▼ |
| PAPER TYPE (COVER) | CARMEN PAPER 253g/m² ▼ |

◁ RETURN (GO TO ENTRY SETTING)        NEXT (GO TO ORDER CONFIRMATION) ▷

FIG. 26

Web Ordering Service

FILE   EDIT   VIEW   FAVORITES   TOOLS   HELP

BACK ▼ | ▼ | × | ⟳ | 🏠 | 🔍 SEARCH | 🖨

ADDRESS [http://192.168.100.21/WebOrderService.htm ▼]

■ OUTPUT / BINDING SERVICE        CLIENT    [LOG OUT]

❯ ENTRY SETTING  ❯ PRINT STYLE SETTING  ❯ ORDER CONFIRMATION — 1702

[ENTRY FILE]

| NAME OF ENTRY FILE | NUMBER OF PAGES | PAGES USED | BINDING LAYOUT | OS | CREATION APPLICATION |
|---|---|---|---|---|---|
| USER'S MANUAL.pdf | 100 | 1~100 PAGES MAIN BODY | | | |

[PRINT STYLE INFORMATION]

COLOR MODE :                          COLOR
FINISHED SIZE :                       A4 (210mm×297mm)
ORIENTATION OF OUTPUT PAPER :         PORTRAIT
DOCUMENT ADJUSTMENT :                 DON'T ENLARGE / REDUCE IN
                                      ACCORDANCE WITH FINISHED SIZE
BINDING TYPE :                        CASE BINDING
PAPER TYPE (MAIN BODY) :              THICK PAPER  150g/m²
PAPER TYPE (INTERLEAVE) :             THICK PAPER  150g/m²
PAPER TYPE (TAB PAPER) :              CARMEN PAPER  210g/m²
PAPER TYPE (COVER) :                  CARMEN PAPER  253g/m²

( MEMO
1703

[ ORDER ]    [ CANCEL ]

◁ RETURN (GO TO PRINT STYLE SETTING)

Web Ordering Service  ? □ ✕

FILE   EDIT   VIEW   FAVORITES   TOOLS   HELP

◄ BACK ▼ | ⊕ ▼ | ✕ | ⟳ | 🏠 | 🔍 SEARCH | 🖨

ADDRESS | http://192.168.100.21/WebOrderService.htm ▼

■ OUTPUT / BINDING SERVICE          CLIENT   [ LOG OUT ]

〉 ENTRY SETTING  〉 PRINT STYLE SETTING  〉 ORDER CONFIRMATION

■ PLEASE MAKE SETTINGS FOR FILE TO BE ENTERED, AND UPLOAD FILE

| FILE TO BE ENTERED | C:¥Documents and Settings¥Admin | REFER TO... |
| NUMBER OF PAGES | 2 PAGES | |
| BINDING LAYOUT | MAIN BODY ▼ | ~1302 |
| | MAIN BODY | |
| OS IN FILE CREATION | COVER | |
| CREATION APPLICATION | MAIN BODY AND COVER | VERSION 1.01 |
| | ENTRY (START UPLOAD) | ~1303 |

| NAME OF ENTRY FILE | PAGES | BINDING LAYOUT |
|---|---|---|
| 1. 📄 USER'S MANUAL.pdf | 100 PAGES | MAIN BODY |
| 2. 📄 COVER.pdf | 2 PAGES | COVER |

NEXT (GO TO PRINT STYLE SETTING) ▷

FIG. 28

○ recommend , × not recommend

| | | | COVER | | | | | | | | | |
|---|---|---|---|---|---|---|---|---|---|---|---|---|
| | PAPER TYPE NAME | ENDURANCE / NUMBER OF PAGES | MONOCHROME STANDARD PAPER | COLOR STANDARD PAPER | RECYCLED PAPER | COLORED PAPER (RED) | COLORED PAPER (YELLOW) | COLORED PAPER (GREEN) | COLORED PAPER (BLUE) | THICK PAPER 106g/m2 | THICK PAPER 150g/m2 | THICK PAPER 210g/m2 | THICK PAPER 250g/m2 |
| | | | 300 | 340 | 280 | 300 | 300 | 300 | 300 | 550 | 600 | 750 | 820 |
| MAIN BODY | SK PAPER 80g/m2 | 1~100 | ○ | ○ | ○ | ○ | ○ | ○ | ○ | ○ | ○ | ○ | ○ |
| | | 101~200 | ○ | ○ | × | ○ | ○ | ○ | ○ | ○ | ○ | ○ | ○ |
| | | 201~300 | × | ○ | × | × | × | × | × | ○ | ○ | ○ | ○ |
| | HAMMERMILL PAPER 90g/m2 | 1~100 | ○ | ○ | ○ | ○ | ○ | ○ | ○ | ○ | ○ | ○ | ○ |

PRINTING SYSTEM AND METHOD

FIELD OF THE INVENTION

The present invention relates to a printing system and method for performing a printing process using document data.

BACKGROUND OF THE INVENTION

In recent years, printing apparatuses have successfully achieved color printing and digital printing, at high speeds. Nowadays the printer industry has focused on offset printing technologies, which have become the mainstream.

With in this field, a lot of requirements focus on binding paper sheets discharged after a printing process, for which various binding types are available. For example, case binding often used for manuals, textbooks, and the like is a binding method which glues a portion serving as the spine of a paper bundle (to be referred to as the main body hereinafter) printed by a printing apparatus, covering the main body with the cover, and binding it as a book.

For example, Japanese Patent Laid-Open No. 2002-283767 discloses a technique to cover the side edge and spine of a paper bundle on the cover surface side with a front cover, adhering a back cover to the front cover, and then pressing the adhered portion of the paper bundle to create a booklet. A known technique to generate a warning when a paper type is set in advance for a cassette which stores paper sheets, and no paper sheet of the designated type is set in the cassette upon designating the paper type is disclosed in Japanese Patent Laid-Open No. 2003-262994.

However, unexpected bound books may emerge if it is permitted to freely use paper sheets of different types for the cover and main body while performing case binding using the above-mentioned method. For example, when paper sheets used as a main body are thick (for example, one paper sheet is thick or the number of sheets is large), and a thin paper sheet is used as a cover for covering the main body, the bound book may bend. When paper sheets used for the main body are made of rigid material, a bound book will not endure the pressure unless the cover is made of a rigid material corresponding to the material of the main body.

Most of books treated in the printing industry have many pages, and the thickness of paper bundles varies. There are a variety of paper types used for the main body and cover. Hence, appropriate paper sheets must be selected from a variety of types in accordance with the thickness and paper type of the main body.

SUMMARY OF THE INVENTION

In view of the above problems in the conventional art, the present invention has an object to provide a printing system and method capable of preferably selecting a paper type used for a printing process when binding.

In one aspect of the present invention, a printing system capable of executing printing using a plurality of printing media of different types is provided. The system includes an input unit configured to input document data, a printing unit configured to print on the basis of the document data input from said input unit, a first designation unit configured to designate a printing medium type used to print a first page group of at least one page in the document data, a first selection unit configured to select printing medium types which can be used to print a second page group of at least one page in the document data from a plurality of printing medium types available in the printing system on the basis of the printing medium type designated by said first designation unit, a second designation unit configured to designate a printing medium type used to print the second page group from the printing medium types selected by said first selection unit, and a control unit configured to control said printing unit so as to print the first page group on printing media of the type designated by said first designation unit, and print the second page group on printing media of the type designated by said second designation unit.

The above and other objects and features of the present invention will appear more fully hereinafter from a consideration of the following description taken in connection with the accompanying drawing wherein one example is illustrated by way of example.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 8 is a view showing an example of a setting window layout for setting the print style of the output/binding service;

FIG. 9 is a view showing an example of selecting a "binding type" pull-down list box and displaying a pull-down list of binding types;

FIG. 11 is a view showing an example of a window layout for confirming the contents of an order and placing the order in the output/binding service;

FIGS. 13A-C are flowcharts for explaining a paper type selection sequence in binding printing in the first embodiment;

FIG. 14 is a view showing an example of an "entry setting" window displayed when an "entry (start upload)" button is pressed;

FIG. 15 is a view showing an example of a "print style setting" window in the first embodiment;

FIG. 16 is a view showing an example of displaying a pull-down list of binding types in the window shown in FIG. 15;

FIGS. 18A-B are views showing an example of a "paper type setting" window displayed by pressing a "set" button in the "detailed settings of binding" window;

FIG. 19A is a view showing a cover type table;

FIG. 19B is a view showing a main body type table, interleave type table, and tab paper type table;

FIGS. 20A-B are views for explaining a method of determining recommended cover paper;

FIGS. 21A-B are views showing an example of a "paper type setting" window displayed on a client PC/client PC;

FIGS. 22A-1 and 22A-2 are views showing a case wherein the number of pages is set to 250 pages in a "number of pages of entry file" edit box in the window setting shown in FIG. 21B;

FIGS. 22B-1 and 22B-2 are views showing a window when the number of pages is set to 500 pages in the "number of pages of entry file" edit box from the window in FIGS. 22A-1 and 22A-2;

FIGS. 22C-1 and 22C-2 are views showing a window when the number of pages is set to 500 pages in the "number of pages of entry file" edit box and grayed-out plain paper which is not recommended paper is selected;

FIGS. 24A-1 and 24A-2 are views showing a window when the main body paper type is set to thick paper of 106 g/m$^2$ in a "main body paper type" selection box in the window setting shown in FIGS. 21A-B;

FIGS. 24B-1 and 24B-2 are views showing a window when the main body paper type is set to thick paper of 150 g/m$^2$ in the "main body paper type" selection box from the window in FIGS. 24A-1 and 24A-2;

FIGS. 24C-1 and 24C-2 are views showing a case wherein the interleave paper type is set to thick paper of 150 g/m$^2$ in an "interleave paper type" selection box from the window in FIGS. 24B-1 and 24B-2 and the tab paper type is set to thick paper of 210 g/m$^2$ in a "tab paper type" selection box;

FIGS. 24D-1 and 24D-2 are views showing a window when grayed-out thick paper of 150 g/m$^2$ which is not recommended paper is selected in the window setting of FIGS. 24C-1 and 24C-2;

FIG. 25 is a view showing an example of a "print style setting" window displayed when a "set" button is pressed in the "paper type setting" window shown in FIGS. 24C-1 and 24C-2;

FIG. 26 is a view showing an example of an "order confirmation" window in the first embodiment;

FIG. 27 is a view showing an example of a window displayed when a cover file is further input in the "entry setting" window and the "entry (start upload)" button is pressed;

FIG. 28 is a table showing an example of a table for determining recommended paper of the cover paper type;

DETAILED DESCRIPTION OF THE PREFERRED EMBODIMENTS

Preferred embodiments of the present invention will be described in detail in accordance with the accompanying drawings. The present invention is not limited by the disclosure of the embodiments and all combinations' of the features described in the embodiments are not always indispensable to solving means of the present invention.

First Embodiment

[Configuration of Overall System]

Figure 1:
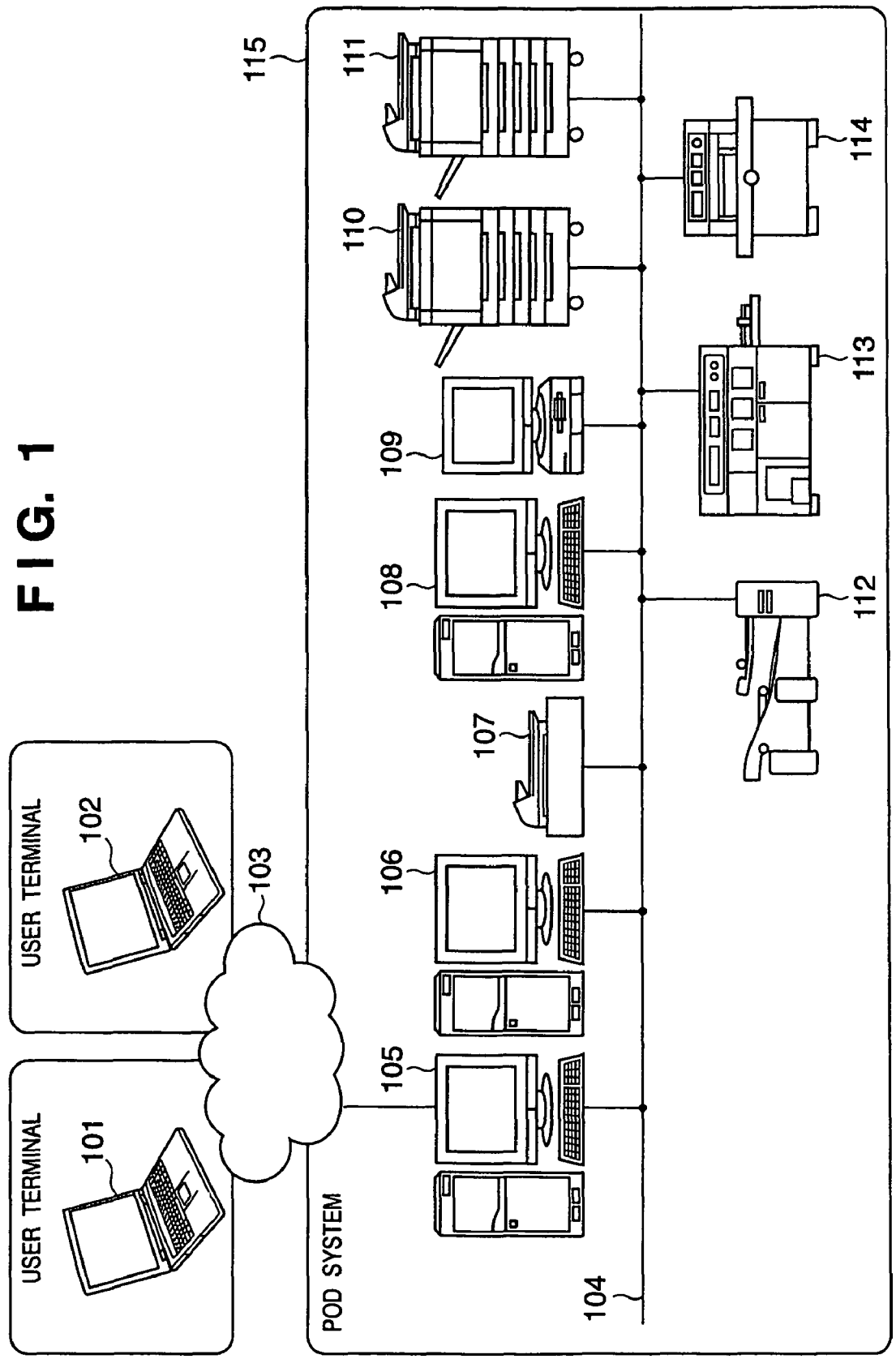
FIG. 1 is a view showing a printing processing system according to the first embodiment of the present invention.

FIG. 1 is a view showing a printing processing system according to the first embodiment of the present invention. The printing system shown in FIG. 1 is configured by one or a plurality of user terminals (user terminals 101 and 102 in the first embodiment), and a POD (Print On Demand) system 115 connected via Internet 103.

An orderer who orders a printing service to the POD system 115 can use the user terminal (client PC) 101 or 102 to order a printing service.

In the POD system 115, an order intake server 105 receives a printing service order from a user terminal via the Internet 103, and receives printing job data as a printing service from the user terminal. Printing job data is data associated with data of a plurality of pages which are created by specific application software in the user terminal. Printing job data is obtained by adding, to data created by application software running on the user terminal, setting information (job ticket) representing an output form in which the data is output from the POD system. The output form includes, e.g., the binding type, color mode, and paper type. Printing job data which is received by the order intake server 105 from the user terminal 101 or 102 is managed by an ID number issued by the order intake server 105. The order intake server 105 comprises a web server function, and has a function of transmitting data to be displayed on a web browser to the web browser running on the user terminal 101 or 102 via the Internet 103.

A file server 106 saves and manages printing job data received by the order intake server 105 via the Internet 103.

The file server 106 saves information (e.g., sheet thickness, sheet weight per unit area, sheet strength, and sheet glossiness) on a sheet (medium) available in an MFP (Multi Function Peripheral) 110 and an MFP 111.

A printing server 108 saves image data read by a scanner device (e.g., a scanner 107/MFP 110/MFP 111) which reads a document as image data. The printing server 108 executes correction (shift correction in the reading direction or removal of noise (black spot)) for read image data, and merges a plurality of printing job data saved in the file server 106 and image data read by the scanner 107 or the like.

The printing server 108, a client PC 109, the scanner 107, and the MFPs 110 and 111 are connected by a network 104 such as a LAN, and can transfer data between them and transmit/receive control commands.

In the printing processing system shown in FIG. 1, a paper folding device 112 has a function of folding a plurality of paper sheets output from the MFP 110 or 111.

A case binding device 113 has a function of gluing a sheet serving as a cover to a plurality of sheets to be bound and binding the sheets.

A sheet cutting device 114 cuts a plurality of sheets bound by gluing a cover by the case binding device 113.

[Peripheral Configuration of MFP]

Figure 2:
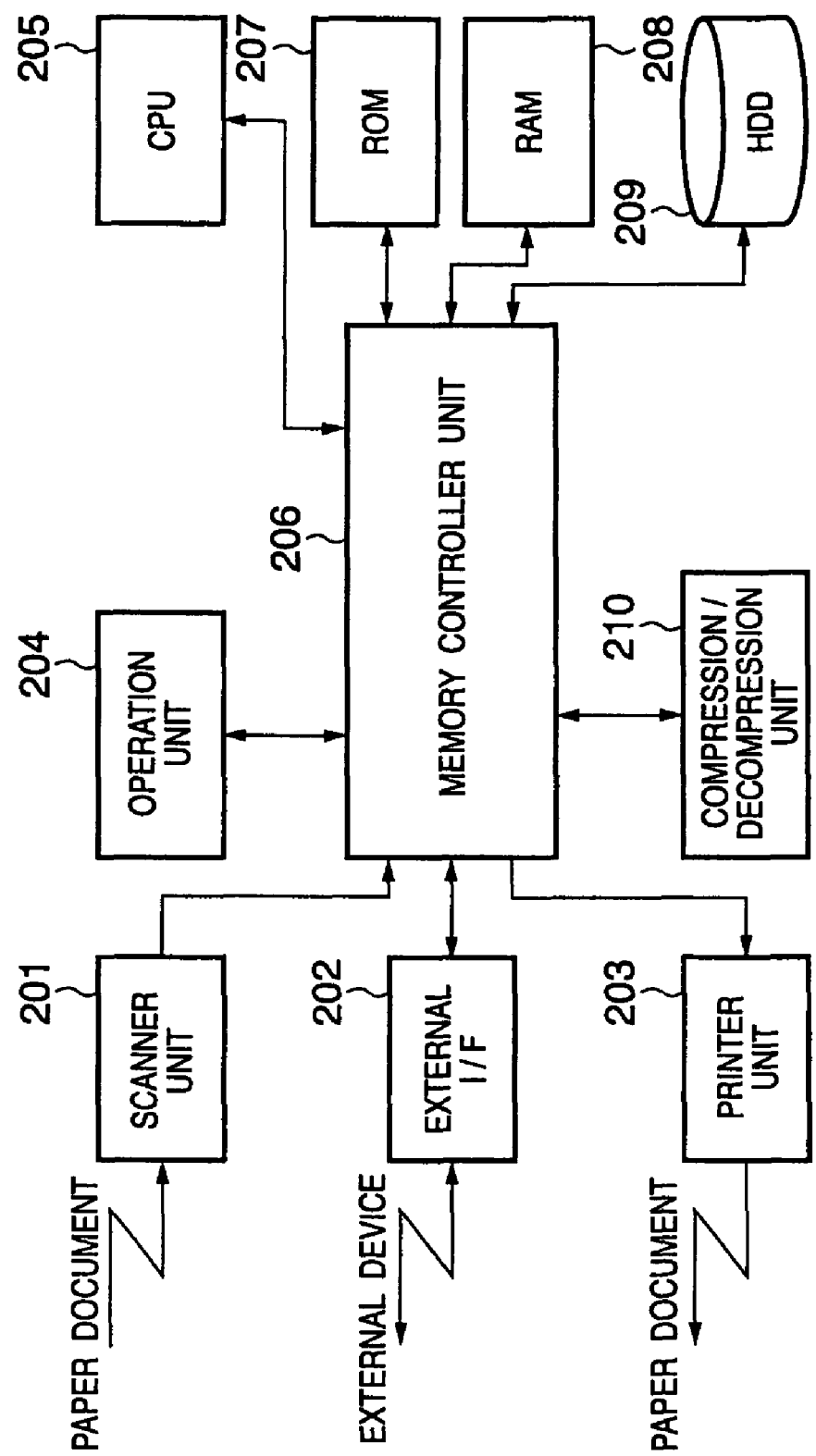
FIG. 2 is a block diagram showing the configuration of an MFP.

The MFP will be explained. FIG. 2 is a block diagram showing the configurations of the MFPs 110 and 111. Each of the MFPs 110 and 111 according to the first embodiment comprises a memory such as a hard disk 209 capable of storing a plurality of job data. Each of the MFPs 110 and 111 has a copying function and printing function. The copying function is to store job data input from a scanner unit 201 in the hard disk 209 or the like and print the job data by a printer unit 203. The printing function is to store job data input via an external I/F 202 in the hard disk 209 or the like and print the job data by the printer unit 203.

As shown in FIG. 2, the MFP comprises the scanner unit 201, external I/F 202, and printer unit 203. The scanner unit 201 reads the image of a paper document or the like and processes the read image data. The external I/F 202 transmits/receives image data and the like to/from an external apparatus. The printer unit 203 forms an image on a sheet on the basis of job data stored in the hard disk 209 or the like.

The MFP further comprises an operation unit 204 which allows selecting various process functions of the MFP and inputting various instructions.

The MFP further comprises a CPU 205 which operates on the basis of a program loaded into a ROM 207. The ROM 207 of the MFP stores a program for executing an operation of interpreting PDL (Page Description Language) code data received from an external apparatus (e.g., the client PC 109) via the external I/F 202 and expanding the PDL code data into raster image data. This program is executed by the CPU 205.

A memory controller unit 206 of the MFP controls access to the ROM 207, a RAM 208, and the hard disk 209.

The ROM 207 is a read-only memory which stores a program for initializing various functions of the MFP, font information, and the like. The RAM 208 is a random access memory which stores image data, various programs, and setting information sent from the scanner unit 201 and external I/F 202 via the memory controller unit 206. The hard disk 209 is a large-capacity storage device which stores image data compressed by a compression/decompression unit 210.

The compression/decompression unit 210 compresses/decompresses image data stored in the RAM 208 and hard disk 209 in accordance with various compression methods such as JBIG and JPEG.

[Configuration of MFP]

Figure 3:
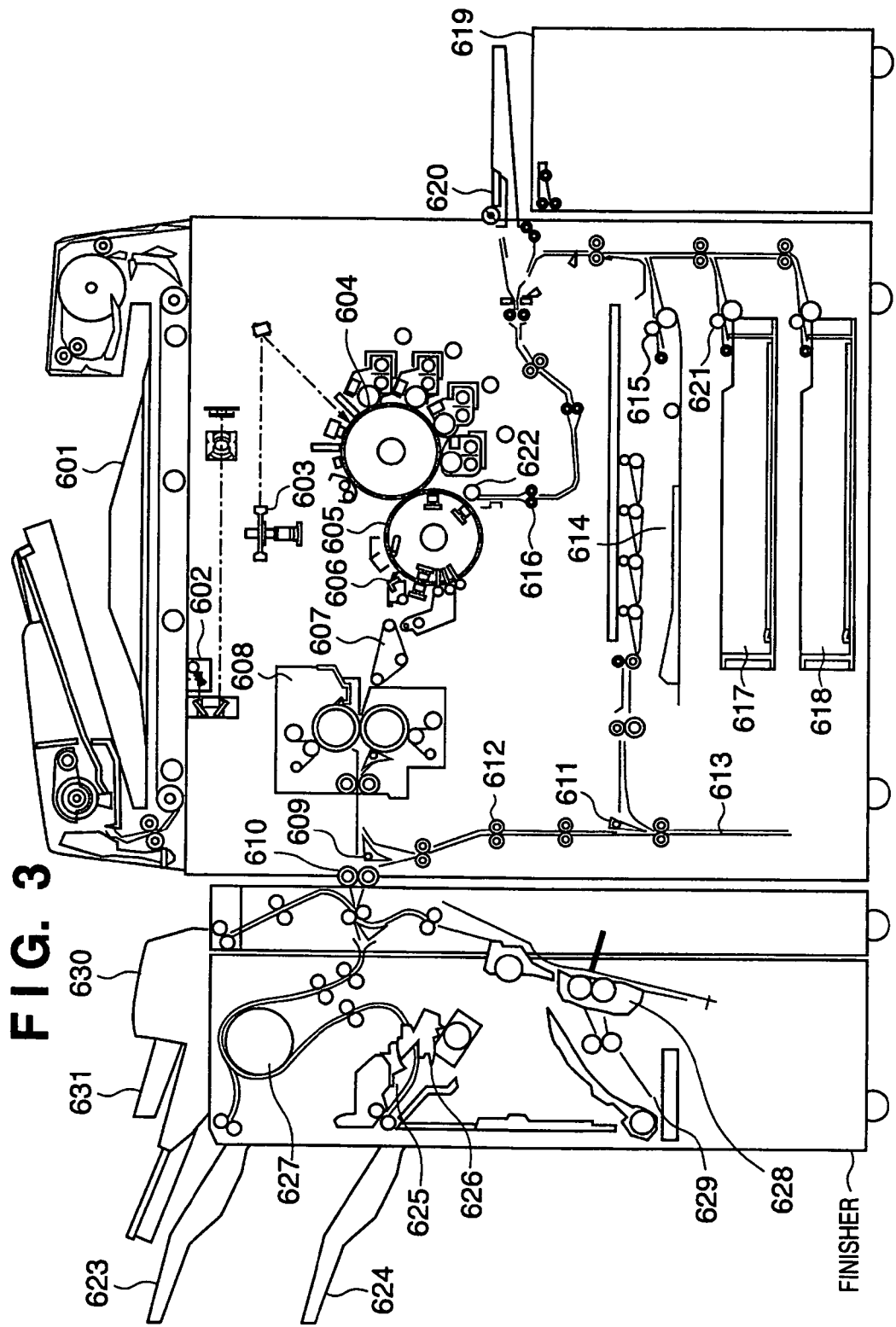
FIG. 3 is a sectional view showing the configuration of the MFP.

FIG. 3 is a sectional view showing the configuration of the MFP.

In FIG. 3, an ADF (Automatic Document Feeder) 601 sequentially separates one by one a bundle of document sheets set on the support surface of a document tray, and conveys the document sheet to a glass document table in order to scan the document by a scanner 602. The scanner 602 reads a document image conveyed onto the glass document table, and converts the read image into image data by a CCD. A beam (e.g., a laser beam) modulated in accordance with the converted image data emerges from a polygon mirror 603, and a photosensitive drum 604 is irradiated with a reflected scanning beam via a reflecting mirror.

A latent image formed with a laser beam which irradiates the photosensitive drum 604 as a reflected scanning beam is developed by toner, and the toner image is transferred onto a sheet material wound around a transfer drum 605. The series of image formation processes is executed sequentially for yellow (Y), magenta (M), cyan (C), and black (K) toners, forming a full-color image.

After the image formation processes are repeated four times, the sheet material bearing the full-color image on the transfer drum 605 is separated by a separation gripper 606, and conveyed to a fixing unit 608 by a pre-fixing convey section 607. The fixing unit 608 is formed from a combination of rollers and a belt, and incorporates a heat source such as a halogen heater. The fixing unit 608 fuses and fixes toner on the sheet material bearing the toner image by heat and pressure.

A discharge flapper 609 can swing about the swing shaft, and defines the sheet convey direction. For example, when the discharge flapper 609 swings clockwise in FIG. 6, a sheet is conveyed straight and discharged outside the apparatus via discharge rollers 610. To the contrary, in order to form images on the two surfaces of the sheet, the discharge flapper 609 swings counterclockwise in FIG. 6 to change the course of the sheet downward, and the sheet is fed into a double-sided convey section.

The double-sided convey section is made up of a reversing flapper 611, reversing rollers 612, a reversing guide 613, and a double-sided tray 614. The reversing flapper 611 can swing about the swing shaft, and defines the sheet convey direction. First, the reversing flapper 611 swings counterclockwise in FIG. 6, and a sheet is fed into the reversing guide 613 by the reversing rollers 612. Then, while the trailing end of the sheet is clamped by the reversing rollers 612, the reversing rollers 612 temporarily stop, and the reversing flapper 611 swings clockwise in FIG. 6. The reversing rollers 612 rotate in the opposite direction, and the sheet is switched back and conveyed and guided to the double-sided tray 614 while the trailing and leading ends are exchanged.

The sheet is temporarily stacked on the double-sided tray 614, and then fed again into registration rollers 616 by refeed rollers 615. At this time, the sheet is fed while a surface opposite to the first surface in the transfer step faces the photosensitive drum. By the same processes as those described above, an image is formed on the second surface. As a result, images are formed on the two surfaces of the sheet, and the sheet is discharged outside the apparatus after the fixing step.

A feed/convey section is made up of sheet cassettes A 617 and B 618, a paper deck 619, a manual feed tray 620, a feed roller 621, and the registration rollers 616.

The sheet cassettes A 617 and B 618 and the paper deck. 619 store sheets of various sizes and various materials, and the manual feed tray 620 supports various printing media including a file material (e.g., an OHP sheet). Each of the sheet cassette A 617, sheet cassette B 618, paper deck 619, and manual feed tray 620 is equipped with the feed roller 621 to feed sheets one by one. More specifically, stacked sheets are sequentially fed one by one by a pickup roller to the convey guide while overlapping feed is prevented by a separation roller arranged in opposition to the feed roller 621.

The separation roller receives, via a torque limitter (not shown), a driving force for driving the separation roller in a direction opposite to the convey direction. When only one sheet enters a nip portion formed between the separation roller and the feed roller 621, the separation roller rotates in the convey direction following the sheet. If overlapping feed occurs, the separation roller rotates in a direction opposite to the convey direction to return an overlapping sheet and feed only one top sheet.

The fed sheet is guided along the convey guide, and conveyed to the registration rollers 616 by a plurality of convey rollers. At this time, the registration rollers 616 are still, the leading end of the sheet abuts against a nip portion formed by the pair of registration rollers 616, and the sheet forms a loop to correct skew. After that, the registration rollers 616 start rotating in synchronism with the timing when a toner image is formed on the photosensitive drum 604 in the image forming section. Then, the registration rollers 616 convey the sheet.

The sheet fed by the registration rollers 616 is electrostatically chucked on the surface of the transfer drum 605 by a chuck roller 622.

The sheet discharged from the fixing unit of the printer section enters an online finisher (when a finisher is connected). The online finisher has a sample tray 623 and stack tray 624, and the sheet is discharged by switching the sample tray 623 and stack tray 624 in accordance with the job type and the number of discharged sheets.

There are two sorting methods, and sorting can be performed by a bin sorting method of arranging a plurality of bins and distributing sheets to the respective bins, or a shift sorting method of shifting an electronic sorting function and bin (or tray) toward the front at a far portion and distributing output sheets for each job. The electronic sorting function is called "collate". If the core has a large-capacity memory, the electronic sorting function can also be supported using a so-called collate function of changing the page order and discharge order of buffered pages by using the buffer memory. A grouping function is to group sheets of each page, unlike sorting of distributing sheets for each job.

When a staple mode is set for a job to be output, it is controlled to discharge sheets onto the stack tray 624. At this time, before a sheet is discharged onto the stack tray 624, sheets are sequentially accumulated for each job in a process tray 625 in the finisher. Then, sheets are bound by a stapler 626 on the process tray 625, and the printing sheet bundle is discharged onto the stack tray 624.

A puncher 627 for punching two filing holes (or three or the like) is interposed on a path extending to the above-described two trays, and performs a punching process in accordance with the job type. When the user makes a punching process setting via the operation unit as a setting associated with a sheet process for a job to be output, the puncher 627 executes the punching process for a printing sheet of the target job. After that, the sheet is controlled to go through the apparatus and be discharged onto the discharge tray such as the stack tray 624 or sample tray 623.

A saddle stitcher 628 performs a process (binding process) of binding sheets at two center portions, clamping the center of the sheets by rollers, and folding the sheets into two to create a booklet like a brochure. Sheets bound by the saddle stitcher 628 are discharged onto a booklet tray 629. Note that whether to execute a sheet process operation such as a binding process by the saddle stitcher 628 is also based on a sheet process setting made by the user for a job to be output, as described above.

An inserter 630 feeds a sheet set on an insert tray 631 to a discharge tray such as the stack tray 624 or sample tray 623 without feeding the sheet to the printer. The inserter 630 can insert a sheet set on the inserter 630 between sheets (sheets printed by the printer section) fed to the online finisher section. Sheets are set by the user on the insert tray 631 of the inserter 630 while facing up, and sheets are sequentially fed from the top sheet by pickup rollers.

A sheet from the inserter 630 is conveyed to the stack tray 624 or sample tray 623, and discharged while facing down. When sheets are fed to the saddle stitcher 628, they are fed to the puncher side once, switched back, and fed to the saddle stitcher 628 to adjust the facing sides of the sheets. Note that whether to execute a sheet process operation such as a sheet insertion process by the inserter 630 is also based on a sheet process setting made by the user for a job to be output, as described above.

[Order Intake by Order Intake Server]

An operation of ordering a printing service from the user terminal 101 or 102 to the POD system 115 will be explained.

A user who wants to order a printing service to the POD system 115 activates a web browser in the user terminal 101 or 102, and inputs the network address (URL) of the order intake server 105 to access the order intake server 105. The order intake server 105 detects access from the user terminal 101 or 102, and then requests the user terminal 101 or 102 to input authentication information (e.g., password) for accessing the order intake server 105. If the order intake server 105 confirms input of correct authentication information (password) from the user terminal 101 or 102, it permits access from the user terminal. If the user terminal 101 or 102 is permitted by the order intake server 105 to access it, the user terminal inputs the process conditions of printing job data for which a printing service is requested, another printing request information, and the like. Accordingly, the user terminal 101 or 102 can send, to the order intake server 105 via the Internet 103, a document/image file to be printed by electronic data (document data) together with the process settings of data for which a printing service is requested, another printing request information, and the like. In this manner, the user terminal 101 or 102 can transmit document data to the order intake server 105 functioning as a web server.

Note that when the user requests a printing service of the POD system 115, he may separately send a printed document itself by a home delivery service or the like instead of transmitting electronic data to the order intake server 105. In this case, the user inputs, from the web browser running on the user terminal 101 or 102, only printing service request information and printing condition settings which designate printing conditions under which a printing service is executed, and transmits the information to the order intake server 105. The operator of the POD system 115 determines the relationship between the separately sent document subjected to the printing service, and the printing condition settings, printing service request information, and the like that are sent to the order intake server 105.

[Configuration of Order Intake Server]

Figure 4:
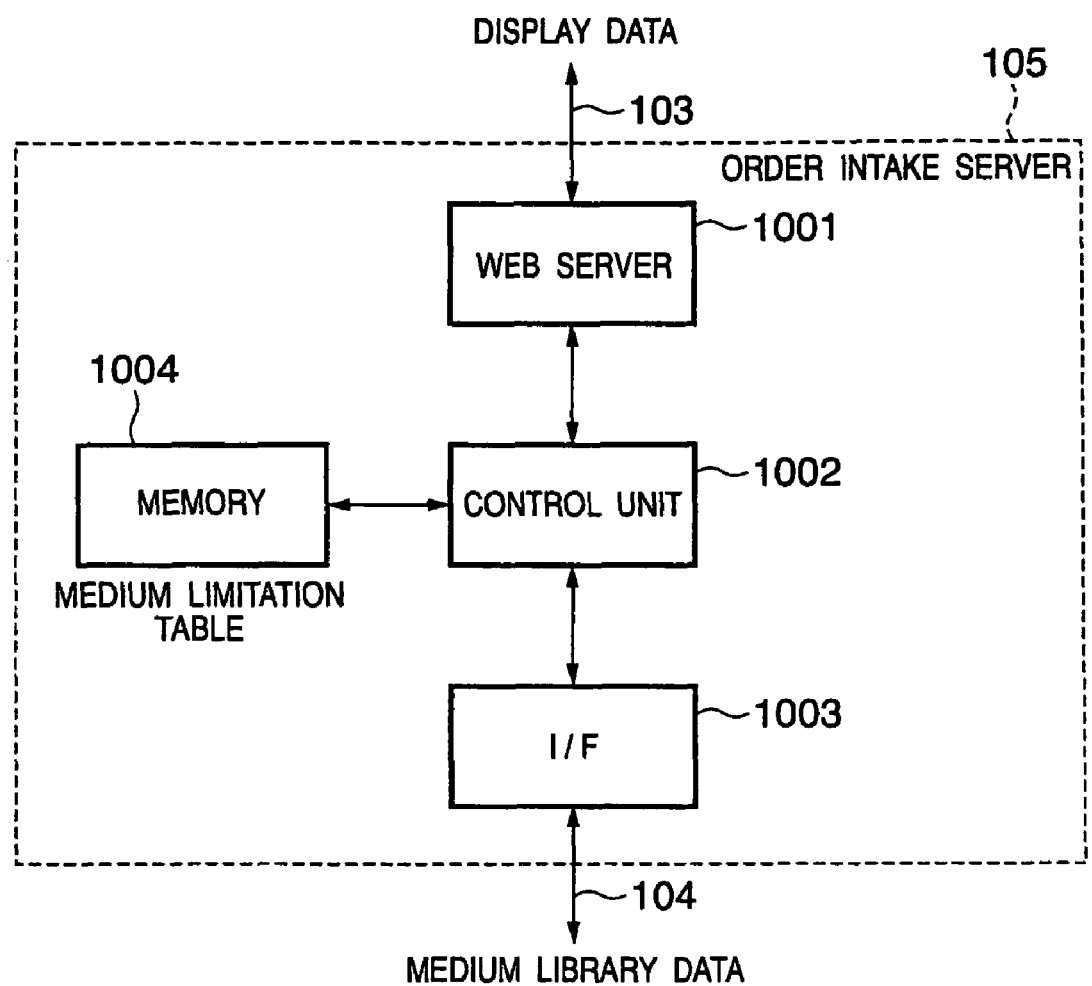
FIG. 4 is a block diagram showing the configuration of an order intake server in a POD system.

FIG. 4 is a block diagram showing the configuration of the order intake server 105 in the POD system 115. As shown in FIG. 4, the order intake server 105 comprises a web server 1001, control unit 1002, interface (I/F) 1003, and memory 1004.

The web server 1001 provides a web page browsing service to the user terminals 101 and 102 and the like connected via the Internet 103, and stores browsing page data which allows the user to order a printing service. The control unit 1002 controls the order intake server 105, and transmits a web page from the web server 1001. In addition, the control unit 1002 transmits order intake data input to the web server 1001 via the Internet 103 to the LAN 104 or the like. Further, the control unit 1002 reads, via the network 104 and I/F 1003, information on a paper medium that is stored in the file server 106, and writes the information in the memory 1004.

The I/F 1003 is used when the order intake server 105 transmits, via the network 104, order intake data to each device in the POD system 115 connected to the network 104. The memory 1004 stores order intake data, and information on various paper media that is read from the file server 106. The memory 1004 is controlled by the control unit 1002.

[Workflow in Order Intake/Placement]

Figure 5:
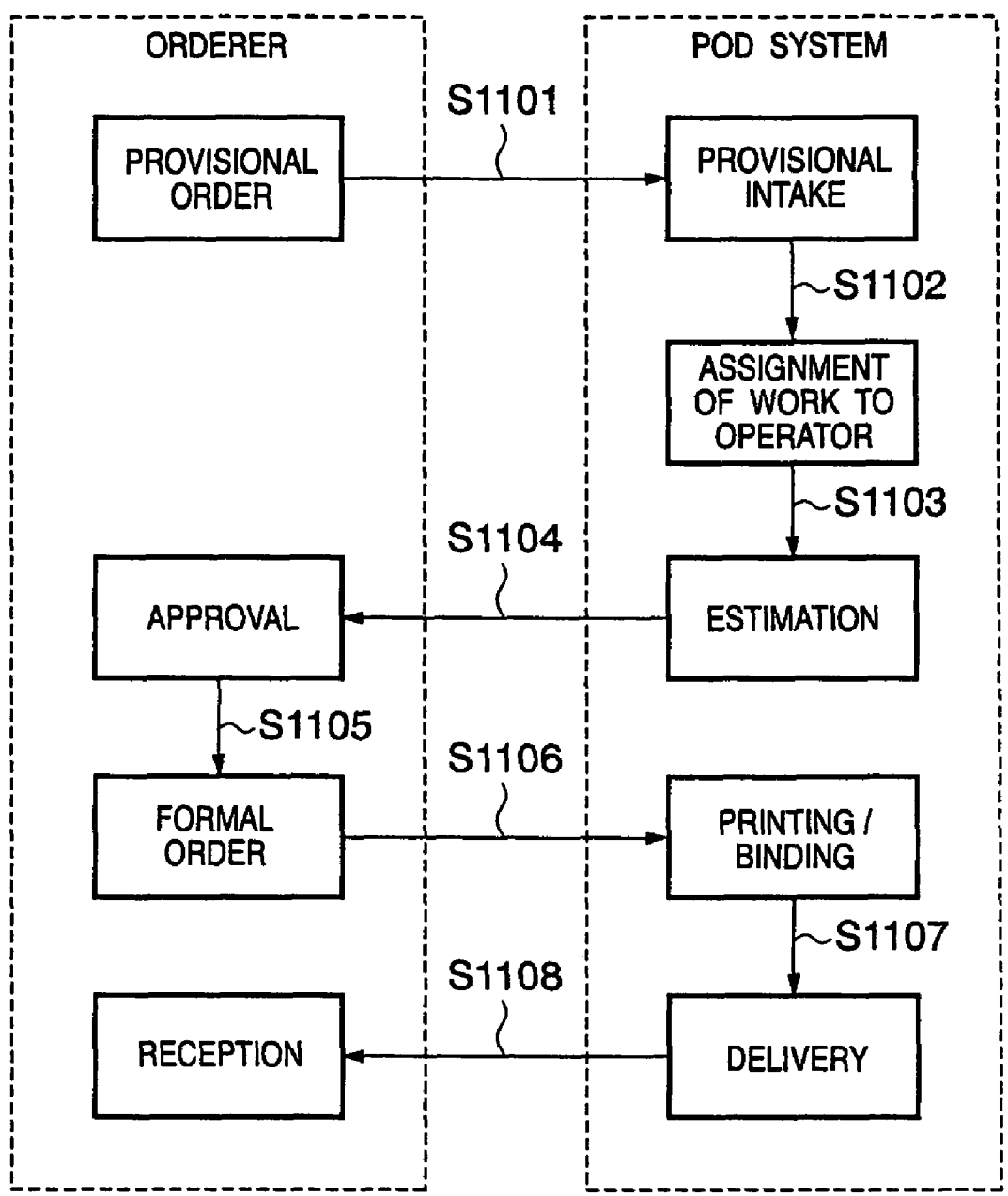
FIG. 5 is a chart showing the workflow of the POD system in receiving/placing a printing service order from the user.

FIG. 5 is a chart showing the workflow of the POD system in receiving/placing a printing service order from the user. The left block in FIG. 5 shows the work of an orderer who is a user using a printing service, and the right block shows the work of the operator of the POD system 115.

The orderer accesses a web page on the Internet 103 from the user terminal 101 or 102, and places a provisional order to the order intake server 105 in the POD system 115 (S1101). For example, when the service to be ordered is a printing service, the orderer performs user authentication from the web browser of the user terminal 101 or 102 to the order intake server 105. The orderer inputs, e.g., printing service request information and printing condition settings which designate printing conditions under which data is output. The user terminal 101 or 102 can send, to the order intake server 105 via the Internet 103, document data or an image file to be printed as electronic data together with the printing condition settings, printing service request information, and the like. In this manner, the printing service can be provisionally ordered for the order intake server 105 functioning as a web server.

When the printing service to be ordered is a copy job of reading a paper document by the scanner of the POD system 115 or the like and copying the document, the user terminal 101 or 102 does not send any document/image file as electronic data to the order intake server 105. Instead, a paper document to be copied is separately sent by a home delivery service or the like. The orderer inputs, from the web browser of the user terminal 101 or 102, only copying service request information and copying condition settings which designate copying conditions under which data is output. In this case, the operator of the POD system 115 determines the relationship between the separately sent paper document to be copied, and the copy condition settings, copying service request information, and the like that are sent to the order intake server 105.

Upon intake of the provisional order from the orderer, the order intake server 105 of the POD system 115 executes a provisional intake process (e.g., acceptance and save) for the provisionally received printing service order (S1102). The order intake server 105 or MIS server executes assignment of work to the operator (S1103). As a method of assigning work to the operator, a person in charge of work may be automatically assigned by the scheduler of the order intake server 105, or the administrator for operators may manually assign an appropriate person in charge of work. Alternatively, a person in charge of work may be manually assigned by performing a provisionally received job by each operator.

The order intake server 105 or MIS server of the POD system 115 estimates the cost of the provisionally received printing service order (S1104). In estimation, a cost based on the estimate of costs of work and resources necessary for the copying service, and expenses such as the delivery fee is calculated, and the estimated amount is presented to the orderer.

Upon presentation of the estimated amount, the orderer obtains an approval from the administrator (S1105), and places a formal order to the order intake server 105 of the POD system 115 (S1106). At this time, the printing conditions and copying conditions of the provisionally ordered job and the like can also be changed in the formal order.

Upon intake of the formal order from the orderer, the order intake server 105 of the POD system 115 executes various processes such as printing and binding for the formally received printing service order by using process management, and pre-press, digital printing, and post-press processes (S1107). After the end of various processes such as printing and binding on the POD site, the order intake server 105 delivers a final product (printed product) to a delivery destination designated in advance by the orderer (S1108). As a result, the orderer receives the final product (printed product).

[Setting Window of Order Intake/Placement Management Application]

In the first embodiment, an order intake/placement management application is used to receive/place a printing service order from the user terminal 101 or 102 to the order intake server 105 via a communication medium such as the Internet.

Figure 6:
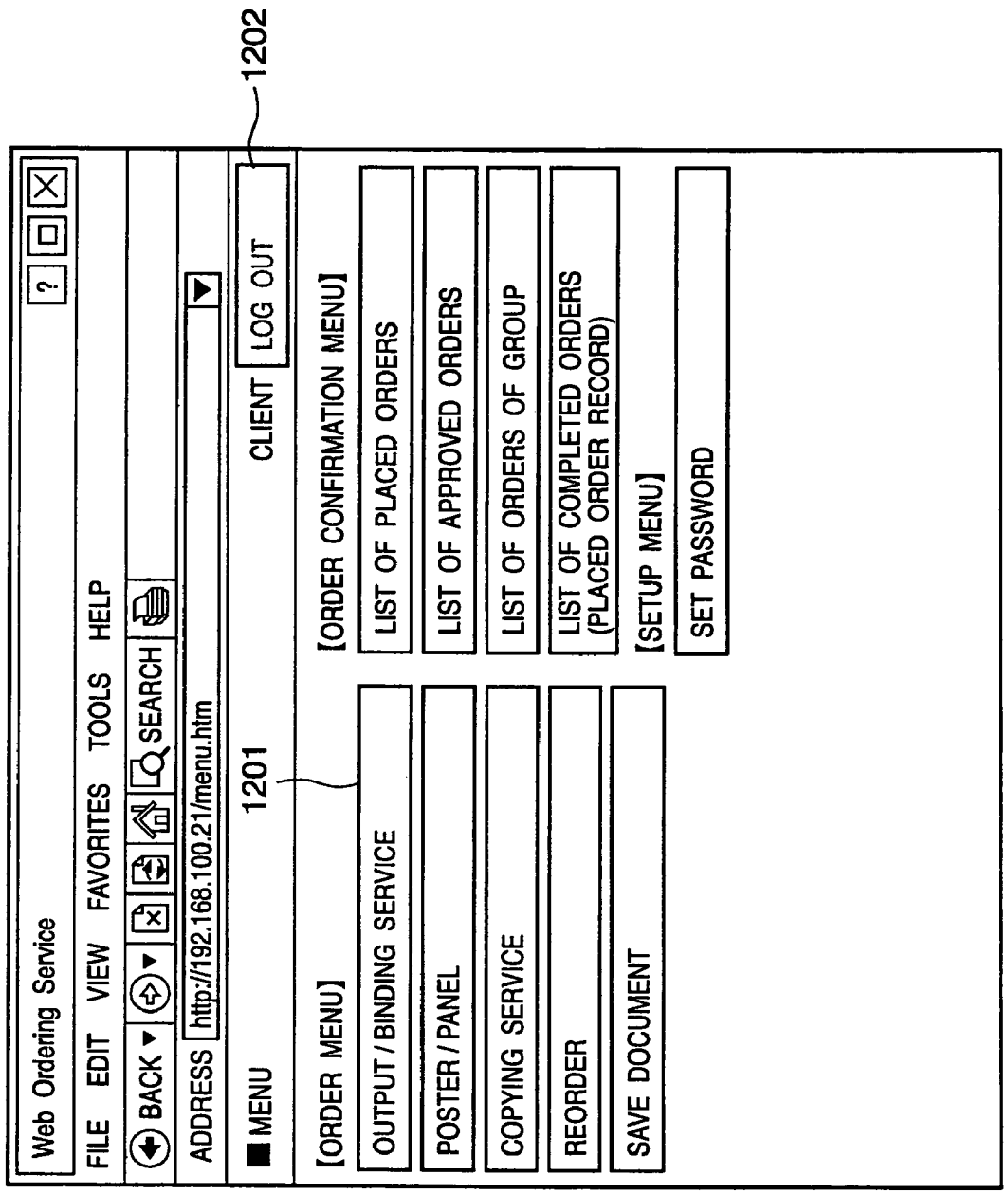
FIG. 6 is a view showing the window of an order intake/placement management application for receiving/placing a printing service order.

FIG. 6 is a view showing the menu window of the order intake/placement management application for receiving/placing a printing service order. The menu window of the order intake/placement management application is displayed on the display of the user terminal via the web browser when the order intake/placement management application is logged in to receive/place a printing service order from the user terminal via the Internet or the like. In the following description, various data are transmitted to the web server 1001 of the order intake server 105 via the web browser of the web server 1001 or 102. The orderer (user) transmits various data to the user terminal 101 by operating the web browser with a pointing device (e.g., mouse) attached to the user terminals 101 and 102.

In the example of FIG. 6, an IP address "192.168.100.21" is input as the URL address of the web browser. However, the server name may be input instead of the IP address in an environment where the DNS (Domain Name System: a system which provides a service of specifying an IP address from a host name on a TCP/IP network such as the Internet) is supported.

The menu window of the order intake/placement management application includes three menus "order menu", "order confirmation menu", and "setup menu". The "order menu" allows the orderer to make a print order request. The "order confirmation menu" allows the orderer to confirm the contents of an order and approval executed in the order intake/placement management application. The "setup menu" allows the orderer to maintain information held in the order intake server.

The name of a "client" identified by a log-in name may be displayed at an upper portion in the menu window of the order intake/placement management application. Further, as shown in FIG. 6, a "log out" button 1202 for logging out from the order intake/placement management application is arranged at an upper portion in the menu window of the order intake/placement management application.

In the "order menu", the following menu buttons are arranged. An "output/binding service" button 1201 is used to request a printing service of printing a document from electronic data (document data) and performing a binding process. A "poster/panel" button is used to request a printing service of printing a poster or the like from electronic data and performing a panel process. A "copying service" button is used to request a printing service of printing (copying) a paper document and performing a binding process or the like. A "reorder" button is used to request again these three printing services which have been requested before by the orderer. A "save document" button is used to request a printing service of printing a fixed-form manual or the like saved in advance in the file server 106 of the POD system 115 or the like.

In the "order confirmation menu", the following menu buttons are arranged. A "list of placed orders" button is a menu button which allows the orderer to confirm a list of placed orders for a printing service requested from the order intake/placement management application. A "list of approved orders" button is a menu button which allows the orderer to confirm a list of approved orders upon approval executed by the user in the order intake/placement management application. A "list of orders of group" button is a menu button which allows the orderer to confirm a list of orders executed in the order intake/placement management application by a user group to which the orderer belongs. A "list of completed orders (placed order record)" button is a menu button which allows the orderer to confirm, as the past placed order record, a list of orders completed in the order intake/placement management application.

In the "setup menu", a "set password" button is arranged. The "set password" button is a menu button which allows the orderer to set a password for logging in to the order intake/placement management application.

Figure 7:
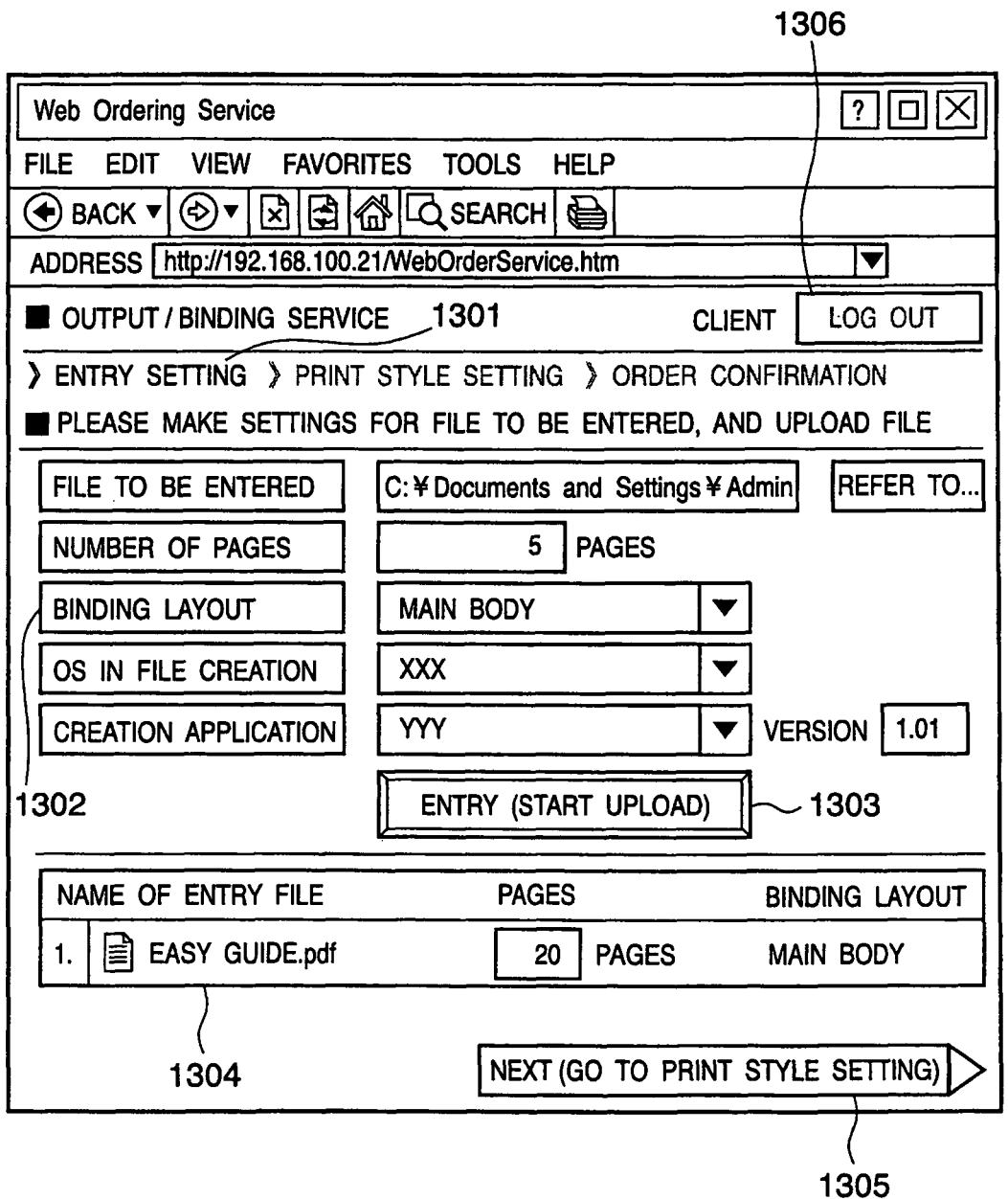
FIG. 7 is a view showing an example of a setting window layout for an output/binding service in a received/placed order.

FIG. 7 is a view showing an example of a setting window layout for the output/binding service in a received/placed order. The window shown in FIG. 7 is a setting window displayed when the "output/binding service" button in FIG. 6 is pressed. In the example of FIG. 11, an IP address "192.168.100.21" is input as the URL address of the web browser. However, the server name may be input instead of the IP address in an environment where the DNS (Domain Name System: a system which provides a service of specifying an IP address from a host name on a TCP/IP network such as the Internet) is supported.

The name of a "client" identified by the log-in name to the user terminal 101 or 102 as a user who requests a printing service may be displayed at an upper portion in FIG. 7. A "log out" button 1306 for logging out from the order intake/placement management application is arranged. Window transition of, e.g., "entry setting", "print style setting", and "order confirmation" is displayed in a window transition display box 1301 below the "log out" button 1306. FIG. 7 shows an "entry setting" window.

The reference path of a file to be entered is set in a "file to be entered" edit box. By pressing the "refer to" button, the orderer can designate a file saved in the hard disk of the user terminal 101 or 102 while referring to the local directory of the user terminal 101 or 102 used by the orderer. With this operation, the reference path of a file (document data) to be entered for a printing service can be designated. The number of pages of a file to be entered is set in a "number of pages" edit box. Note that the number of pages may be automatically calculated and set from an entered file by the user terminal 101 or 102.

It is selected in a "binding layout" pull-down list box 1302 whether a file to be entered is data of a main body, data of a cover, or data of a main body and cover in binding printing. An OS under which a file to be entered was created is selected in an "OS in file creation" pull-down list box. An application which created a file to be entered is selected in a "creation application" pull-down list box. The version of the application which created a file to be entered is selected in a "version" edit box.

After the end of the above-described settings, an "entry (start upload)" button 1303 is pressed to start uploading a file to be entered. The "entry file name" and "number of pages" of the entry file uploaded into the order intake server 105 are displayed in a list box 1304. A "next (go to print style setting)" button 1305 is used to shift to the next "print style setting" window.

FIG. 8 is a view showing an example of a setting window layout for setting the print style of the output/binding service. As shown in FIG. 8, a window transition display box 1401 displays window transition of, e.g., "entry setting", "print style setting", and "order confirmation". FIG. 8 shows a "print style setting" window.

In "entry file", the name of an entered file is displayed in an "entry file name" display box 1402. In addition, the number of pages of the entered file is displayed in a "number of pages" edit box 1403, and the number of pages of the file can be changed. The layout of the entered file in binding printing is displayed in a "binding layout" display box 1404.

In "print style", the following items can be changed. The output paper size of a printing device is selected in a "finished size" pull-down list box 1405. In "document adjustment", whether to enlarge/reduce data in accordance with an output paper size designated in the "finished size" pull-down list box 1405 is designated in an "enlarge/reduce in accordance with the finished size" check box 1406. The output paper orientation (e.g., "portrait" or "landscape") of the printing device is selected with an "orientation of output paper" radio button 1407.

In "print style", the type of binding executed by the finisher of the printing device is selected in a "binding type" pull-down list box 1408. FIG. 9 is a view showing an example of selecting the "binding type" pull-down list box 1408 and displaying a pull-down list of binding types. In the first embodiment, one of binding types such as "no binding", "case binding", "saddle stitch binding", and "binder stitch binding" is selected using the "binding type" pull-down list box 1408 shown in FIG. 9. FIG. 9 shows an example of selecting case binding from these binding types.

Figure 10:
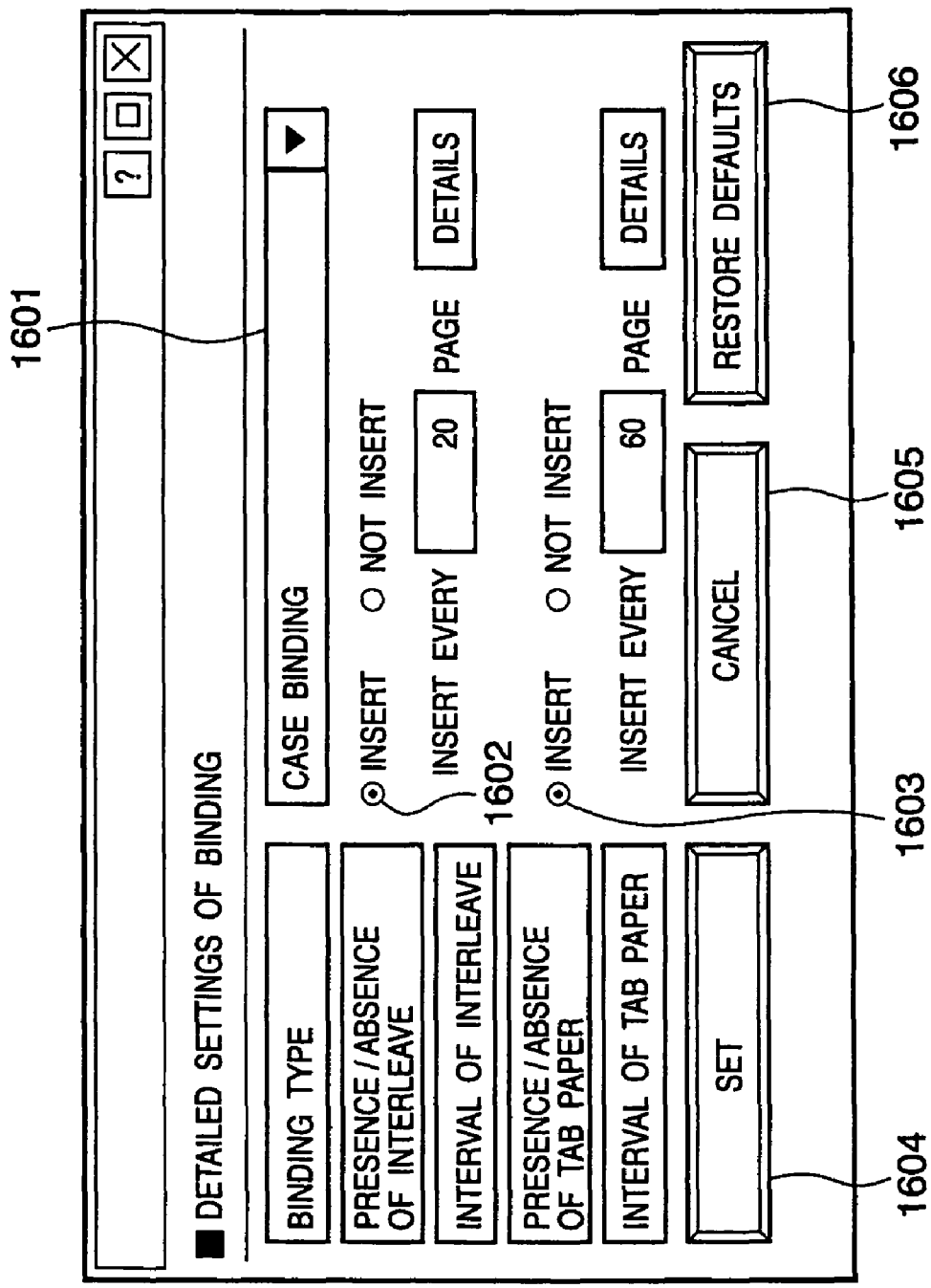
FIG. 10 is a view showing an example of a "detailed settings of binding" window which pops up and is displayed in the "print style setting" window shown in FIG. 8.

When case binding is selected, a "detailed settings of binding" window shown in FIG. 10 pops up and is displayed in the "print style setting" window. FIG. 10 is a view showing an example of the "detailed settings of binding" window which pops up and is displayed in the "print style setting" window shown in FIG. 8.

In FIG. 10, a "binding type" pull-down list box 1601 displays a binding type selected in the "binding type" pull-down list box 1408. To change the selected binding type to another one, a binding type is selected again in the "binding type" pull-down list box 1601.

A setting to "insert" or "not insert" an interleave into the main body of a binding printing product is selected with a "presence/absence of interleave" radio button 1602. In "interval of interleave", the number of pages is input when interleaves are inserted into the main body at predetermined page intervals. To edit the page interval in more detail for each inserted interleave, a "details" button is pressed.

A setting to "insert" or "not insert" tab paper into the main body of a binding printing product is selected with a "presence/absence of tab paper." radio button 1603. In "interval of tab paper", the number of pages is input when tab paper sheets are inserted into the main body at predetermined page intervals. To edit the page interval in more detail for each inserted tab paper, a "details" button is pressed.

When detailed settings are free from any problem, a "set" button 1604 is pressed to complete the detailed settings of binding and close the "detailed settings of binding" window in FIG. 10. To cancel detailed settings of binding, a "cancel" button 1605 is pressed to cancel the binding settings and close the "detailed settings of binding" window in FIG. 10. To restore values input to the above-described detailed settings to default values, a "restore defaults" button 1606 is pressed.

Referring back to the description of the "print style setting" window shown in FIG. 8, a binding location such as "left", "right", "top", or "other" is selected with a "binding location" radio button 1409. A printing method such as "single-sided" or "double-sided" is selected with a "print" radio button 1410. A color mode such as "color" or "monochrome" is selected with a "color mode" radio button 1411.

The paper type of the printing device or that of the main body in binding printing is selected in a "paper type (main body)" pull-down list box 1412. The paper type of an interleave in binding printing by the printing device is selected in a "paper type (interleave)" pull-down list box 1413. Note that the paper type in the first embodiment does not include the paper size. More specifically, the paper type is at least one of the paper material, paper thickness, or paper weight per unit area (to be described later). "No setting" is automatically set when "no binding" is selected in the "binding type" pull-down list box 1408 or "not insert" is selected with the "presence/absence of interleave" radio button 1602 in the "detailed settings of binding" window of FIG. 8.

The paper type of tab paper in binding printing by the printing device is selected in a "paper type (tab paper)" pull-down list box 1414. "No setting" is automatically set when "no binding" or "saddle stitch binding" is selected in the "binding type" pull-down list box 1408. "No setting" is automatically set when "not insert" is selected with the "presence/absence of tab paper" radio button 1603 in the "detailed settings of binding" window of FIG. 8.

The paper type of a cover in binding printing by the printing device is selected in a "paper type (cover)" pull-down list box 1415. "No setting" is automatically set when "no binding" or "binder stitch binding" is selected in the "binding type" pull-down list box 1408. A "return (go to entry setting)" button 1416 is used to return to the previous "entry setting" window in window transition of, e.g., "entry setting", "print style setting", and "order confirmation". A "next (go to order confirmation)" button 1417 is used to shift to the next "order confirmation" window.

FIG. 11 is a view showing an example of a window layout for confirming the contents of an order and placing the order in the output/binding service. A window transition display box 1701 displays window transition of, e.g., "entry setting", "print style setting", and "order confirmation". FIG. 11 shows an "order confirmation" window. An "entry setting information" display box 1702 displays a list of pieces of file information which form an order, such as "entry file name", "number of pages", "pages used", "binding layout", "OS", and "creation application".

A "print style information" display box 1703 displays pieces of print style information of an order, such as "color mode", "finished size", "orientation of output paper", "document adjustment", "binding type", and "paper type". The "paper type" includes information on the main body, interleave, tab paper, cover, and the like. A "memo" edit box 1704 displays a memo about an order that is described by the orderer.

After the end of confirming the set contents, a "place an order" button 1705 is pressed to start ordering in accordance with the set contents. When a "cancel" button 1706 is pressed, the set contents are canceled, and the window returns to the menu window in FIG. 6. In FIG. 11, a "return (go to print style setting)" button 1707 is used to return to the previous "print style setting" window.

[Example of Case Binding Output]

An example of an output in case binding printing will be explained.

Figure 12:
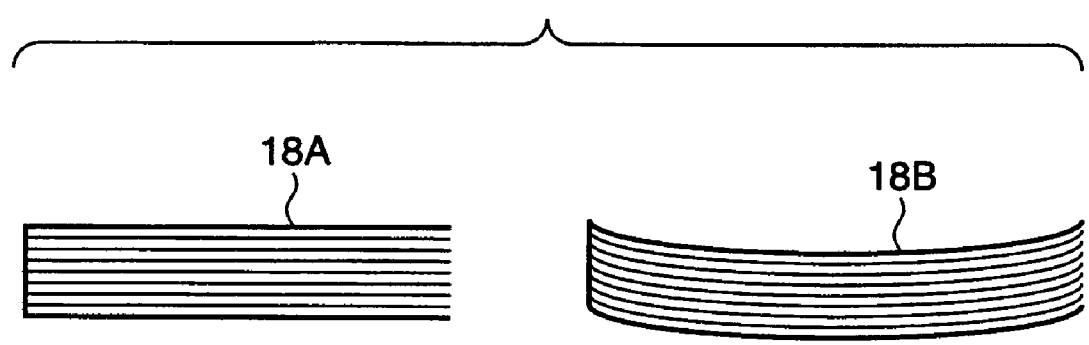
FIG. 12 is a view showing an example of a printout when a printing apparatus generates a booklet or the like at case binding printing settings.

FIG. 12 is a view showing an example of a printout when the printing apparatus generates a booklet or the like at case binding printing settings. In FIG. 12, 18A shows a case wherein a whole booklet is normally output without bending. The booklet can be output without bending and deformation if the cover medium has a strength enough to resist bending upon covering with respect to the type of the medium (paper medium) of the main body and the thickness (number of media).

Also, 18B shows a case wherein a booklet bends and is output. If the cover medium does not have a strength enough to resist bending upon covering with respect to the type of the medium (paper medium) of the main body and the thickness (number of media), the booklet bends as a poor appearance output result, and may become unmarketable.

[Cover Medium Selection Sequence in Binding Using Order Intake/Placement Management Application]

A cover medium selection sequence in binding printing in the first embodiment will be explained with reference to an actual order intake/placement management application window displayed on the screen of the user terminal 101 or 102.

Figure 13A:
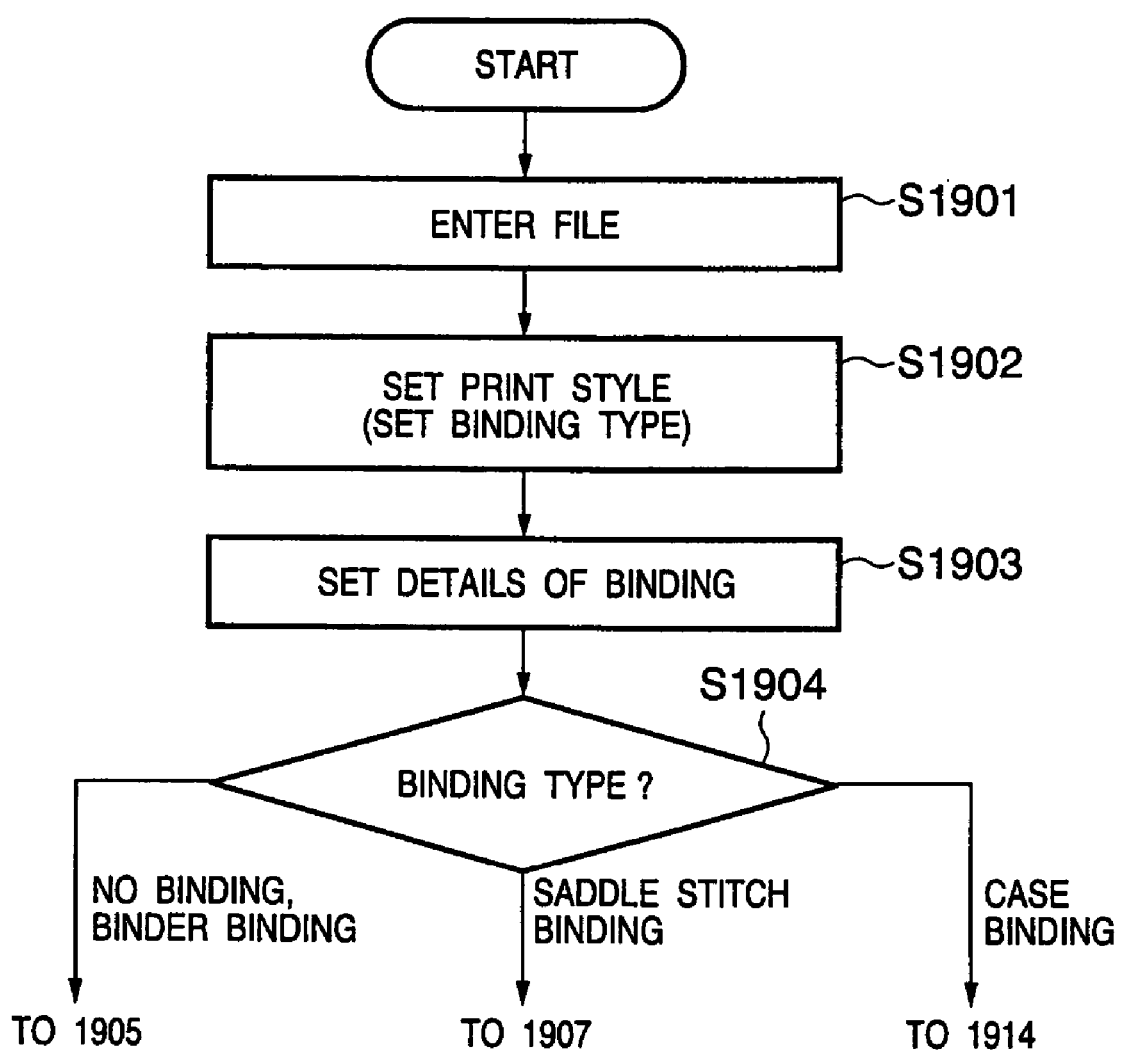
Figure 13B:
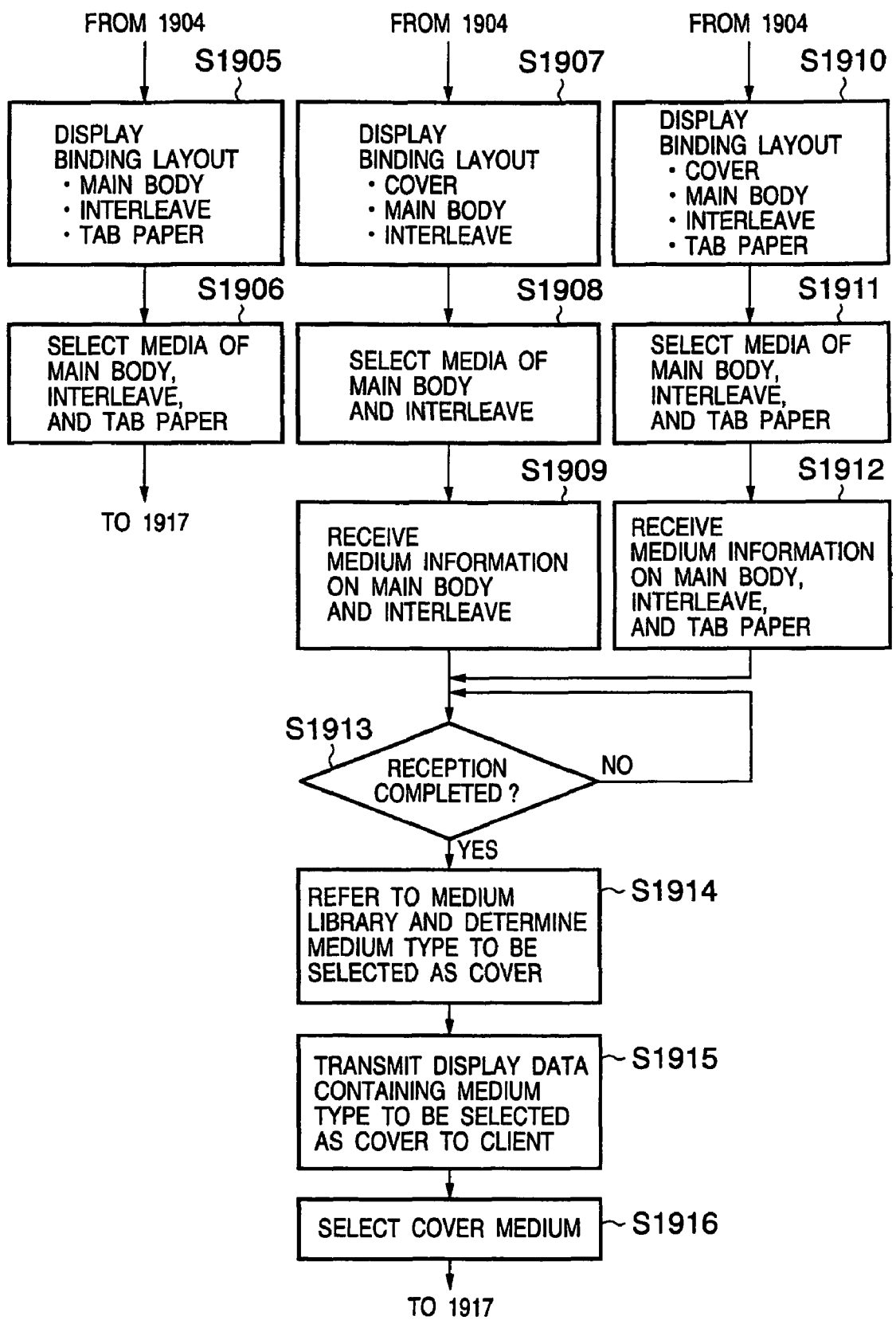

FIGS. 13A, 13B, and 13C are flowcharts for explaining a paper type selection sequence in binding printing in the first embodiment.

The orderer enters a file (document data) subjected to binding printing (step S1901). In step S1901, the orderer presses the "output/binding service" button 1201 of the menu window of the order intake/placement management application in FIG. 6 that is displayed on the web browser of the user terminal 101 or 102. The user terminal 101 or 102 advances to a setting window for the output/binding service to display an "entry setting" window via the web browser.

The orderer inputs the reference path of a file to be entered in the "file to be entered" edit box, and presses the "entry (start upload)" button 1303. Then, the designated file is uploaded to the order intake server 105 to display "entry file name" and "number of pages" in the list box 1304. FIG. 14 is a view showing an example of an "entry setting" window displayed when the "entry (start upload)" button 1303 is pressed. If the orderer confirms the set contents and does not find any problem, he presses the "next (go to print style setting)" button 1305 to shift to the next "print style setting" window.

The orderer sets a print style including the setting of the binding type in the "print style setting" window (step S1902). FIG. 15 is a view showing an example of the "print style setting" window in the first embodiment. An example of selecting case binding as the binding type will be explained.

If a pull-down button beside the "binding type" pull-down list box 1408 is pressed, a pull-down list of binding types is displayed to select case binding. FIG. 16 is a view showing an example of displaying a pull-down list of binding types in the window shown in FIG. 15.

Figure 17:
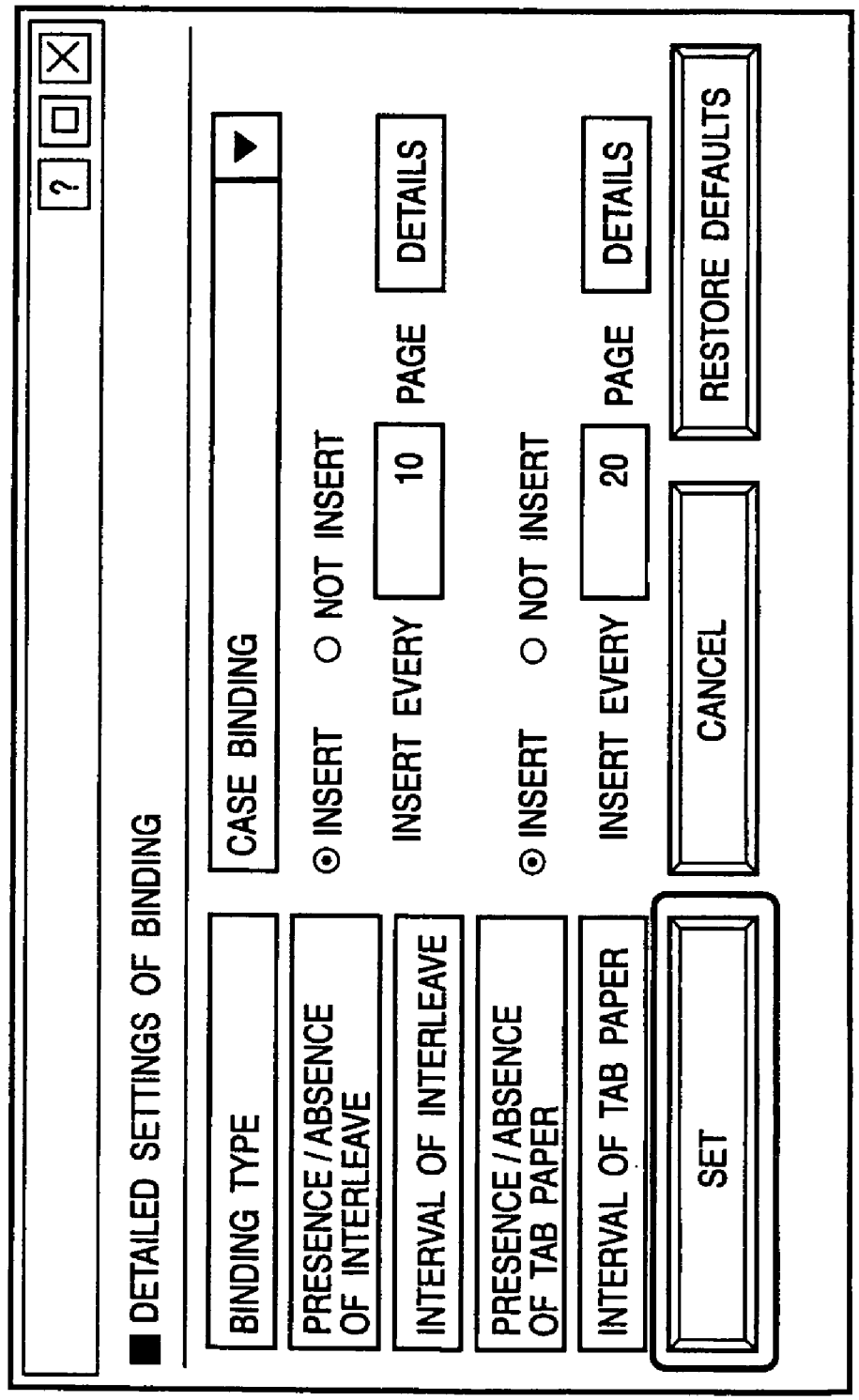
FIG. 17 is a view showing an example of a "detailed settings of binding" window in the first embodiment.

Details of binding are set (step S1903). If a binding type is selected in the "binding type" pull-down list box 1408, a "detailed settings of binding" window as shown in FIG. 17 is displayed. FIG. 17 is a view showing an example of the "detailed settings of binding" window in the first embodiment. The first embodiment will describe an example of inserting both an interleave and tab paper. For this purpose, the "insert" radio button is selected with the "presence/absence of interleave" radio button 1602 and the "presence/absence of tab paper" radio button 1603. If the set contents are free from any problem, the "set" button 1604 is pressed, and the flow shifts to step S1904.

In step S1904, the printing apparatus controls to switch, in accordance with the set binding type, the layout of display data for prompting the orderer to select the paper types of the cover, main body, interleave, and tab paper. The order intake server 105 receives the setting information of the orderer via the web server 1001. The control unit 1002 switches the window to display a paper type selection window complying with a paper binding layout corresponding to the binding type. If "no setting (no binding)" or "binder stitch binding" is selected in the "binding type" pull-down list box 1408, the flow shifts to step S1905; if "saddle stitch binding" is selected, to step S1907; if "case binding" is selected, to step S1910.

A case wherein "no setting (no binding)" or "binder stitch binding" is selected as the binding type in step S1904 will be explained. When "no setting" or "binder stitch binding" is selected, no cover is used, and a paper type selection window (not shown) for the main body, interleave, and tab paper except the cover is displayed (step S1905). Note that when "not insert" is selected with the "presence/absence of interleave" radio button 1602 and "presence/absence of tab paper" radio button 1603, neither the interleave nor tab paper corresponding to the radio button is displayed.

In the first embodiment, when "no setting" is set, the paper type is selected via the "paper type (main body)", "paper type (interleave)", and "paper type (tab paper)" pull-down list boxes 1412, 1413, and 1414.

The orderer selects the paper types of the main body, interleave, and tab paper from the paper type selection window displayed in step S1905 (step S1906), and the flow advances to step S1917.

A case wherein "saddle stitch binding" is selected as the binding type in step S1904 will be explained. Since no tab paper is used in "saddle stitch binding" in the first embodiment, a paper type selection window (not shown) for the cover, main body, and interleave except the tab paper is displayed (step S1907). Note that when "not insert" is selected with the "presence/absence of interleave" radio button 1602, no interleave is displayed.

The orderer selects the paper types of the main body and interleave from the paper type selection window displayed in step S1907 (step S1908). The order intake server 105 in the printing apparatus receives, via the web server 1001, paper type setting information on the main body and interleave selected in step S1908. The control unit 1002 controls to receive medium information on the selected paper types from the file server 106 via the I/F 1003 (step S1909). Then, the flow shifts to step S1913.

A case wherein "case binding" is selected as the binding type in step S1904 will be explained. When "case binding" is selected in step S1904, a paper type selection window for the cover, main body, interleave, and tab paper is displayed (step S1910). Note that when "not insert" is selected with the "presence/absence of interleave" radio button 1602, no interleave is displayed.

Figure 18B:
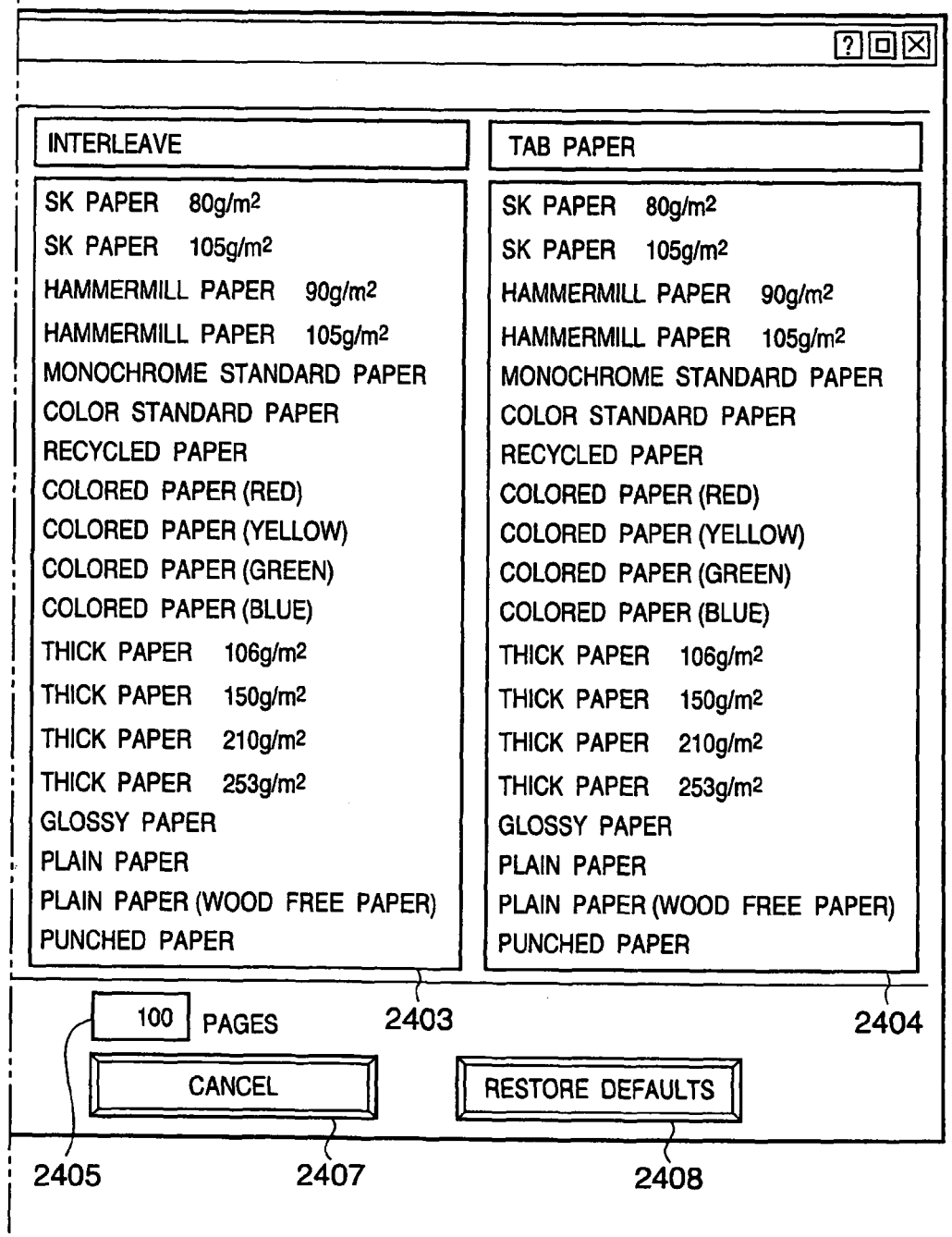

FIGS. 18A-18B are views showing an example of a "paper type setting" window displayed by pressing the "set" button 1604 in the "detailed settings of binding" window.

A "cover paper type" selection box 2401 is a column for selecting a cover paper type, and displays a list of selectable paper types. A "main body paper type" selection box 2402 is a column for selecting a main body paper type, and displays a list of selectable paper types. An "interleave paper type" selection box 2403 is a column for selecting an interleave paper type, and displays a list of selectable paper types. In the first embodiment, when "not insert" is selected with the "presence/absence of interleave" radio button 1602, the "interleave paper type" selection box 2403 is not displayed.

A "tab paper type" selection box 2404 is a column for selecting the paper type of tab paper, and displays a list of selectable paper types. In the first embodiment, when "saddle stitch binding" is selected in the "binding type" pull-down list box 1408, the "tab paper type" selection box 2404 is not displayed. Similarly, when "not insert" is selected with the "presence/absence of tab paper" radio button 1603, the "tab paper type" selection box 2404 is not displayed.

In the selection boxes 2401 to 2404, for example, recommended paper types are displayed in black, and unrecommended paper types are grayed out. When a paper type is selected, the selected paper type is highlighted.

A "number of pages of entry file" edit box 2405 is used to input the number of pages when an entered file is bound. A "set" button 2406 is pressed when the above-described settings are free from any problem. A "cancel" button 2407 is used to cancel paper type settings and return to the "print style setting" window. A "restore defaults" button 2408 is used to initialize settings in the "paper type setting" window and return to a state in which no paper type is selected.

Referring back to the flowchart showing the paper type selection sequence in binding printing in FIGS. 13A-13C, the order selects the paper types of the main body, interleave, and tab paper from the paper type selection window displayed in step S1910 (step S1911). The order intake server 105 in the printing apparatus receives, via the web server 1001, setting information on the selected paper types of the main body, interleave, and tab paper. The control unit 1002 controls to receive medium information on the selected paper types from the file server 106 via the I/F 1003 (step S1912). Then, the flow shifts to step S1913.

In step S1913, the flow waits till the completion of receiving the paper type medium information. Upon the completion of reception, the flow shifts to step S1914.

In step S1914, a list of paper types to be selected as recommended paper types of the cover is determined. A cover type table 2501 for limiting paper types so as to select only a paper type which is considered not to bend, in order to obtain a well-shaped binding result without bending when the cover is attached, is generated in advance in the memory 1004 of the order intake server 105.

FIG. 19A is a view showing a cover type table, and FIG. 19B is a view showing a main body type table, interleave type table, and tab paper type table.

The cover type table 2501 lists the endurances of paper types available in the printing apparatus (MFP 110 or 111). The endurance is the degree of bending difficulty of a binding result. For a paper type having a high endurance, the binding result hardly bends. A main body type table 2502, interleave type table 2503, and tab paper type table 2504 are created as lists of endurances for respective paper types on the basis of pieces of medium information on the respective paper types that are loaded in advance from the file server 106. Note that the medium information may contain information on the paper thickness, weight per unit area, and paper material.

On the basis of the paper type setting information on the main body, interleave, and tab paper that is contained in printing job data received via the web server 1001, the control unit 1002 determines the recommended type of paper to be selected as the cover. In determination, the cover type table 2501, main body type table 2502, interleave type table 2503, and tab paper type table 2504 in the memory 1004 are looked up.

Figure 21B:
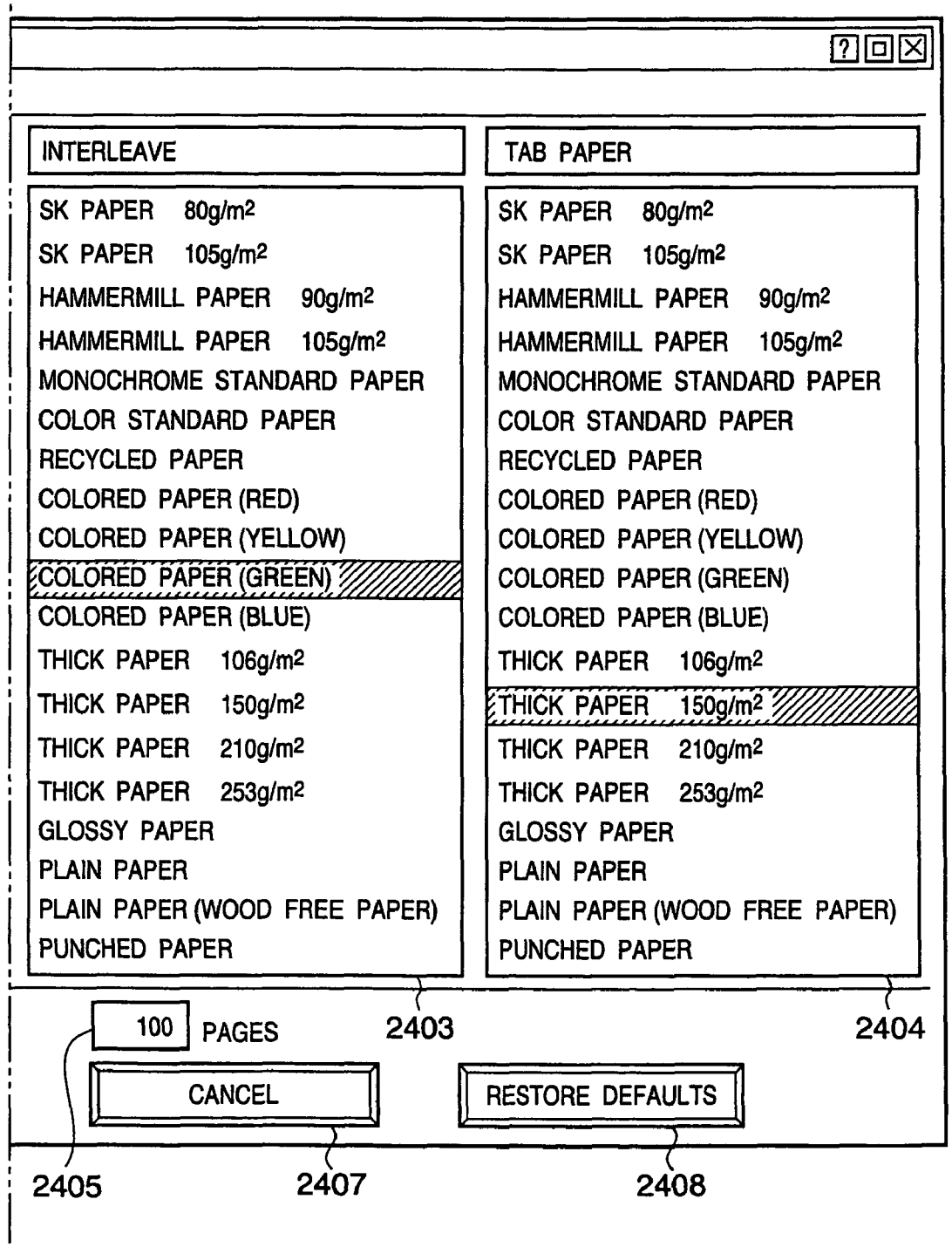

Display data of the "paper type setting" window which reflects the recommended paper type to be selected as the cover is transmitted to the user terminal 101 or 102 via the web server 1001 (step S1915). FIGS. 21A-B are views showing an example of the "paper type setting" window displayed on the user terminal 101/102.

In the example shown in FIGS. 21A-B, color standard paper is selected as the main body paper type via the "main body paper type" selection box 2402. Colored paper (green) is selected as the interleave paper type via the "interleave paper type" selection box 2403. Thick paper of 150 g/m$^2$ is selected as the tab paper type via the "tab paper type" selection box 2404. The number of pages to be bound is set to 100 pages via the "number of pages of entry file" edit box 2405.

With the above settings, the control unit 1002 determines that all paper types available as the cover do not bend even upon binding, and thus an entire list of paper types displayed in the "cover paper type" selection box 2401 is displayed in black. FIGS. 21A-B show a case wherein plain paper is selected from paper types recommended not to bend. FIGS. 22A-1 to 22C-2 show display examples of the "paper type setting" window when the number of pages is changed in the first embodiment.

Figures 2, 22A:
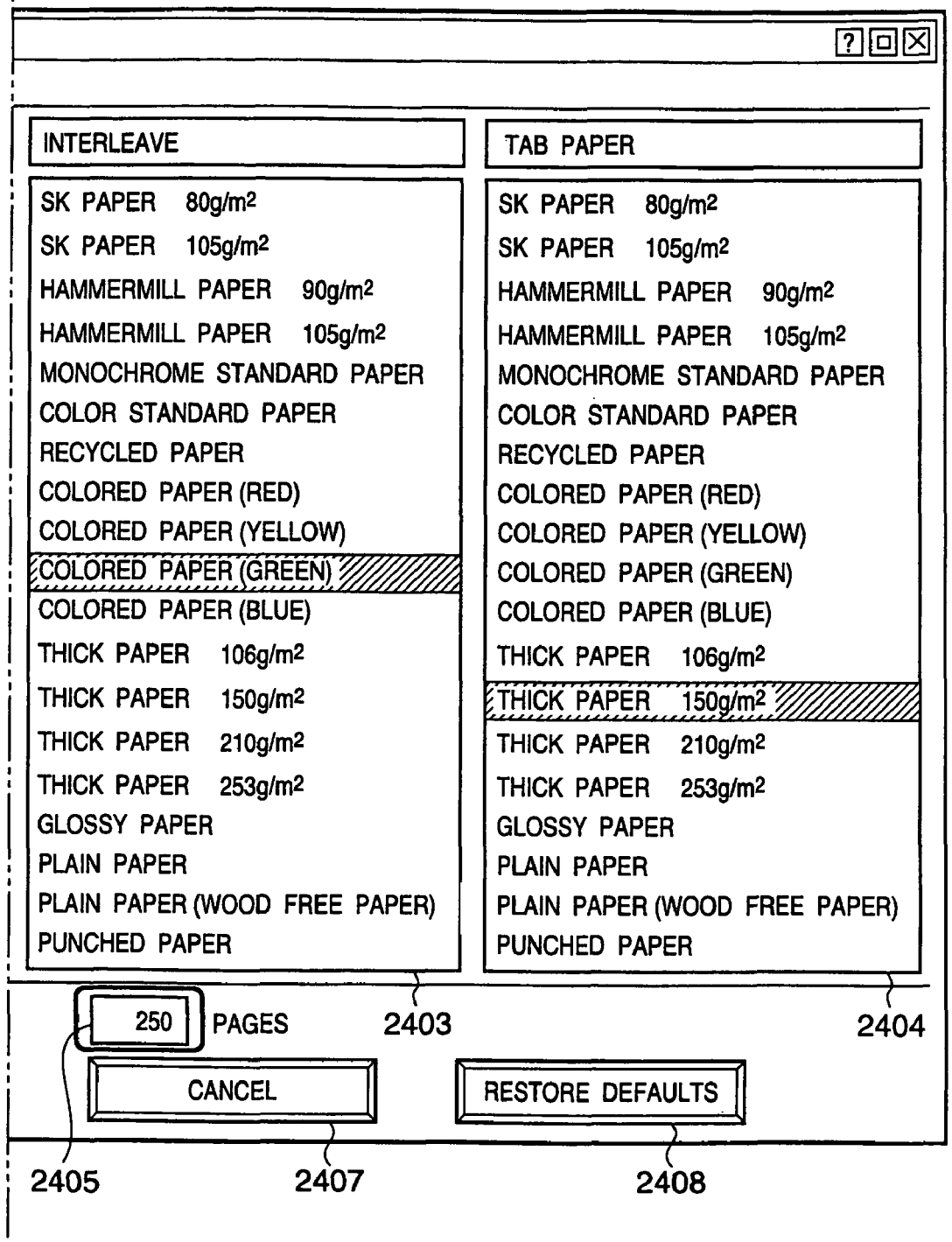

FIGS. 22A-1 and 22A-2 are views showing a case wherein the number of pages is set to 250 pages in the "number of pages of entry file" edit box 2405 in the window setting shown in FIG. 21B. FIGS. 22A-1 and 22A-2 gray out paper types determined to bend because the thickness and weight increase as a result of increasing the number of pages. More specifically, FIGS. 22A-1 and 22A-2 show a case wherein thick paper of 150 g/m$^2$ is selected because plain paper changes to unrecommended cover paper as a result of setting 250 pages.

Figures 2, 22B:
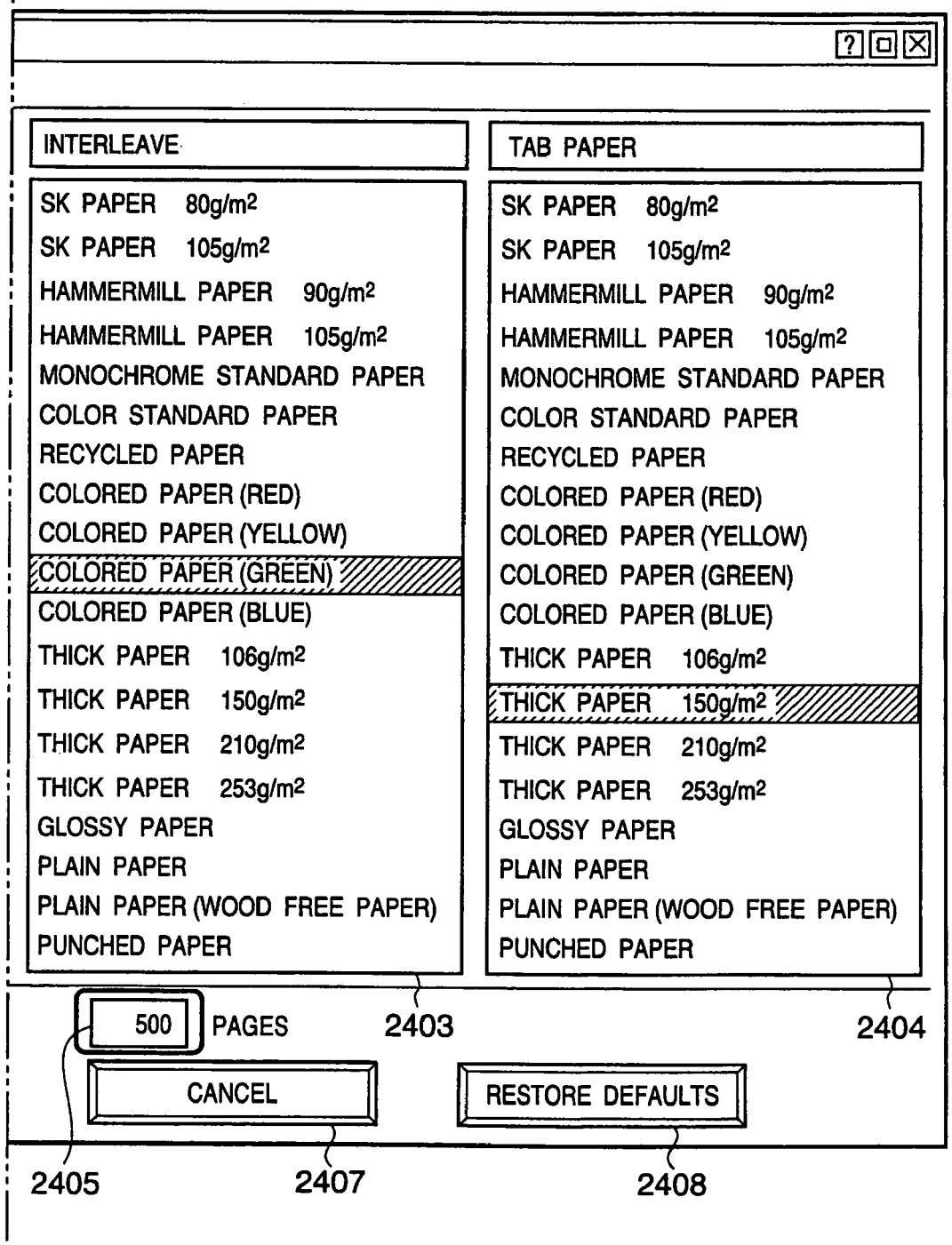

FIGS. 22B-1 and 22B-2 are views showing a window when the number of pages is set to 500 pages in the "number of pages of entry file" edit box 2405 from the window in FIGS. 22A-1 and 22A-2. The number of grayed-out paper types increases because the thickness and weight further increase as a result of increasing the number of pages. More specifically, FIG. 22B shows a case wherein thick paper of 210 g/m$^2$ is selected because thick paper of 150 g/m$^2$ changes to unrecommended cover paper as a result of setting 500 pages.

Figures 2, 22C:
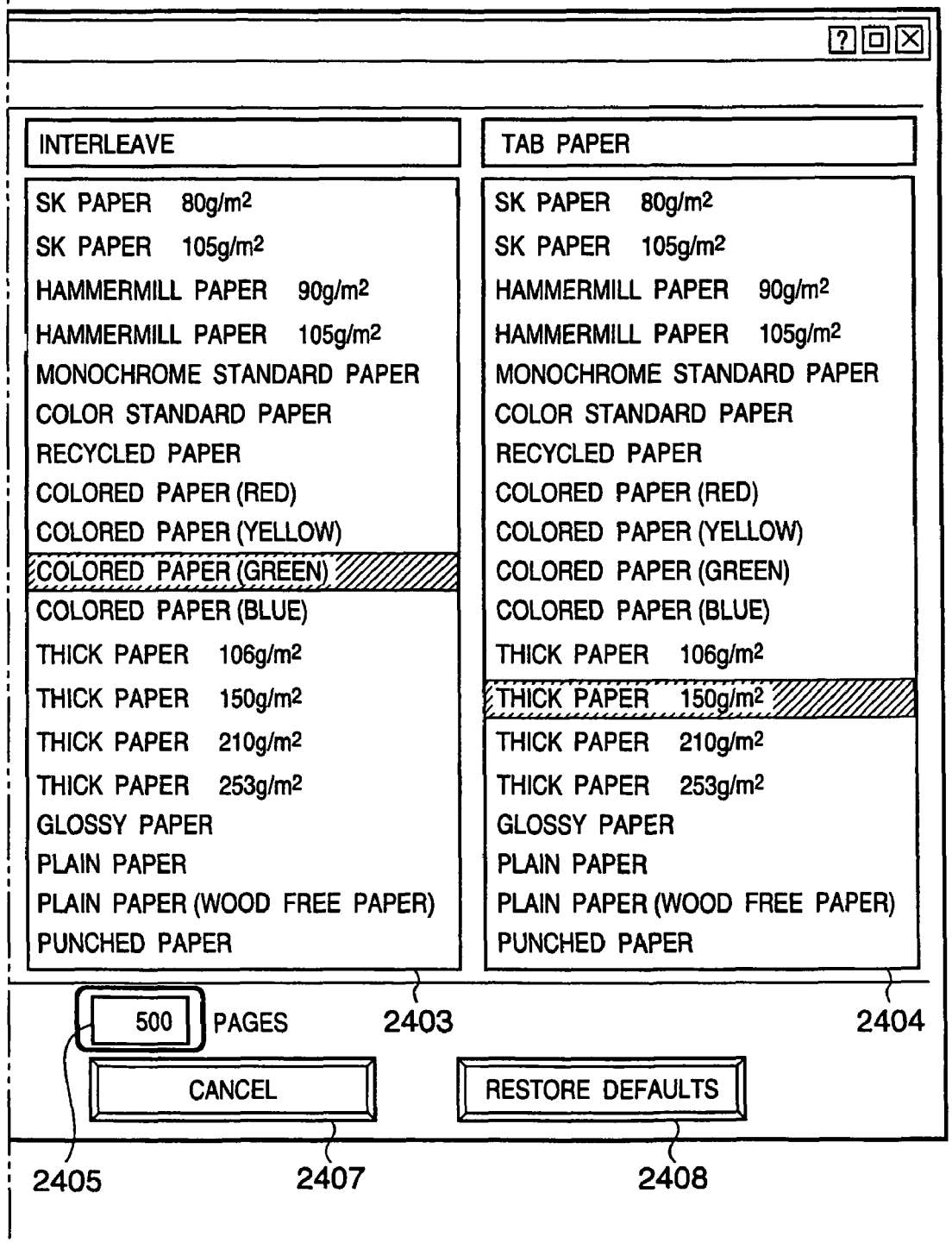

FIGS. 22C-1 and 22C-2 are views showing a window when the number of pages is set to 500 pages in the "number of pages of entry file" edit box 2405 and grayed-out plain paper which is not recommended paper is selected. As shown in FIGS. 22C-1 and 22C-2, even grayed-out unrecommended paper can be selected in the first embodiment, and the selected paper type is highlighted. If a "set" button 2406 is pressed, a warning window is displayed to warn that unrecommended paper is selected as the cover.

Figure 23:
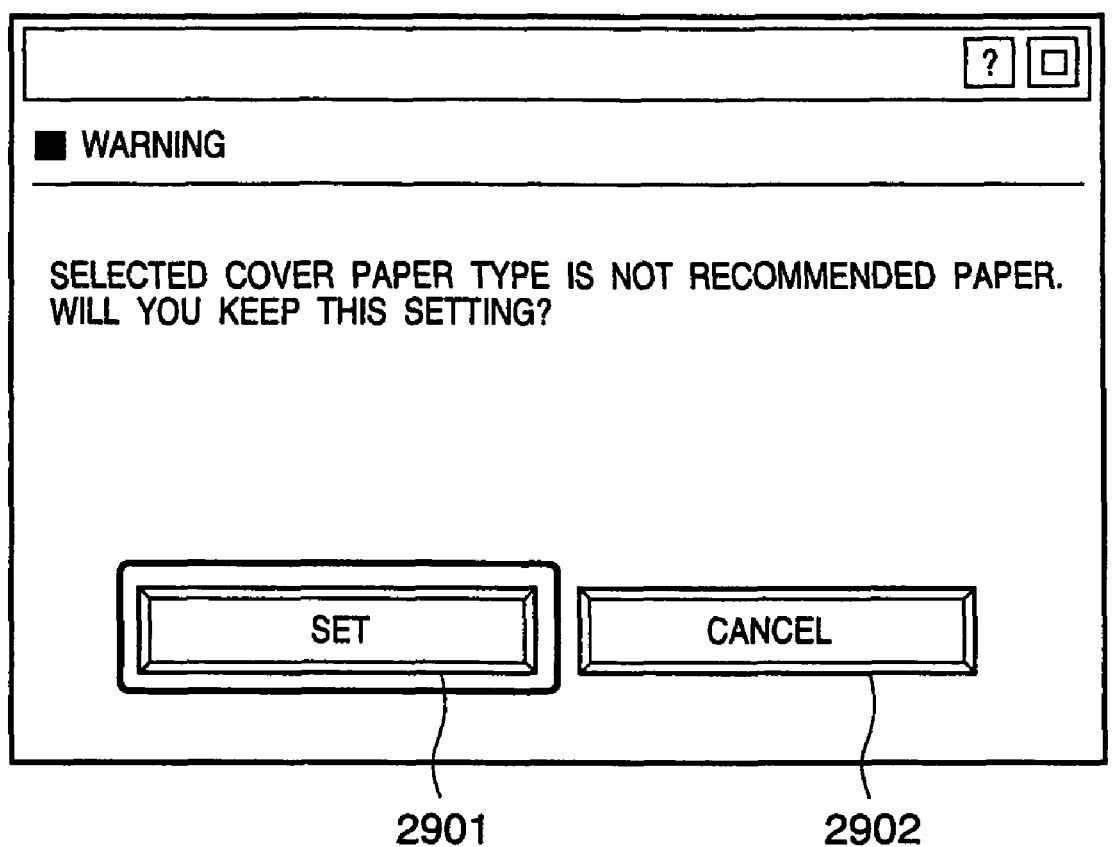
FIG. 23 is a view showing an example of a warning window displayed when grayed-out unrecommended paper is selected in a "cover paper type" selection box.

FIG. 23 is a view showing an example of the warning window displayed when grayed-out unrecommended paper is selected in the "cover paper type" selection box 2401. If no problem occurs in binding with the paper type of selected unrecommended paper, the orderer presses a "set" button 2901. If the orderer wants to cancel binding with unrecommended paper, he presses a "cancel" button 2902.

Figures 2, 24A:
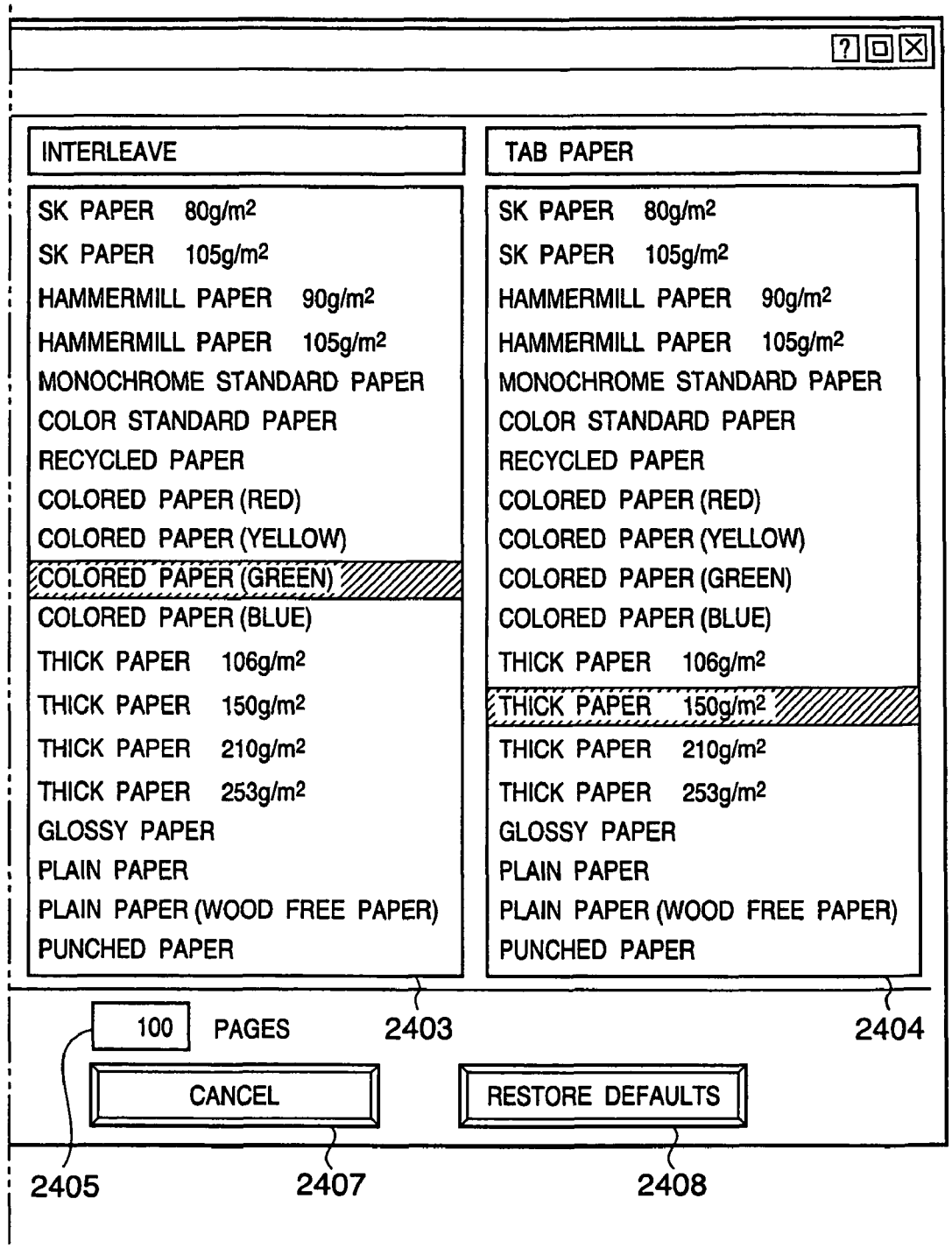

FIGS. 24A-1 to 24D-2 show display examples of the "paper type setting" window when the paper type is changed in the first embodiment. More specifically, FIGS. 24A-1 and 24A-2 are views showing a window when the main body paper type is set to thick paper of 106 g/m$^2$ in the "main body paper type" selection box 2402 in the window setting shown in FIGS. 21A-B. FIGS. 24A-1 and 24A-2 gray out paper types determined to bend because main body medium information on the thickness, weight per unit area, material, and the like changes as a result of changing the paper type. More specifically, FIGS. 24A-1 and 24A-2 show a case wherein thick paper of 150 g/m$^2$ is selected because plain paper changes to unrecommended cover paper as a result of setting thick paper of 106 g/m$^2$.

Figures 2, 24B:
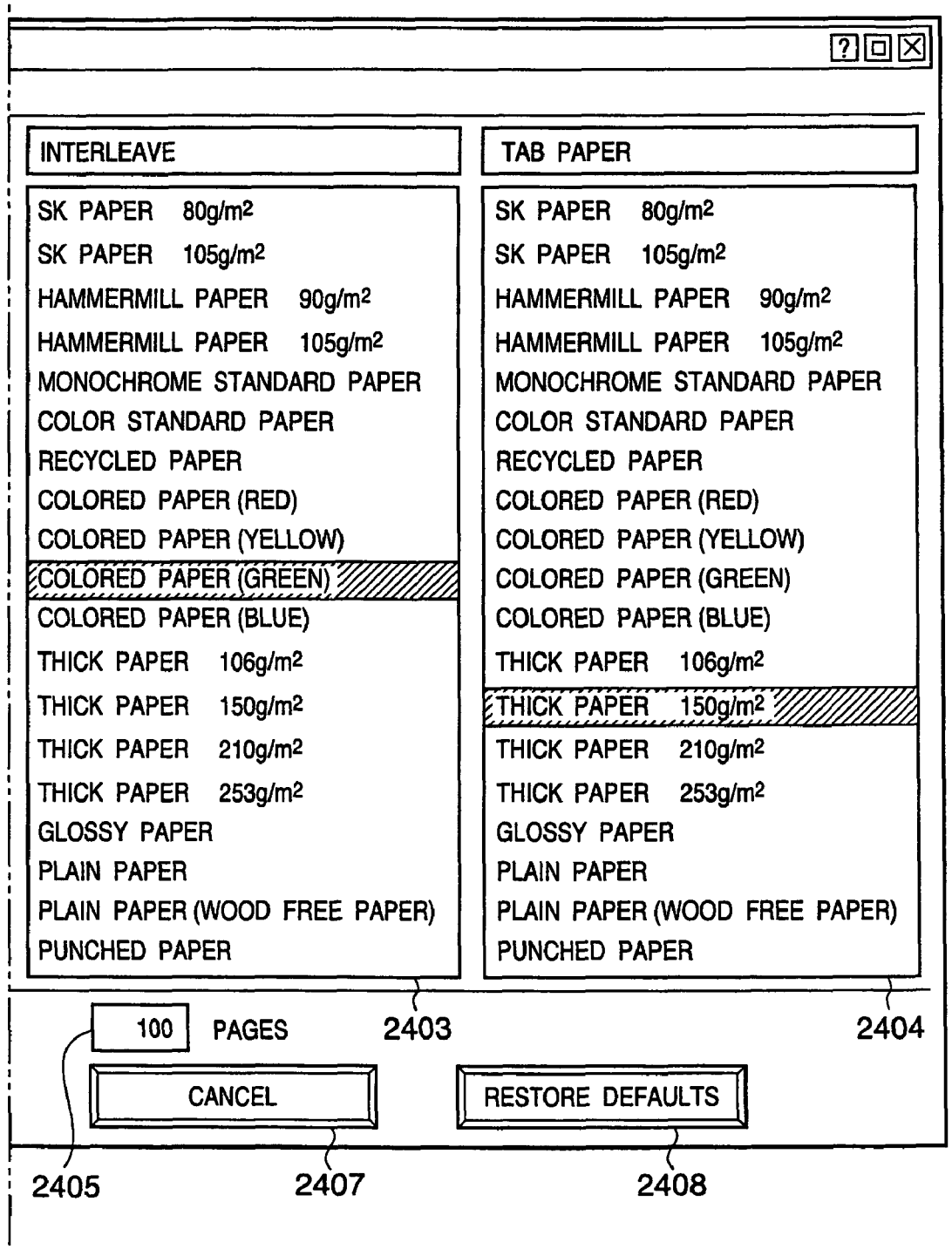

FIGS. 24B-1 and 24B-2 are views showing a window when the main body paper type is set to thick paper of 150 g/m$^2$ in the "main body paper type" selection box 2402 from the window in FIGS. 24A-1 and 24A-2. The number of grayed-out paper types increases because it is determined from main body medium information on the thickness, weight, strength, and the like that the number of paper types which can resist bending increases as a result of changing the paper type. More specifically, FIGS. 24B-1 and 24B-2 show a case wherein carmen paper of 209 g/m$^2$ is selected because thick paper of 150 g/m$^2$ changes to unrecommended cover paper as a result of setting thick paper of 150 g/m$^2$.

Figures 2, 24C:
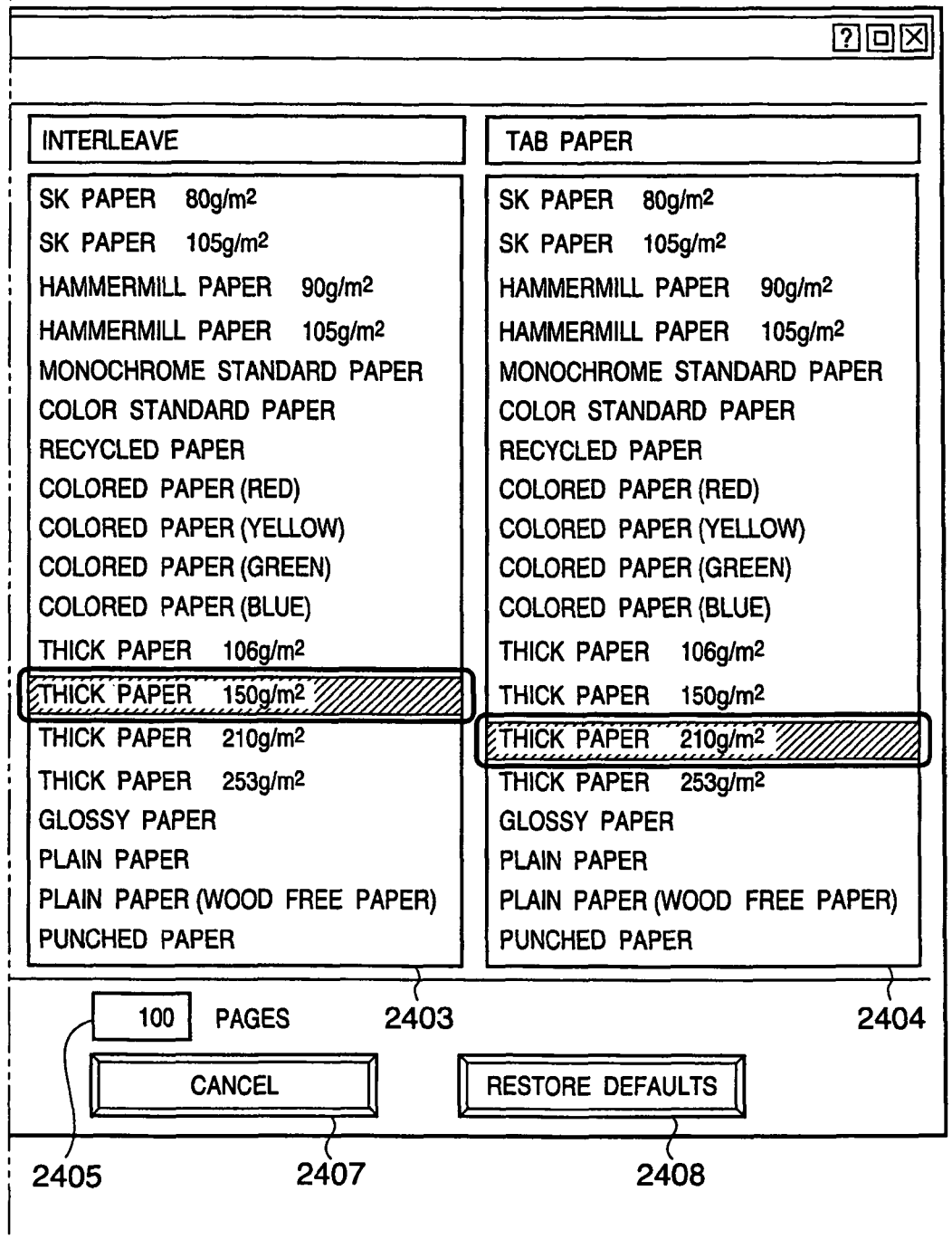

In the example shown in FIGS. 24C-1 and 24C-2, the interleave paper type is set to thick paper of 150 g/m$^2$ in the "interleave paper type" selection box 2403 from the window in FIGS. 24B-1 and 24B-2. In addition, the tab paper type is set to thick paper of 210 g/m$^2$ in the "tab paper type" selection box 2404. The number of grayed-out paper types further increases because it is determined that the number of paper types which can resist bending increases as a result of changing the paper types of both the interleave and tab paper. More specifically, in the example of FIGS. 24C-1 and 24C-2, the interleave is set to thick paper of 150 g/m$^2$, and the tab paper is set to thick paper of 210 g/m$^2$. As a result, carmen paper of 253 g/m$^2$ is selected because carmen paper of 209 g/m$^2$ changes to unrecommended cover paper.

Figures 1, 24D:
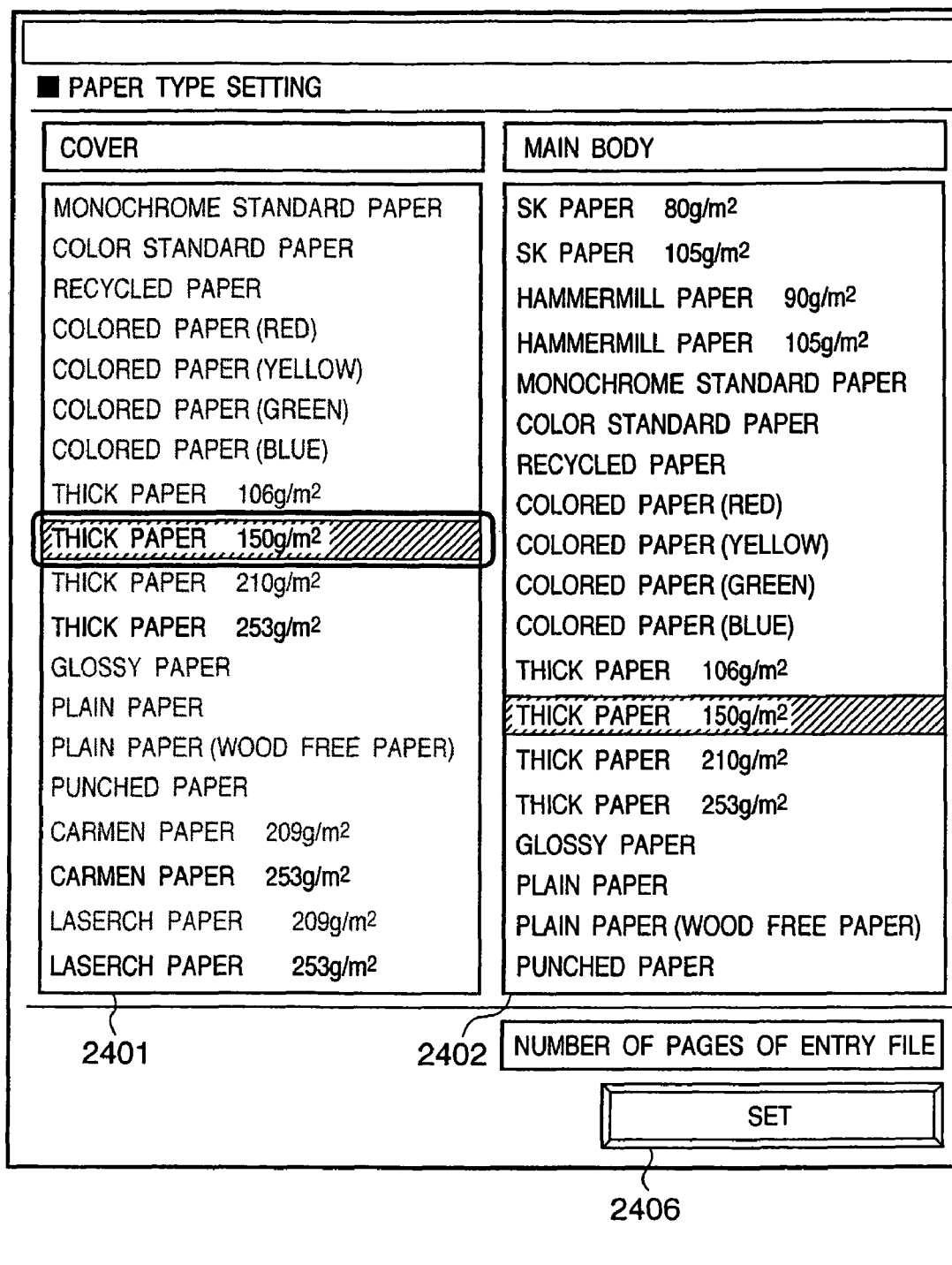

FIGS. 24D-1 and 24D-2 are views showing a window when grayed-out thick paper of 150 g/m$^2$ which is not recommended paper is selected in the window setting of FIGS. 24C-1 and 24C-2. As shown in FIGS. 24D-1 and 24D-2, even grayed-out unrecommended paper can be selected in the first embodiment, and the selected paper type is highlighted. If a "set" button 2406 is pressed, the warning window shown in FIG. 23 is displayed to warn that unrecommended paper is selected as the cover.

In FIGS. 19A-B, indices for calculating an endurance representing whether the cover bends upon binding are tabled in the main body type table 2502, interleave type table 2503, and tab paper type table for respective paper types available in the printing apparatus. Endurances representing whether the cover bends are tabled in the cover type table 2501 for respective paper types.

A case wherein the tables of endurance indices and endurances as shown in FIGS. 24C-1 and 24C-2 are set in the tables 2501 to 2504 will be examined. In this case, since the main body paper type is thick paper of 150 g/m$^2$, the endurance index is 70. Since the interleave is thick paper of 150 g/m$^2$, the endurance index is similarly 70. Since the tab paper is thick paper of 210 g/m$^2$, the endurance index is 90.

First, from the endurances of paper types selected in the respective paper type tables set in the memory 1004, the control unit 1002 calculates the endurance of the cover upon binding the main body, interleave, and tab paper. The calculation equation used is $$\begin{array}{r}\text{endurances of main body, interleave, and tab paper} \times \\ \text{number of pages} \times \text{endurance index} = \text{endurance of} \\ \text{cover} \end{array} \quad (1)$$

Note that in the first embodiment, the endurance index is 0.1.

Since the number of pages is 100, the endurance to the main body is 700 from the calculation based on equation (1):

70×100×0.1=700

Similarly, since the number of pages is 10, the endurance to the interleave is 70:

70×10×0.1=70

Since the number of pages is 5, the endurance to the tab paper is 45:

90×5×0.1=45

The control unit 1002 sums the calculated endurances to the main body, interleave, and tab paper to calculate the total endurance upon binding. In the first embodiment, the total endurance is 815 from the above endurances:

700+70+45=815

The control unit 1002 compares the total endurance of 815 with the endurance of each paper type in the cover type table 2501. The control unit 1002 determines that paper types having endurances which are equal to or higher than the total endurance of 815 are recommended paper, and displays these paper types in black. The control unit 1002 determines that paper types having endurances which are lower than the total endurance of 815 are unrecommended paper, and grays out these paper types.

FIGS. 20A-B are views for explaining a method of determining recommended cover paper. In the example shown in FIGS. 20A-B, paper types having endurances which are equal to or higher than the total endurance of 815 are thick paper of 253 g/m$^2$ having an endurance of 820, carmen paper of 253 g/m$^2$ having an endurance of 840, and laserch paper of 253 g/m$^2$ having an endurance of 880. The thick paper, carmen paper, and laserch paper are determined to be recommended paper sheets, and displayed in black. The remaining paper types fall short of the total endurance of 815, are determined to be unrecommended paper sheets, and grayed out. That is, FIGS. 24C-1 and 24C-2 show a window displayed under this condition.

Note that the first embodiment has described a method of determining recommended paper by the table structure of the four paper type tables 2501 to 2504 for the cover, main body, interleave, and tab paper. However, this table structure can also be expressed by one LUT as shown in FIG. 28. FIG. 28 is a table showing an example of a table for determining recommended paper of the cover paper type.

In FIG. 28, row items represent each paper type name and endurance of the cover, and column items represent the numbers of pages for the respective paper types of the main body, interleave, and tab paper. A flag representing whether to recommend a paper type is set at each coordinate point where each lateral item and each vertical item cross each other. By looking up a flag set in the LUT, the control unit 1002 determines whether to set a paper type as recommended paper.

FIG. 28 shows a flag with which it is determined that paper with "O" is recommended paper and paper with "x" is unrecommended paper. Since the table for determining recommended cover paper can be simply configured by an LUT in the memory 1004, as shown in FIG. 28, determination of recommended paper can be easily implemented by an arbitrary LUT structure.

In step S1916, the orderer can select a cover paper type from the "paper type selection" window in which recommended cover paper sheets are displayed in black in accordance with the main body, interleave, and tab paper selected in the above-described manner and unrecommended cover paper sheets are grayed out.

The window returns to the "print style setting" window. If the set contents are free from any problem, the "next (go to order confirmation)" button 1417 is pressed, and the flow shifts to step S1917. FIG. 25 is a view showing an example of the "print style setting" window displayed when a "set" button 2406 is pressed in the "paper type setting" window shown in FIGS. 24C-1 and 24C-2.

In step S1917, the orderer confirms whether the set contents of the order are free from any problem. FIG. 26 is a view showing an example of the "order confirmation" window in the first embodiment. By using the "order confirmation" window shown in FIG. 26, the orderer confirms the set contents displayed in the "entry setting information" display box 1702 and "print style information" display box 1703.

If the set contents are free from any problem, the orderer presses the "place an order" button 1705 in the "order confirmation" window, and designates order placement (step S1918). Note that if the set contents pose a problem and the orderer wants to make settings again, he presses the ""return (go to print style setting)" button 1707 to return to the "print style setting" window and make settings again. If the orderer wants to completely cancel order placement, he presses the "cancel" button 1706 to return to the menu window.

The operator confirms, from the order intake server 105, the contents ordered via the client PC 101/102, makes settings complying with the ordered contents in the printing apparatus, and performs binding printing (step S1919). The operator delivers a binding printing result output from the printing apparatus to the orderer via a specific delivery company or the like (step S1920). Consequently, the orderer receives the delivered bound/printed product (step S1921).

As described above, the first embodiment has described a case wherein a grayed-out paper type is unrecommended paper, but can be selected in response to the orderer's demand. However, it can also be controlled to inhibit setting of such paper, in order to prevent a setting error by the orderer from a list of many paper types or reliably prevent bending of a binding printing result.

Second Embodiment

The first embodiment has described a method of binding and printing one entry file on the assumption that the first and last pages of an entered file are covers, or by entering only main body data and preparing cover data in the POD site environment. The second embodiment will describe a case wherein main body data and cover data are prepared as different files and binding printing is executed for a plurality of entry files.

[Cover Medium Selection Sequence in Binding Using Plurality of Entry Files]

A cover medium selection sequence in binding printing using a plurality of entry files in the second embodiment will be explained on the basis of an actual order intake/placement management application window displayed on the screen of a client PC 101 or 102.

A flowchart showing the cover medium selection sequence in binding printing in the second embodiment is the same as that shown in FIGS. 13A-C used in the above-described first embodiment. Only steps associated with the second embodiment will be explained.

In the second embodiment, additional setting is required in setting a file entered in step S1901. More specifically, in step S1901, the entry file of the main body is input to the "file to be entered" edit box in the "entry setting" window, as shown in FIG. 14, and an "entry (start upload)" button 1303 is pressed. Then, the entry file of the main body is displayed in a list box 1304.

In the second embodiment, when cover data is entered as another file after the main body data is entered, the path of the cover file is input to the "file to be entered" edit box by the same procedures as those of entering the main body file. After that, which binding layout corresponds to the entered file is selected from a "binding layout" pull-down list box 1302.

FIG. 27 is a view showing an example of a window displayed when a cover file is further input in the "entry setting" window and the "entry (start upload)" button 1303 is pressed. When the file of cover data is uploaded into an order intake server 105, the uploaded cover file is added and displayed in the list box 1304. Note that the sequence from step S1902 is the same as that in the above-described first embodiment, and a description thereof will be omitted.

Third Embodiment

The first and second embodiments have described an example of selecting a cover paper type in binding printing by the orderer in the web browser displayed on the user terminal 101 or 102. The third embodiment will explain a method when the operator of a POD system 115 uses a printer driver to select a paper type in a client PC 109 in the POD site environment in accordance with the contents of an order received by an order intake server 105.

[Paper Type Selection Sequence in Binding Using Printer Driver]

A paper type selection sequence in binding printing in the third embodiment will be explained on the basis of an actual printer driver window displayed on the screen of the client PC 109.

Figure 29:
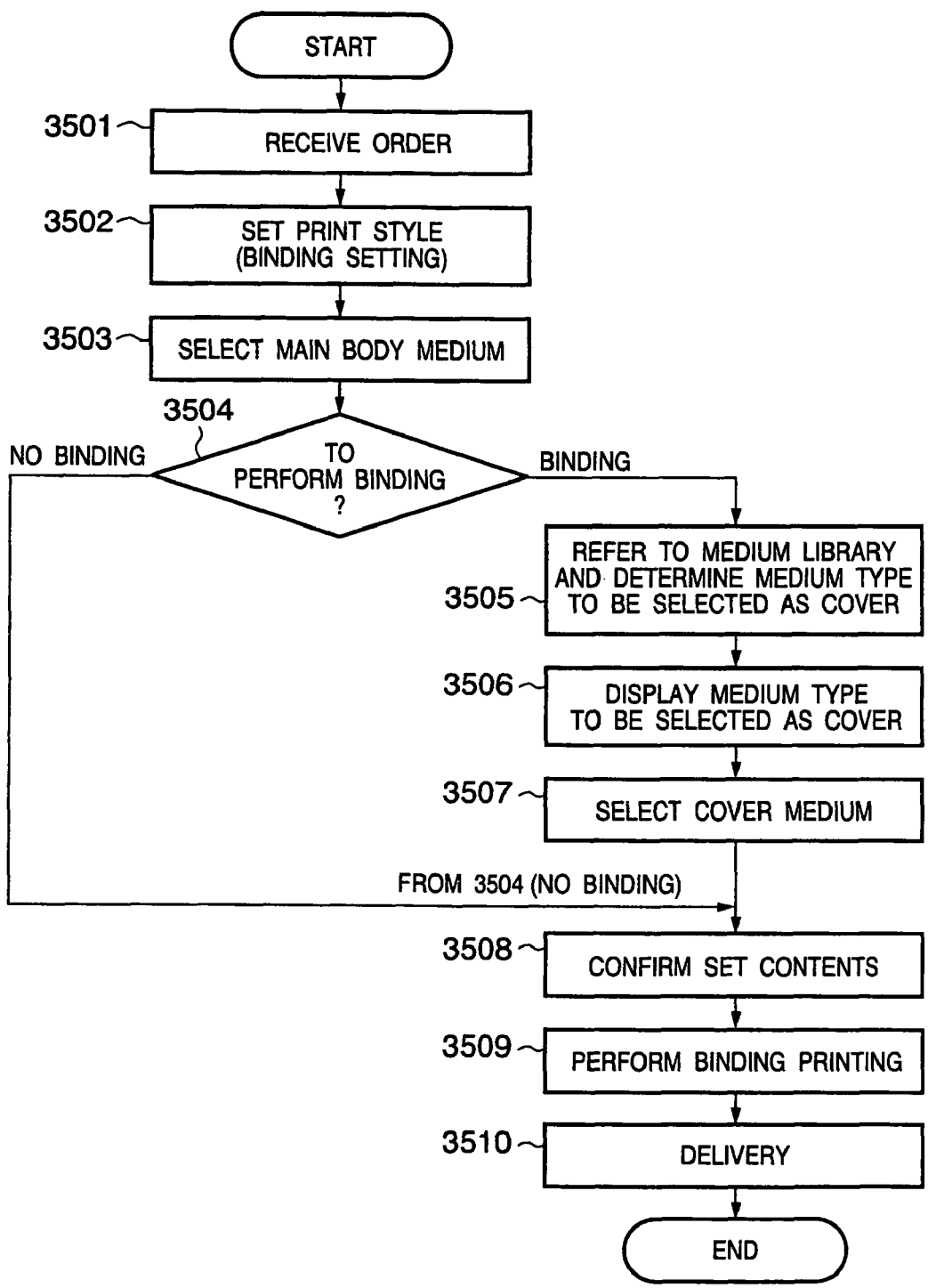
FIG. 29 is a flowchart for explaining a cover medium selection sequence in binding printing in the third embodiment.

FIG. 29 is a flowchart for explaining the paper type selection sequence in binding printing in the third embodiment. The operator of the POD system 115 confirms the contents of an order received by the order intake server 105 via the client PC 109 (step S3501). The orderer may order binding printing via the web browser in a user terminal 101 or 102, like the first and second embodiments, or the orderer may send an order form by e-mail or mail without the mediacy of Internet 103. Alternatively, the orderer may directly come to the POD system 115 to bring data of an original to be printed and designate printing contents.

The operator of the POD system 115 activates an application installed in the client PC 109. The operator displays printing job data saved in a file server 106 on the screen of the client PC 109 via the application. In order to instruct an MFP 110 or 111 via the application to print, the operator makes printing settings via a printer window provided by a printer driver managed by the OS (Operating System) of the client PC. That is, the operator sets a print style including binding settings (step S3502).

Figure 30:
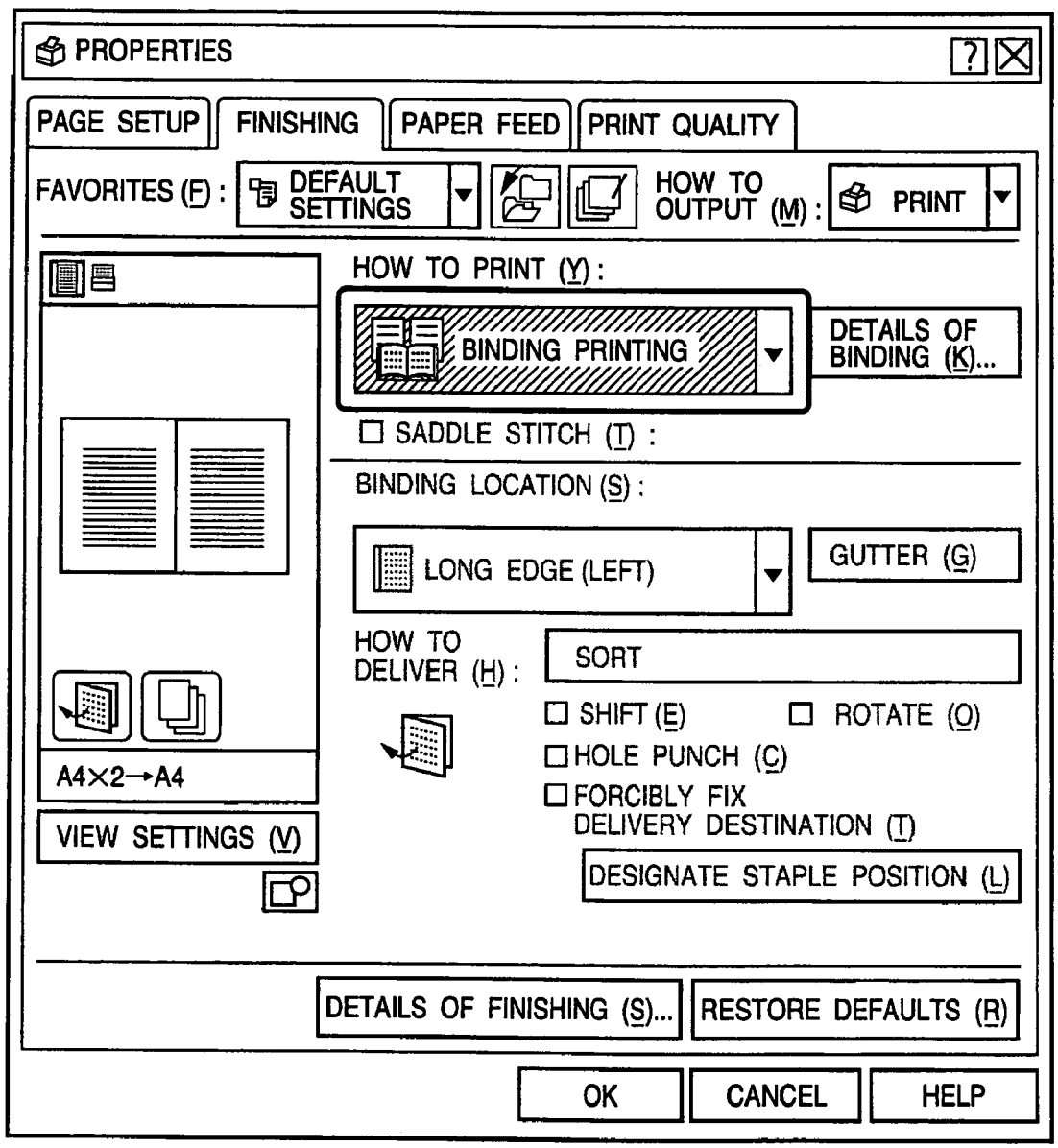
FIG. 30 is a view showing an example of a property setting window layout associated with a finishing process by a printer driver.

FIG. 30 is a view showing an example of a property setting window layout associated with a finishing process by the printer driver. More specifically, after settings on page setup are made by pressing a "page setup" tab 801 in the property setting window of the printer driver, a "finishing" tab 802 is selected to make finishing settings. Since binding printing is performed, "binding printing" is selected in a "printing method" pull-down list box 901.

Figure 31:
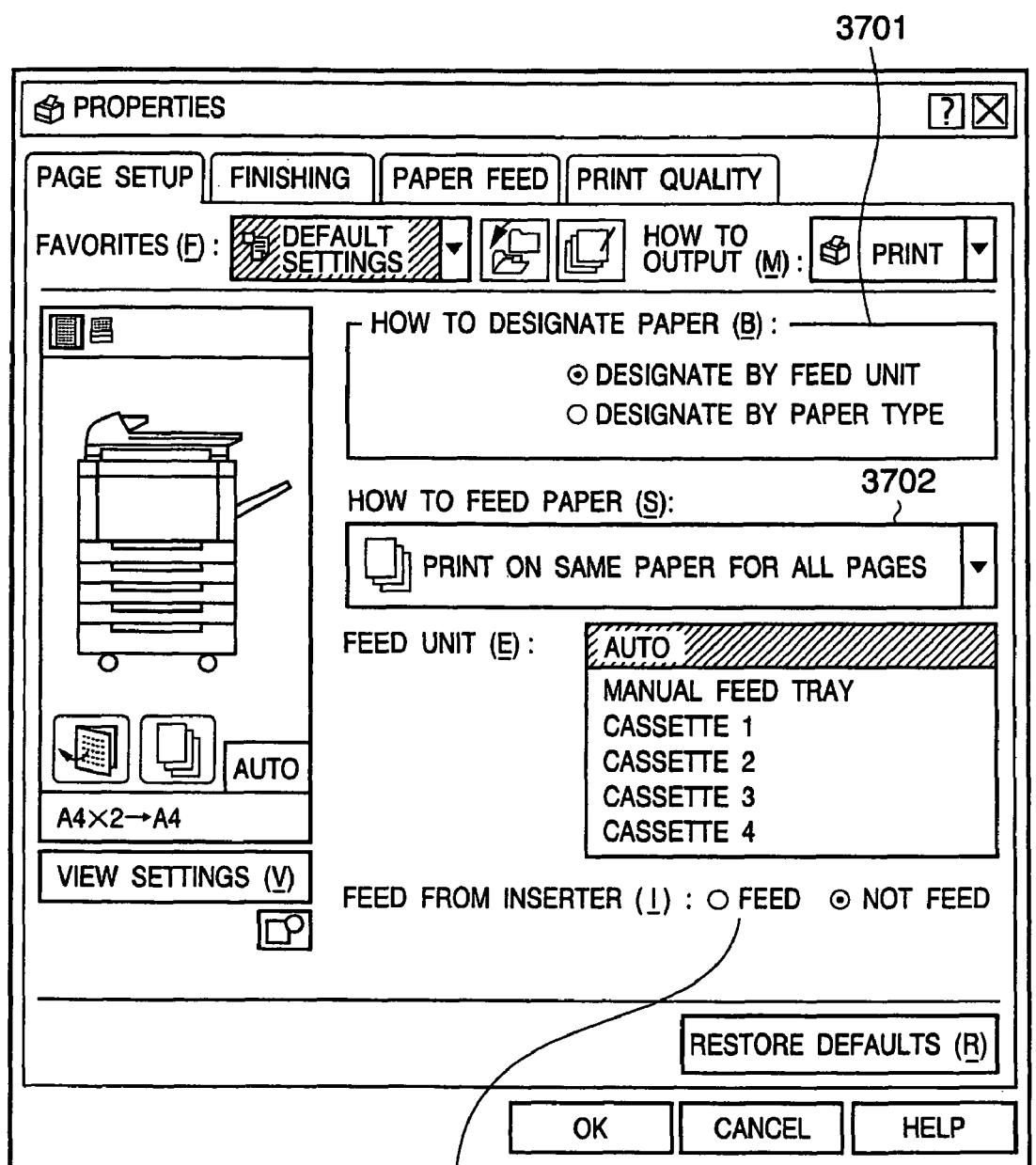
FIG. 31 is a view showing the initial window of a feed setting window displayed when a "paper feed" tab in the property setting window is selected.

A paper type used to print document data of the main body is selected (step S3503). FIG. 31 is a view showing the initial window of a feed setting window displayed when a "paper feed" tab in the property setting window in FIG. 30 is selected. In FIG. 31, a "how to designate paper" selection radio button 3701 is used to select whether to designate paper in accordance with the feed cassette or paper type, like "designate by feed unit" or "designate by paper type".

In FIG. 31, a "feed selection" pull-down list box 3702 is used to select a paper designation method for each binding layout. This list box includes, as choices, "print on same paper for all pages", "print by designating first and last paper sheets", "print by designating first, second, and last paper sheets", and "print by designating cover paper". A "feed from inserter" selection radio button 3703 is used to select whether to "feed" or "not feed" cover paper from the inserter.

In the third embodiment, paper sheets of different types are designated for the cover and main body. Hence, "designate by paper type" is selected with the "how to designate paper" selection radio button 3701, "print by designating cover paper" is selected in the "feed selection" pull-down list box 3702, and "not feed" is selected with the "feed from inserter" selection radio button 3703. To feed cover paper from the inserter, "feed" is selected with the "feed from inserter" selection radio button 3703.

Figure 32:
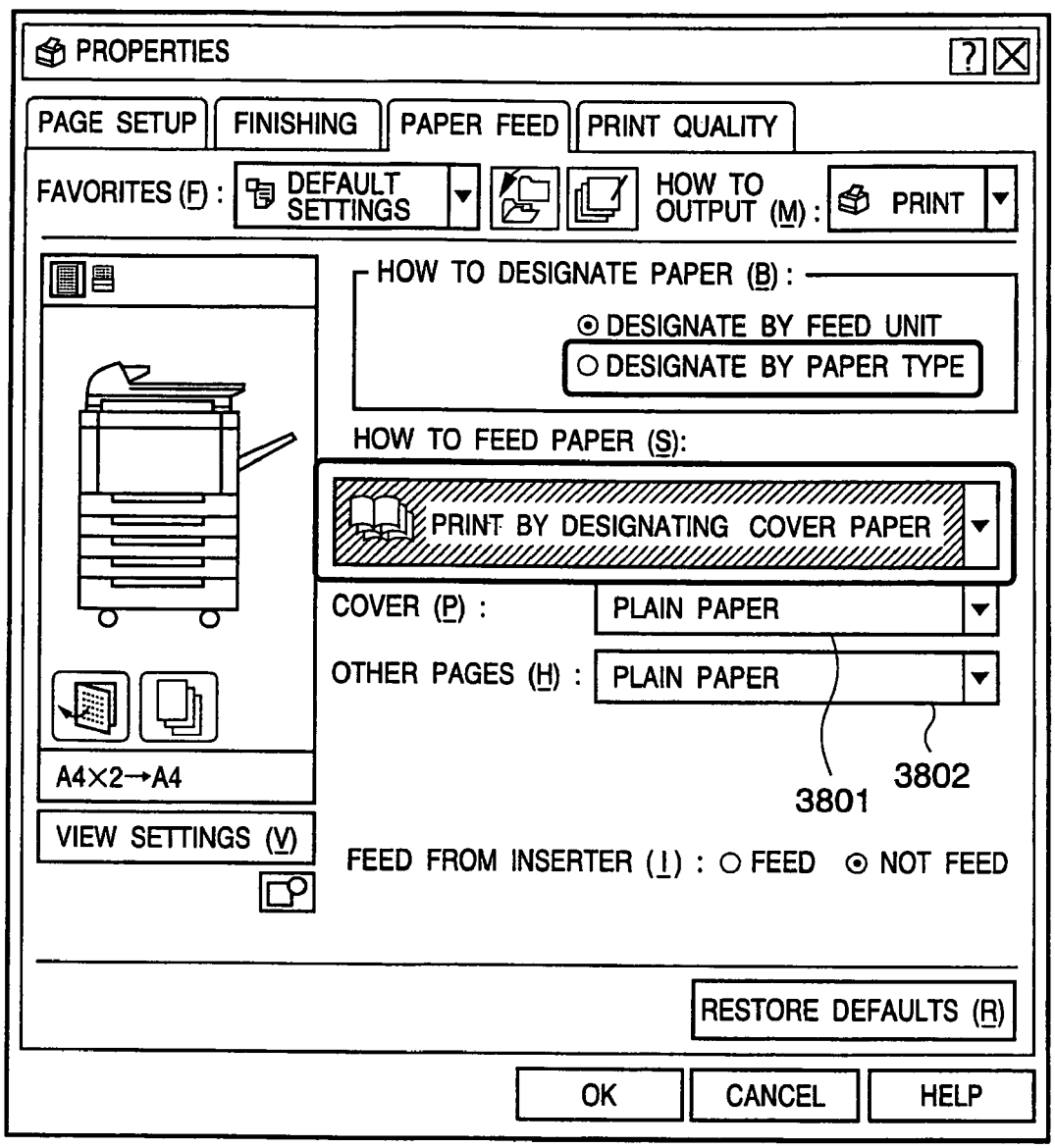
FIG. 32 is a view showing an example of a feed property setting window when designation based on the paper type is selected in the third embodiment.

FIG. 32 is a view showing an example of a feed property setting window when designation based on the paper type is selected in the third embodiment. If "print by designating cover paper" is selected in the "feed selection" pull-down list box 3702 in the window shown in FIG. 31, a "cover" selection pull-down list box 3801 and "other pages" selection pull-down list box 3802 newly appear.

The "cover" selection pull-down list box 3801 is used to select a cover paper type from available paper types. The "other pages" selection pull-down list box 3802 is used to select the paper type of the main body other than the cover from available paper types. In this case, thick paper of 150 $g/m^2$ is selected as the main body paper type in the "other pages" selection pull-down list box 3802.

After the main body paper type is selected in step S3503, as described above, it is discriminated whether to perform binding printing (step S3504). If "binding printing" is selected in the "printing method" pull-down list box 901 (binding), the flow shifts to step S3505; if no "binding printing" is selected (no binding), to step S3508.

In step S3505, a paper type to be selected as the cover is determined. In the third embodiment, the MFP 110/111 loads, via an external I/F 202, medium information (medium library) for each paper type that is stored in advance in the file server 106, and stores the medium information in a HDD 209 via a memory controller unit 206. A CPU 205 creates tables equivalent to paper type tables 2501 to 2504 for the cover, main body, interleave, and tab paper on the basis of necessary paper type medium information among pieces of medium information stored in the HDD 209. The CPU 205 sets the created tables in a RAM 208.

The operator causes the CPU 205 to determine, on the basis of the main body paper type selected in the "other pages" selection pull-down list box 3802 and the number of pages, whether the cover paper type is recommended paper (step S3505). Note that the determination method is the same as that described in the first embodiment, and a description thereof will be omitted.

Figure 33:
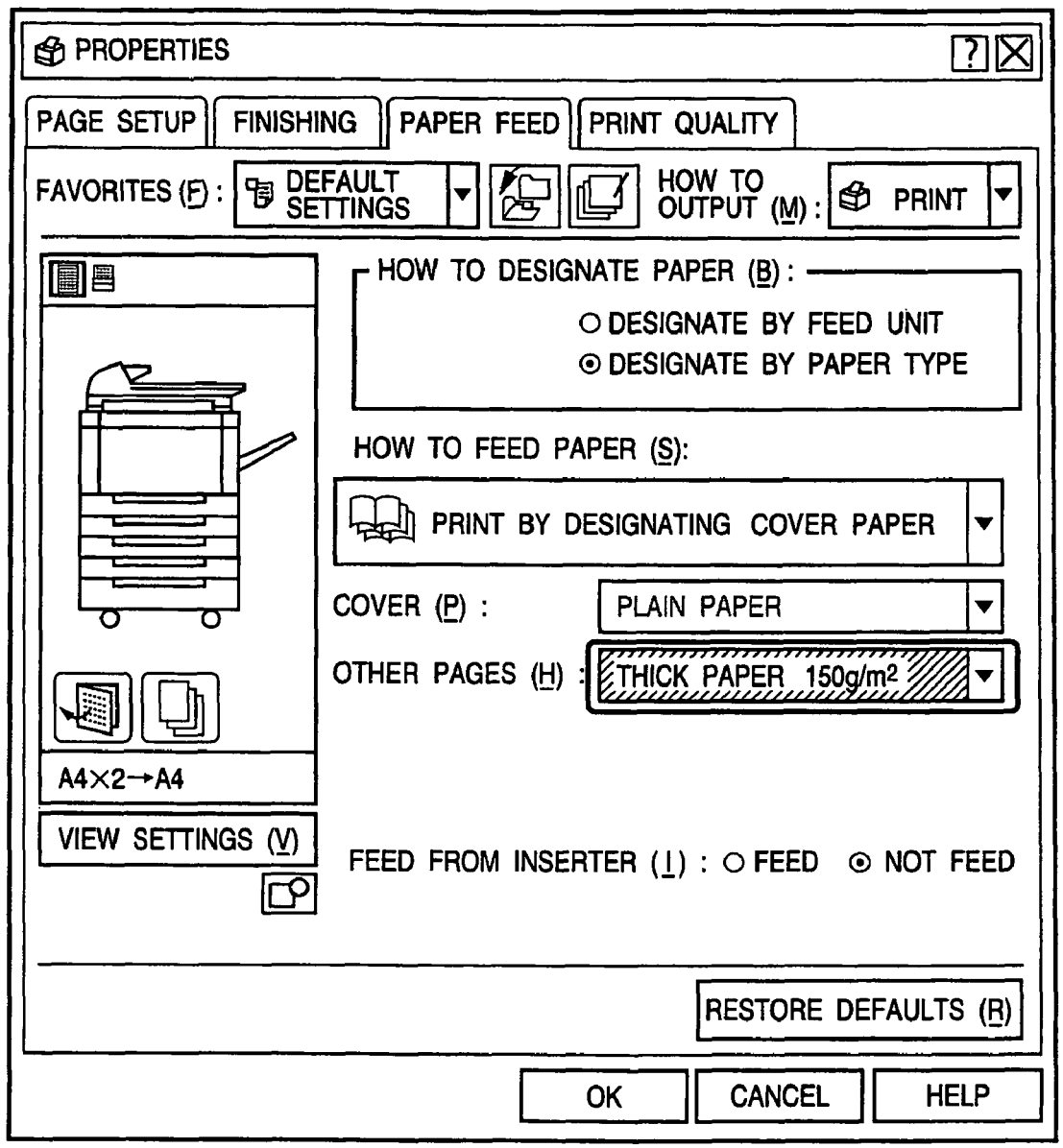
FIG. 33 is a view showing a property setting window displayed when thick paper of 150 g/m$^2$ is selected as the main body.

Paper types available as the cover are displayed on the basis of the determination result in step S3505 (step S3506). FIG. 33 is a view showing a property setting window displayed when thick paper of 150 g/m² is selected as the main body. As shown in FIG. 33, when thick paper of 150 g/m² is selected as the main body paper type, it is determined that plain paper set as the cover paper type bends upon binding. For this reason, plain paper is grayed out in the "cover" selection pull-down list box 3801.

Figure 34:
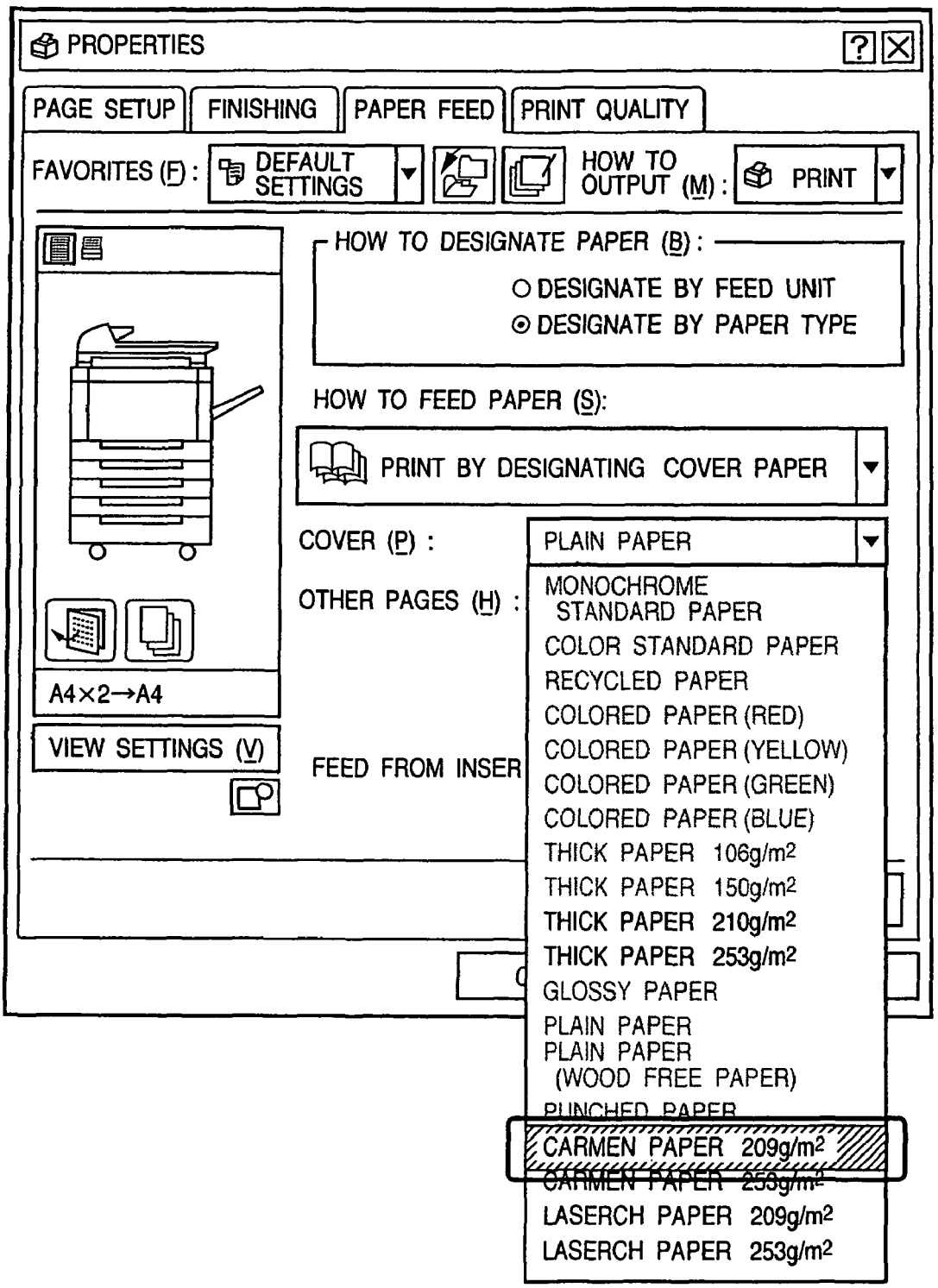
FIG. 34 is a view showing an example of selecting recommended carmen paper of 209 g/m$^2$ as the cover paper type.

A paper type used as the cover is selected (step S3507). The pull-down list of the "cover" selection pull-down list box 3801 is displayed in the window shown in FIG. 33. As shown in FIG. 34, available paper types are displayed in black when they are recommended paper sheets, and grayed out when they are unrecommended paper sheets. FIG. 34 is a view showing an example of selecting recommended carmen paper of 209 g/m² as the cover paper type. Note that when no problem occurs even with unrecommended paper, a grayed-out paper type may be selected. In this case, a warning window as shown in FIG. 23 is displayed, similar to the first embodiment.

Figure 35:
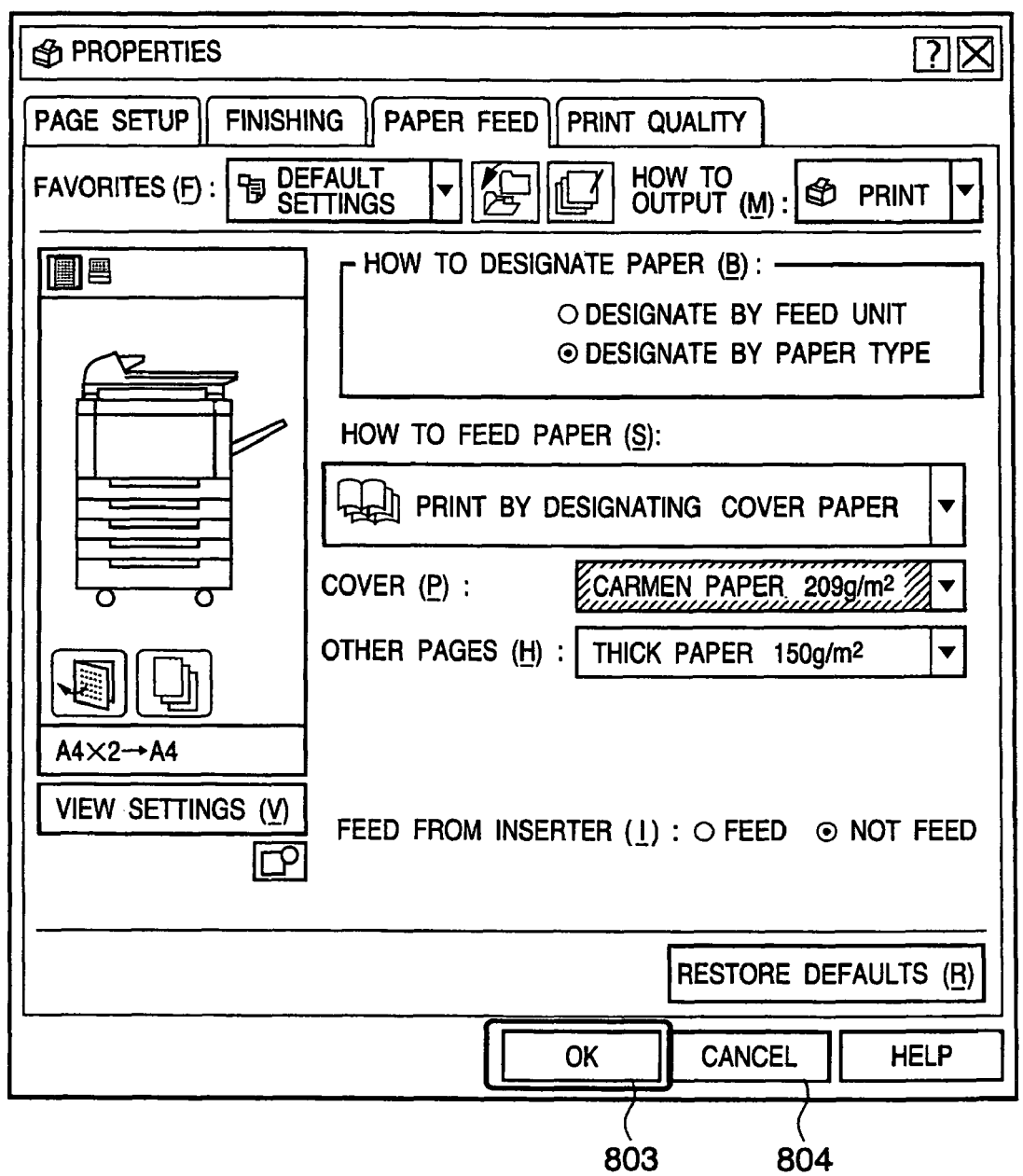
FIG. 35 is a view showing an example of a property setting window displayed when carmen paper of 209 g/m$^2$ is selected from a "cover" selection pull-down list box.

The contents set in the above-described steps are confirmed (step S3508). FIG. 35 is a view showing an example of a property setting window displayed when carmen paper of 209 g/m² is selected in the "cover" selection pull-down list box 3801. If the set contents are free from any problem, an "OK" button 803 is pressed to close the property setting window. If a problem occurs and all settings in the property setting window are canceled to make the above-mentioned settings again, a "cancel" button 804 is pressed.

After all the set contents are confirmed, an "OK" button 803 is pressed in the setting window of the printer driver to start binding printing (step S3509). A binding printing result output from the printing apparatus is delivered to the orderer via a specific delivery company or the like (step S3510).

Similar to the first and second embodiments, the third embodiment has described a case wherein a grayed-out paper type is unrecommended paper, but can be selected in response to the orderer's demand. However, it can also be controlled to inhibit setting of such paper, in order to prevent a setting error by the operator from a list of many paper types or reliably prevent bending of a binding printing result.

Fourth Embodiment

The third embodiment has described an example of selecting the cover medium of binding printing by the operator via the client PC 109. To the contrary, the fourth embodiment will describe a method of selecting a cover medium by the operator via an operation unit 204 of an MFP 110/111 in the POD site environment.

[Cover Medium Selection Sequence in Binding Using Operation Unit 204]

In the fourth embodiment, a cover medium selection sequence in binding printing will be explained on the basis of an actual LCD window displayed on the screen of the operation unit 204. Note that a flowchart showing the cover medium selection sequence in binding printing in the fourth embodiment is the same as that shown in FIG. 29 in the above-described third embodiment. The flowchart in FIG. 29 will be explained in a case wherein the operation is done via the operation unit 204.

The operator confirms order intake contents subjected to binding printing (step S3501). Note that the orderer may order binding printing via the web browser in a client PC 101/102, like the first and second embodiments, or the orderer may send an order form by e-mail or mail without the mediacy of Internet 103. Alternatively, the orderer may directly come to a POD system 115 to bring data of an original to be printed and designate printing contents.

Figure 36:
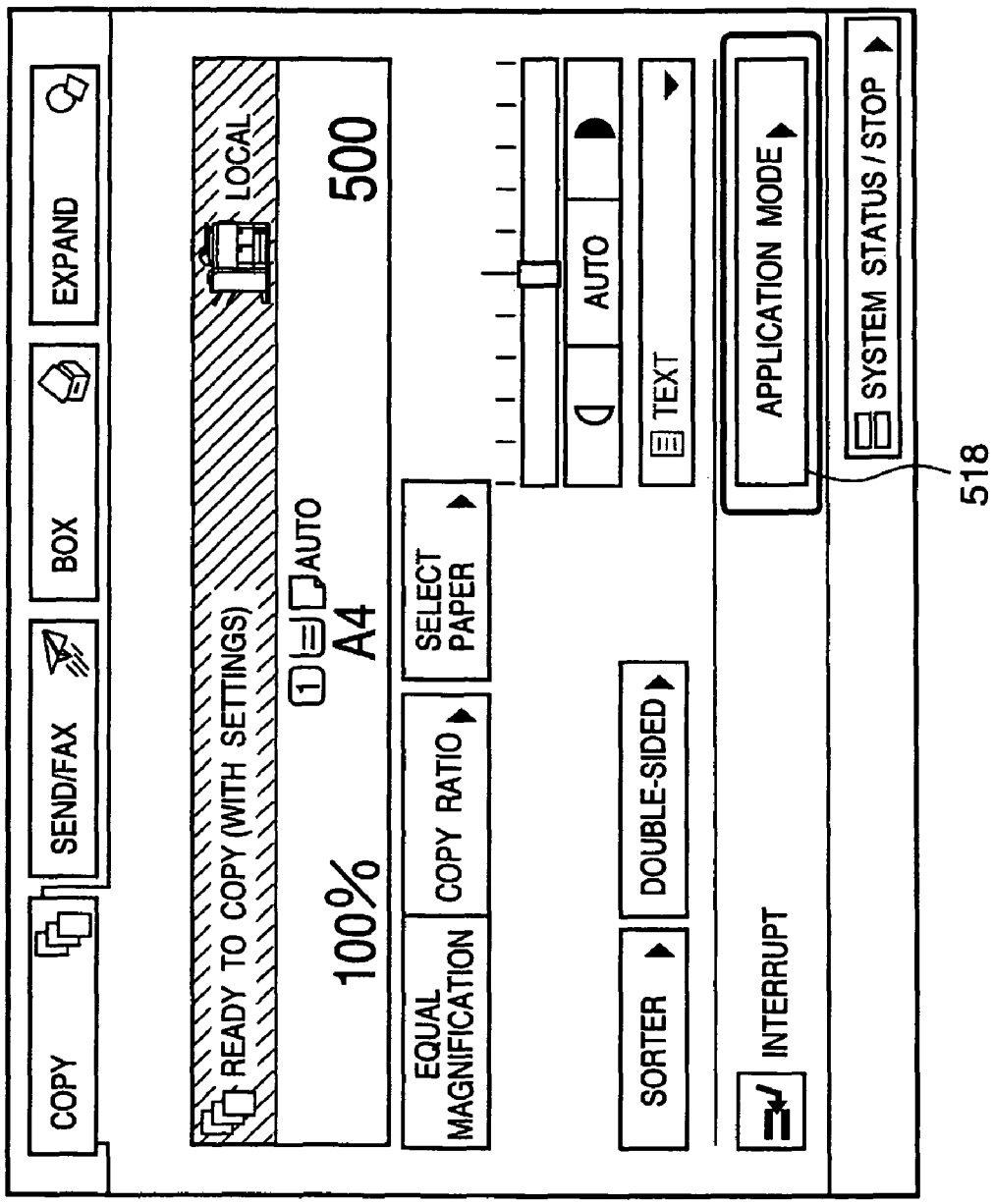
FIG. 36 is a view showing a display example of the screen of an operation unit when the number of pages is set to 500 pages with a ten-key pad.

The operator confirms the contents received from the orderer, and makes printing settings via the screen of the operation unit 204 of the MFP 110/111. Then, the operator sets a print style including binding settings (step S3502). FIG. 36 is a view showing a display example of the screen of the operation unit 204 when the number of pages is set to 500 pages with a ten-key pad. The operator presses an application mode key 518 to shift to an "application mode" setting window.

Figure 37:
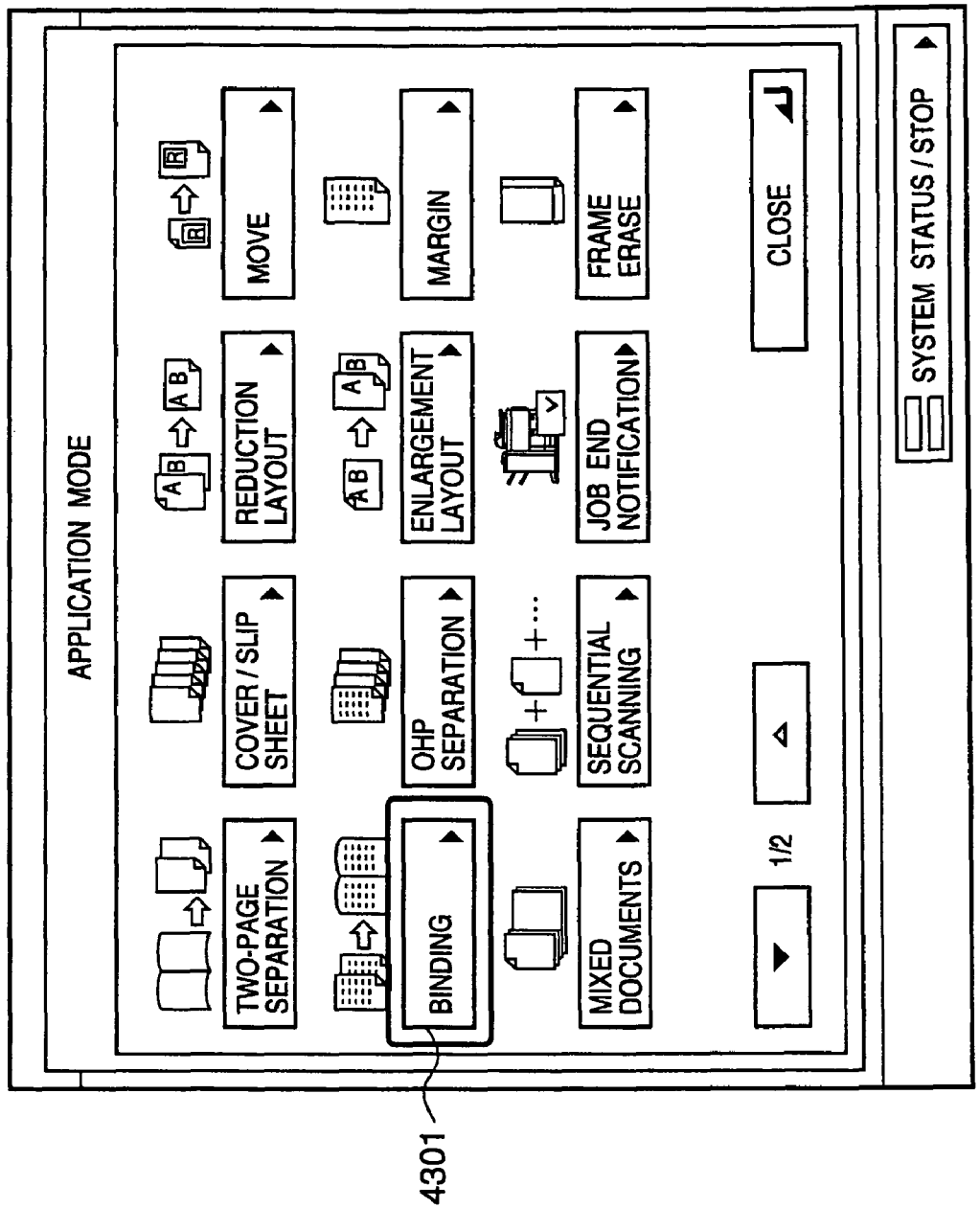
FIG. 37 is a view showing an example of an "application mode" setting window in the fourth embodiment.

FIG. 37 is a view showing an example of the "application mode" setting window in the fourth embodiment. In FIG. 37, a "binding" shift button 4301 is used to shift to setting of the binding mode. When the "binding" shift button 4301 is pressed, the process shifts to the binding mode. If no binding is performed, necessary settings are made with buttons except the "binding" shift button 4301. The window shifts to the binding mode window to designate a document size and make finishing settings such as whether the document is "left open" or "right open". Then, the "next" button is pressed to advance to the next window, displaying a "paper selection" setting window.

Figure 38:
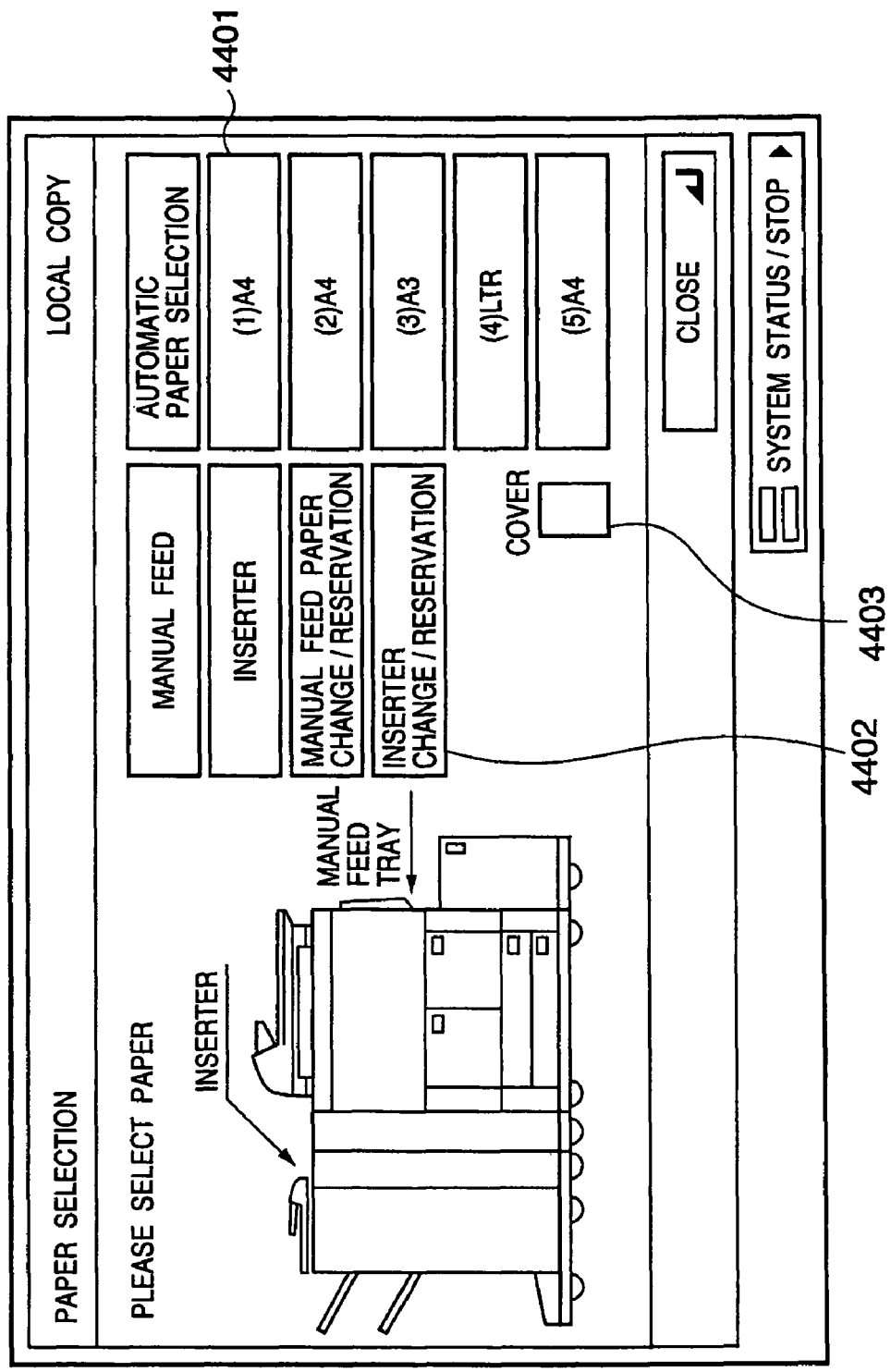
FIG. 38 is a view showing an example of a "paper selection" setting window in the binding mode in the fourth embodiment.

FIG. 38 is a view showing an example of the "paper selection" setting window in the binding mode in the fourth embodiment. The "paper selection" setting window shown in FIG. 38 provides buttons for selecting a feed cassette and tray and setting a paper type for each feed unit. A "first feed cassette" setting button 4401 is used to select a paper type for the first feed cassette and feed paper. An "inserter change/reservation" setting button 4402 is used to change a paper type and feed paper from the inserter. A "cover" setting button 4403 is used to switch between whether to select cover paper or main body paper. The "cover" setting button 4403 is pressed to select cover paper, and not pressed to select main body paper.

The operator selects a main body paper type (step S3503). The fourth embodiment will explain settings when paper is fed from the first feed cassette for the main body and paper is fed from the inserter for the cover. In the "paper selection" setting window shown in FIG. 38, the main body paper type is set by pressing the "first feed cassette" setting button 4401 without pressing the "cover" setting button 4403.

It is discriminated whether to perform binding printing (step S3504). If the "binding" shift button 4301 is pressed to shift to the binding mode window (binding), the flow shifts to step S3505; if the "binding" shift button 4301 is not pressed (no binding), to step S3508.

In S3505, a paper type to be selected as the cover is determined. In order to set a cover paper type, the "cover" setting button 4403 is pressed, and the "inserter change/reservation" setting button 4402 is pressed to advance to a "paper type selection" setting window for the cover.

Also in the fourth embodiment, similar to the third embodiment, the MFP 110/111 loads, via an external I/F 202, medium information (medium library) for each paper type that is stored in advance in a file server 106. The MFP 110/111 stores the medium information in a HDD 209 via a memory controller unit 206. A CPU 205 creates tables equivalent to paper type tables 2501 to 2504 for the cover, main body, interleave, and tab paper on the basis of necessary paper type medium information among pieces of medium information stored in the HDD 209. The CPU 205 sets the created tables in a RAM 208. The operator causes the CPU 205 to determine, on the basis of the selected main body paper type and the number of pages, whether the cover paper type is recommended paper. Note that the determination method is the same as that described in the first embodiment, and a description thereof will be omitted.

Figure 39:
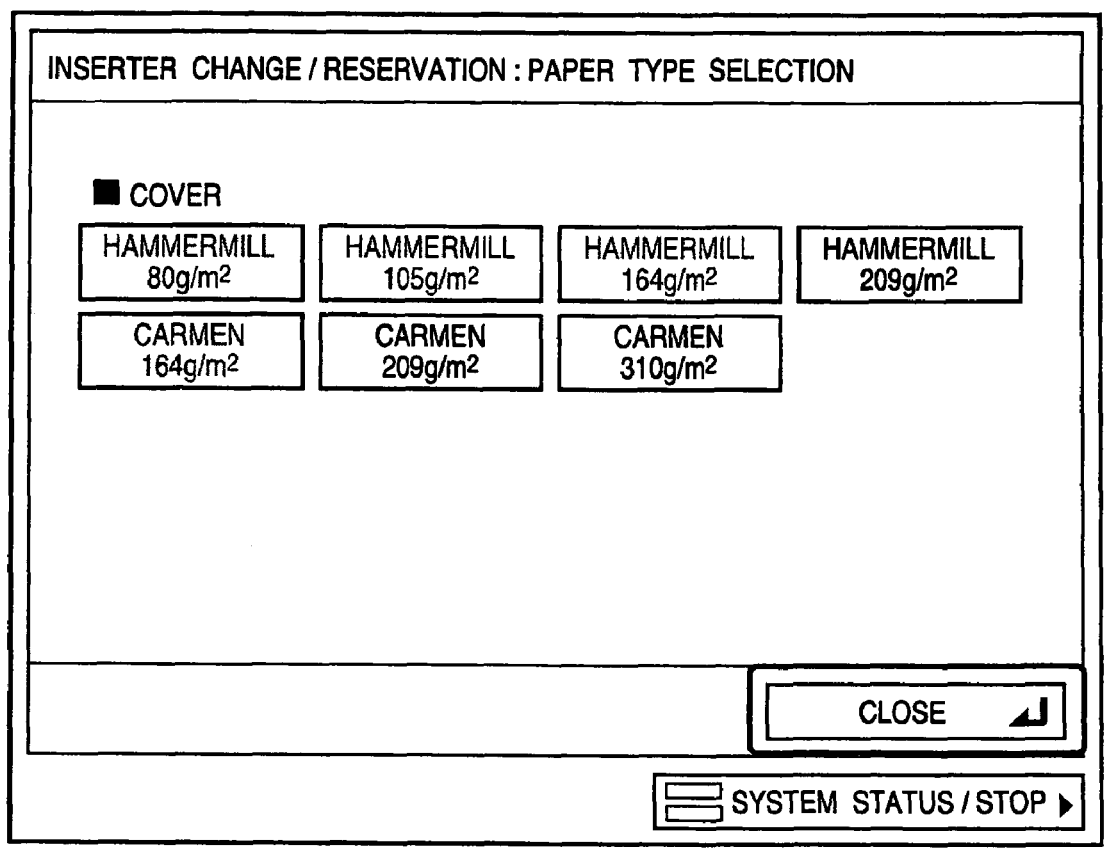
FIG. 39 is a view showing an example of a "paper type selection" setting window when a cover displayed by pressing an "inserter change/reservation" setting button in the "paper selection" setting window shown in FIG. 38 is changed and reserved with an inserter.

Paper types available as the cover are displayed on the basis of the determination result (step S3506). FIG. 39 is a view showing an example of a "paper type selection" setting window when a cover displayed by pressing the "inserter change/reservation" setting button 4402 in the "paper selection" setting window shown in FIG. 38 is changed and reserved with the inserter.

As shown in FIG. 39, "hammermill 209 g/m$^2$", "carmen paper 209 g/m$^2$", and "carmen paper 310 g/m$^2$" are determined to be recommended paper sheets, and are displayed in black. To the contrary, "hammermill 80 g/m$^{21}$", "hammermill 105 g/m$^2$", "hammermill 164 g/m$^2$", and "Carmen paper 164 g/m$^2$" are determined to be unrecommended paper sheets, and are grayed out.

A paper type used as the cover is selected (step S3507). In the "paper type selection" setting window shown in FIG. 39, a paper type used as the cover is selected, and the "close" button is pressed to end setting of the binding mode. Note that when no problem occurs even with unrecommended paper, a grayed-out paper type may be selected. In this case, a warning window as shown in FIG. 23 is displayed, similar to the first embodiment.

Figure 40:
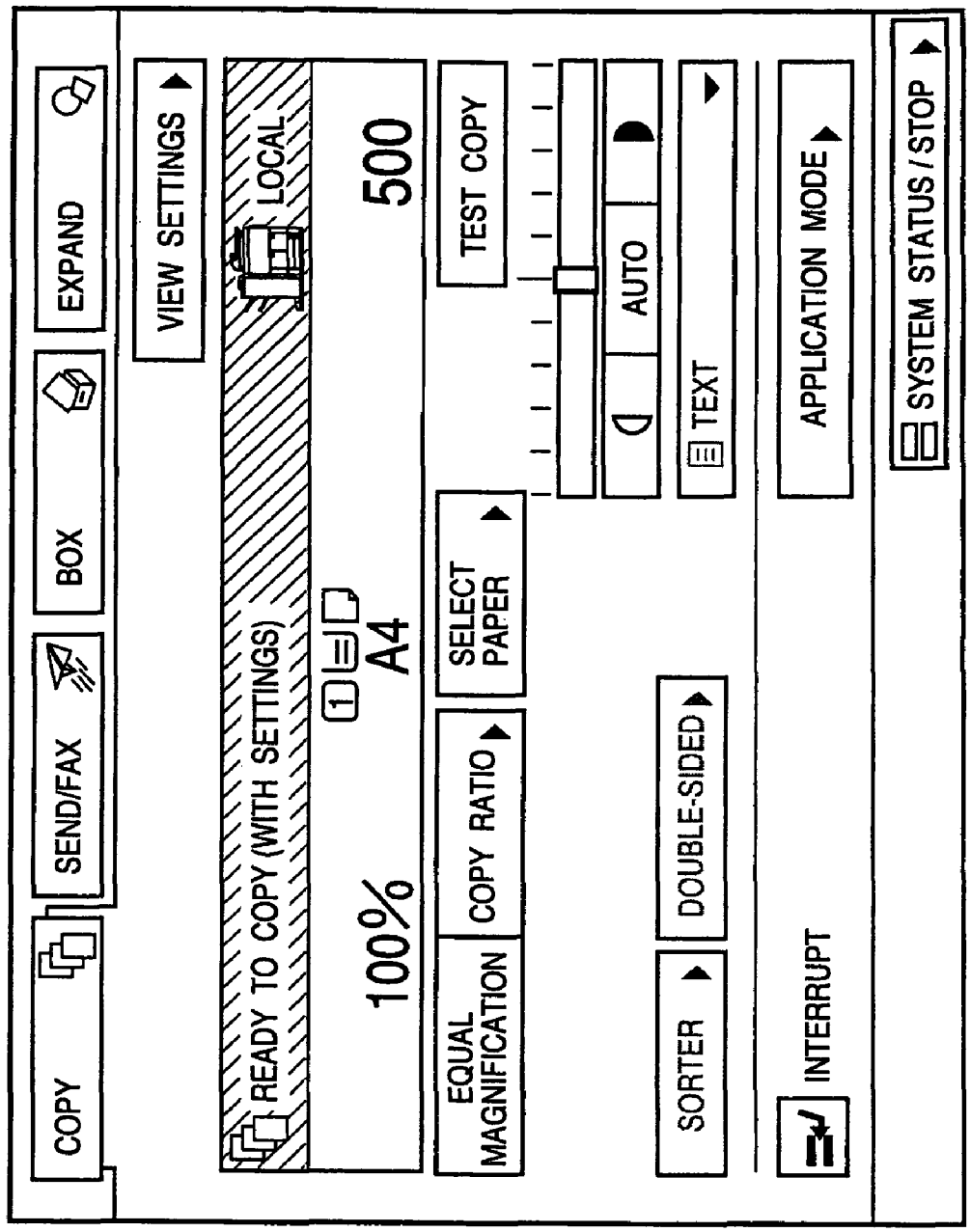
FIG. 40 is a view showing an example of a window displayed on the operation unit when the setting of the binding mode ends and all settings end.

The operator confirms the set contents (step S3508). FIG. 40 is a view showing an example of a window displayed on the operation unit 204 when the setting of the binding mode ends and all settings end. If the set contents are free from any problem, the flow shifts to step S3509; if a problem occurs and all settings are canceled to make the above-mentioned settings again, a clear key is pressed.

After all the set contents are confirmed, a start key of the operation unit 204 is pressed to start binding printing in step S3509. A binding printing result output from the printing apparatus is delivered to the orderer via a specific delivery company or the like (step S3510).

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-166168 filed on Jun. 06, 2005, which is hereby incorporated by reference herein in its entirety.

What is claimed is:

1. A printing system capable of executing printing using a plurality of printing media of different types, comprising:
an input unit configured to input document data to be used for a printing apparatus to create a printing media bundle;
a printing unit configured to print on the basis of the document data input from said input unit;
a first designation unit configured to designate a printing medium type of a main body of the printing media bundle used for printing a first page group included in the document data, from among a plurality of printing medium types;
a determining unit configured to determine whether or not each of the plurality of printing medium types is recommended for a cover of the printing media bundle based on the printing medium type of the main body of the printing medium bundle designated by the first designation unit; and
a second designation unit configured to designate a printing medium type of the cover of the printing media bundle used for printing the second page group included in the document data from among the plurality of printing medium types, wherein the second page group does not include any page of the first page group,
wherein the second designation unit inhibits a designation of the printing medium type which is determined not to be recommended by the determining unit.

2. The system according to claim 1, further comprising:
a page count designation unit configured to designate the number of pages of the first page group,
wherein the determining unit determines whether or not each of the plurality of printing medium types is recommended for the cover of the printing media bundle based on the printing medium type of the main body of the printing medium bundle designated by the first designation unit and the number of pages of the first page group designated by the page count designation unit.

3. The system according to claim 1, further comprising a binding unit configured to bind a printing medium bundle of the printed first page group by covering the printing medium bundle with the cover which is used for printing the second page group included in the document data.

4. The system according to claim 1, wherein the printing medium type includes at least one of a printing medium material, a printing medium thickness, and a weight of a printing medium per unit area.

5. The system according to claim 1, wherein said input unit inputs the document data as one file.

6. The system according to claim 1, wherein said input unit inputs the document data as a plurality of files.

7. A printing method using a printing apparatus capable of executing printing using a plurality of printing media of different types, comprising:
an input step of inputting document data to be used for a printing apparatus to create a printing media bundle;
a first designation step of designating a printing medium type of a main body of the printing media bundle used for printing a first page group included in the document data from among a plurality of printing medium types;
a determining step of determining whether or not each of the plurality of medium types is recommended for a cover of the printing media bundle based on the printing medium type of the main body of the printing medium bundle designated in the first designation step; and
a second designation step of designating a printing medium type of the cover of the printing media bundle used for printing the second page group included in the document data from among the plurality of printing medium types, wherein the second page group does not include any page of the first page group,
wherein the second designation step inhibits a designation of the printing medium type which is determined not to be recommended in the determining step.

8. A printing system capable of executing printing using a plurality of printing media of different types, comprising:
an input unit configured to input document data to be used for a printing apparatus to create a printing media bundle;
a printing unit configured to print on the basis of the document data input from said input unit;
a first designation unit configured to designate a printing medium type of a main body of the printing media bundle used for printing a first page group included in the document data, from among a plurality of printing medium types;

a second designation unit configured to designate a printing medium type of a cover of the printing media bundle used for printing a second page group included in the document data from among the plurality of printing medium types, wherein the second page group does not include any page of the first page group;

a determining unit configured to determine whether or not the printing medium type of the cover of the printing media bundle to be designated by the second designation unit is recommended based on the printing medium type of the main body of the printing medium bundle designated by the first designation unit; and a warning unit configured to warn that the printing medium type of the cover of the printing media bundle to be designated by the second designation unit is not recommended in a case where the printing medium type of the cover of the printing media bundle to be designated by the second designation unit is determined not to be recommended by the determining unit.

9. The system according to claim 8, further comprising:

a page count designation unit configured to designate the number of pages of the first page group, wherein the determining unit determines whether the printing medium type of the cover of the printing media bundle which can be designated by the second designation unit is recommended or not based on the printing medium type of the main body of the printing medium bundle designated by the first designation unit and the number of pages of the first page group designated by the page count designation unit.

10. The system according to claim 8, further comprising a binding unit configured to bind a printing medium bundle of the printed first page group by covering the printing medium bundle with the cover which is used for printing the second page group included in the document data.

11. The system according to claim 8, wherein the printing medium type includes at least one of a printing medium material, a printing medium thickness, and a weight of a printing medium per unit area.

12. The system according to claim 8, wherein said input unit inputs the document data as a plurality of files.

13. A printing method for executing printing using a plurality of printing media of different types, comprising:

an input step of inputting document data to be used for a printing apparatus to create a printing media bundle;

a printing step of printing on the basis of the document data input in the input step;

a first designation step of designating a printing medium type of a main body of the printing media bundle used for printing a first page group included in the document data, from among a plurality of printing medium types;

a second designation step of designating a printing medium type of a cover of the printing media bundle used for printing a second page group included in the document data from among the plurality of printing medium types, wherein the second page group does not include any page of the first page group;

a determining step of determining whether or not the printing medium type of the cover of the printing media bundle to be designated in the second designation step is recommended based on the printing medium type of the main body of the printing medium bundle designated in the first designation step; and a warning step of warning that the printing medium type of the cover of the printing media bundle to be designated in the second designation step is not recommended in a case where the printing medium type of the cover of the printing media bundle to be designated in the second designation step is determined not to be recommended in the determining step.

* * * * *